(12) United States Patent
Little et al.

(10) Patent No.: US 9,065,868 B2
(45) Date of Patent: Jun. 23, 2015

(54) SYSTEM AND METHOD FOR SHARING DATA IN A GROUP OF MOBILE DEVICES

(75) Inventors: Herbert A. Little, Kitchener (CA); Michael S. Brown, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 490 days.

(21) Appl. No.: 12/420,562

(22) Filed: Apr. 8, 2009

(65) Prior Publication Data
US 2010/0261488 A1    Oct. 14, 2010

(51) Int. Cl.
*H04L 29/08* (2006.01)
*H04L 12/18* (2006.01)
*H04W 4/02* (2009.01)

(52) U.S. Cl.
CPC .......... *H04L 67/306* (2013.01); *H04L 12/1886* (2013.01); *H04L 12/189* (2013.01); *H04L 12/1895* (2013.01); *H04W 4/02* (2013.01); *H04L 67/04* (2013.01); *H04L 67/18* (2013.01)

(58) Field of Classification Search
None
See application file for complete search history.

(56) References Cited

U.S. PATENT DOCUMENTS

| | | | | |
|---|---|---|---|---|
| 4,007,450 A * | 2/1977 | Haibt et al. | | 709/226 |
| 5,949,772 A * | 9/1999 | Sugikawa et al. | | 370/331 |
| 6,839,752 B1 * | 1/2005 | Miller et al. | | 709/224 |
| 2003/0208541 A1 | 11/2003 | Musa | | |
| 2004/0148326 A1 * | 7/2004 | Nadgir et al. | | 709/200 |
| 2004/0221309 A1 * | 11/2004 | Zaner et al. | | 725/46 |
| 2005/0021571 A1 * | 1/2005 | East | | 707/201 |
| 2005/0021695 A1 * | 1/2005 | Takamine | | 709/220 |
| 2005/0044187 A1 * | 2/2005 | Jhaveri et al. | | 709/219 |
| 2006/0172724 A1 * | 8/2006 | Linkert et al. | | 455/412.1 |
| 2007/0005707 A1 * | 1/2007 | Teodosiu et al. | | 709/206 |

(Continued)

FOREIGN PATENT DOCUMENTS

| | | |
|---|---|---|
| EP | 1452978 A2 | 9/2004 |
| EP | 1752886 A1 | 2/2007 |

(Continued)

OTHER PUBLICATIONS

Poppe, Fabrice; Search Report from corresponding EP Application No. 09157647.0; Sep. 1, 2009.

(Continued)

*Primary Examiner* — Huy D Vu
*Assistant Examiner* — James P Duffy
(74) *Attorney, Agent, or Firm* — Jon Gibbons; Fleit Gibbons Gutman Bongini & Bianco P.L.

(57) ABSTRACT

A method and system are provided for sharing data amongst a group of a plurality of mobile devices without requiring a database or server to centrally store the shared data. The shared data is instead stored by each group member individually while controlling the manner in which the shared data is updated. To manage such updates, the shared data is atomized such that individual databases in the shared data are separated or otherwise delineated into one or more records, each record having associated therewith, a value. To maintain a common copy of the shared data at each device, any update is sent to all group members using an intermediate message exchange service that is capable of transmitting a sent message to more than one recipient if necessary. In this way, the updates are multicast to the group. To manage the content of the shared data, each update comprises one or more changes to a current copy of a corresponding record.

27 Claims, 45 Drawing Sheets

(56) References Cited

U.S. PATENT DOCUMENTS

2007/0033271 A1 2/2007 Hullot et al.
2007/0271234 A1* 11/2007 Ravikiran .......................... 707/3

FOREIGN PATENT DOCUMENTS

WO      WO 99/63709 A2    12/1999
WO      WO 02/089026 A2   11/2002

OTHER PUBLICATIONS

Zhang, N.; "Peer-to-Peer Distributed Database System"; Jul. 2004; Available from http://dspace.hil.unb.ca:8080/bitstream/handle/1882/180/zhanq_naishan_200407.pdf?sequence=1.

Yu, Jian et al.; "A Peer to Peer Database Model Based on Chord"; International Conference on Computer Science and Software Engineering; Dec. 12-14, 2008; vol. 4; Abstract only.

Ryeng; N. et al.; "Robust aggregation in peer-to-peer database systems"; Proceedings of the 2008 international symposium on Database engineering and applications; vol. 299 of the ACM International Conference Proceeding Series; ACM; New York, U.S.A.; Abstract only.

Larkin, H.; "Applying Concurrent Versioning to Serverless Mobile Device Synchronisation"; 6$^{th}$ IEEE/ACIS International Conference on Computer and Information Science; Jul. 11-13, 2007; pp. 157 to 162; IEEE Computer Society.

Poppe, F.; Search Report from corresponding European Application No. 12181192.1; search completed Nov. 19, 2012.

\* cited by examiner

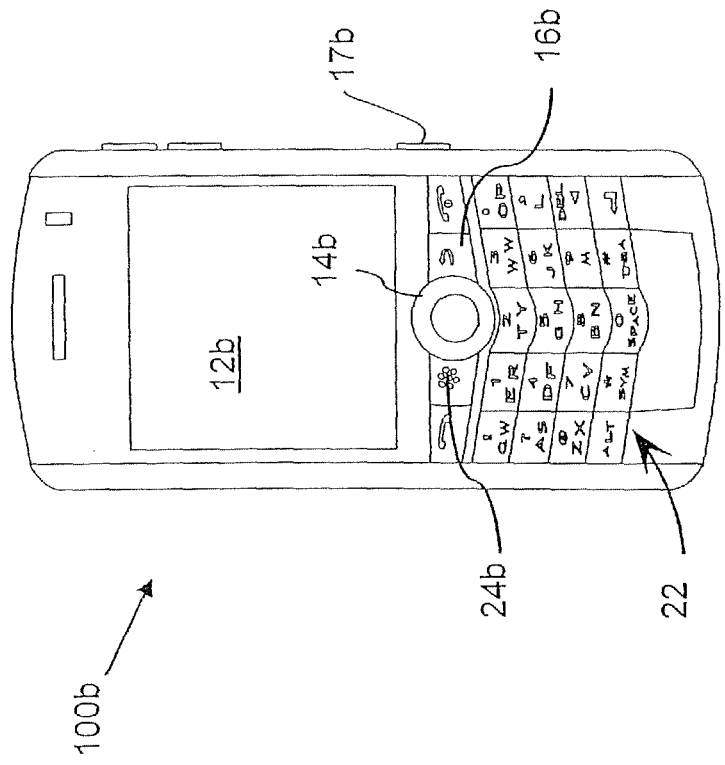
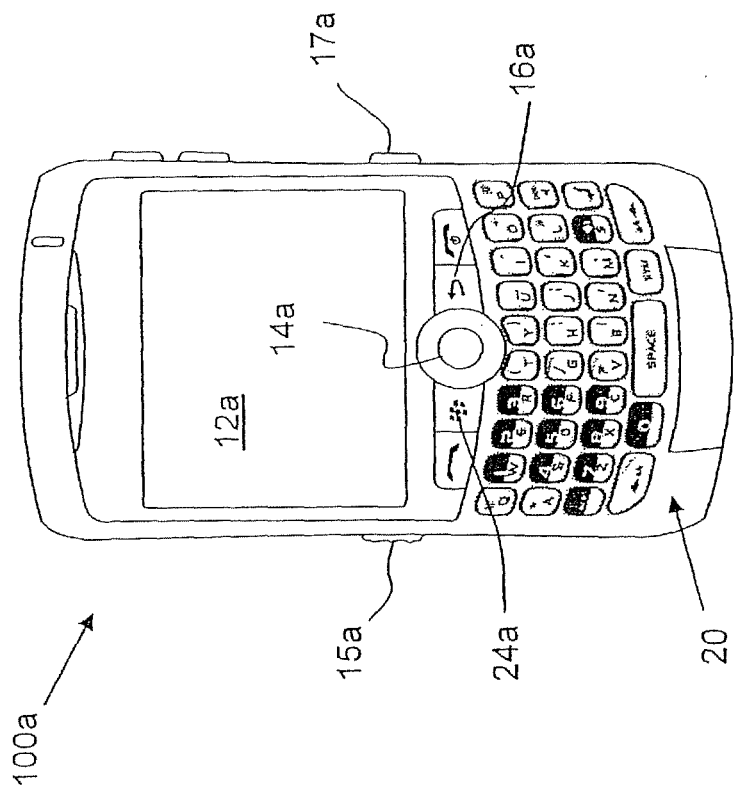
Figure 5
Figure 4

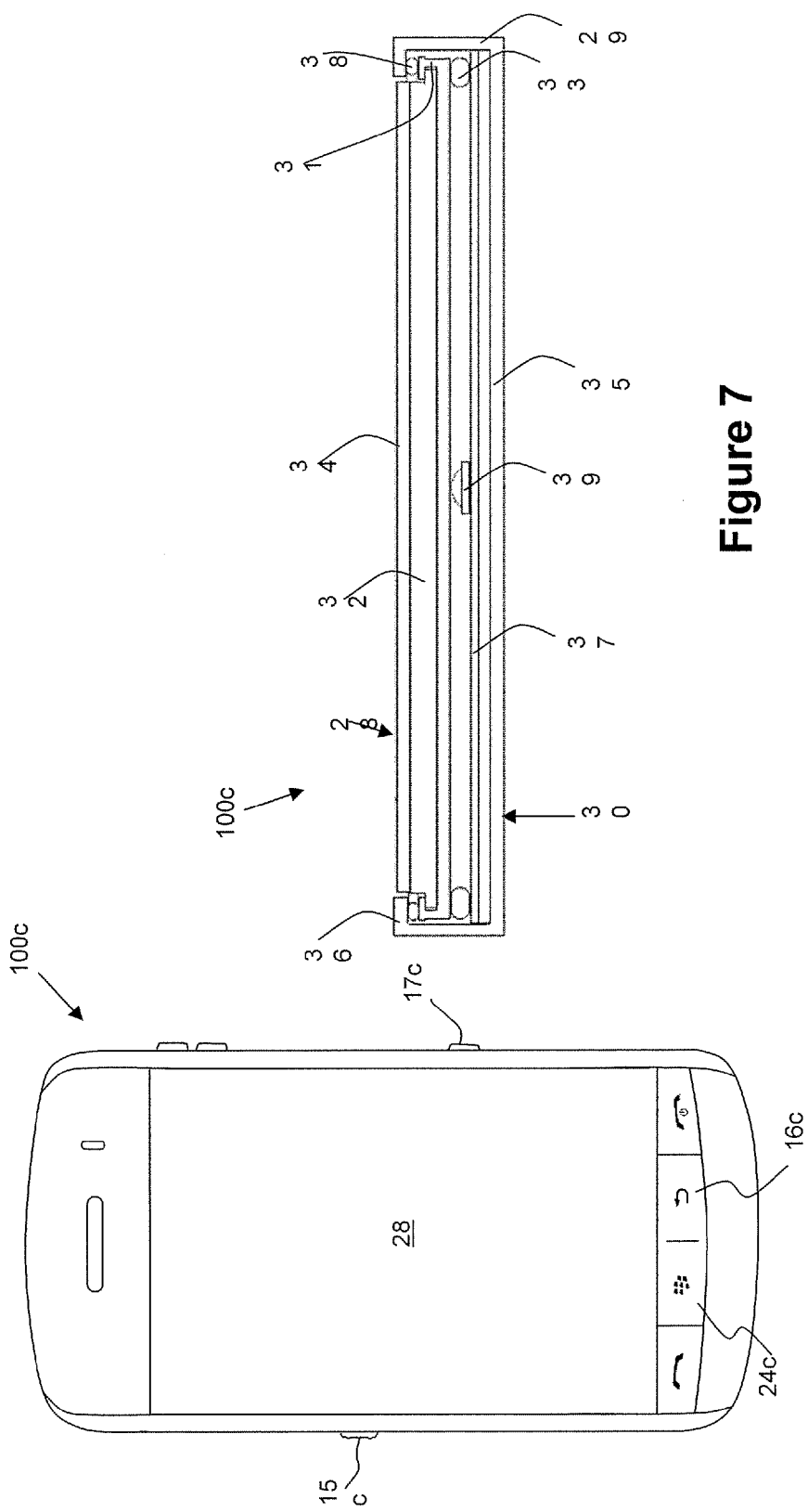

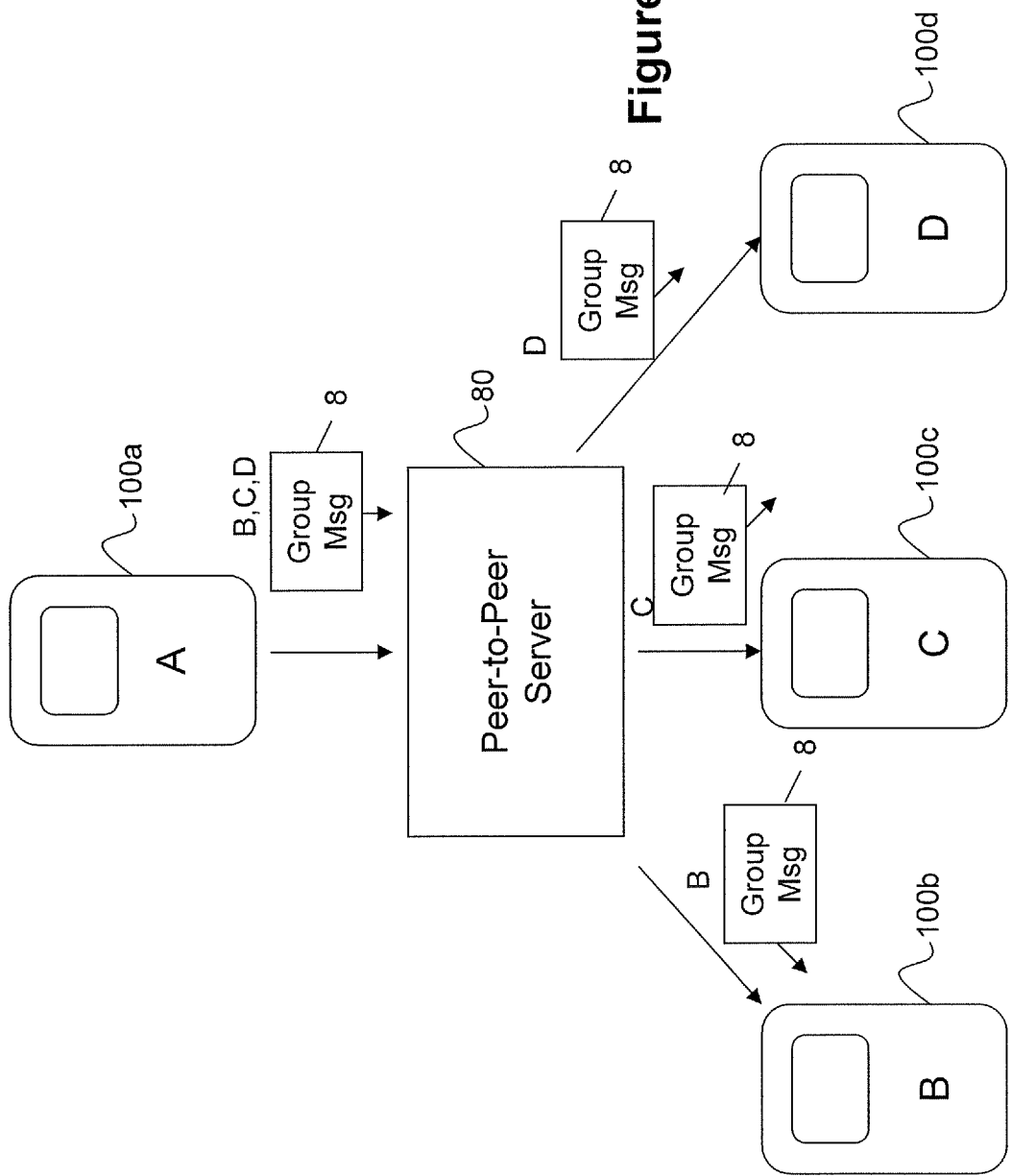

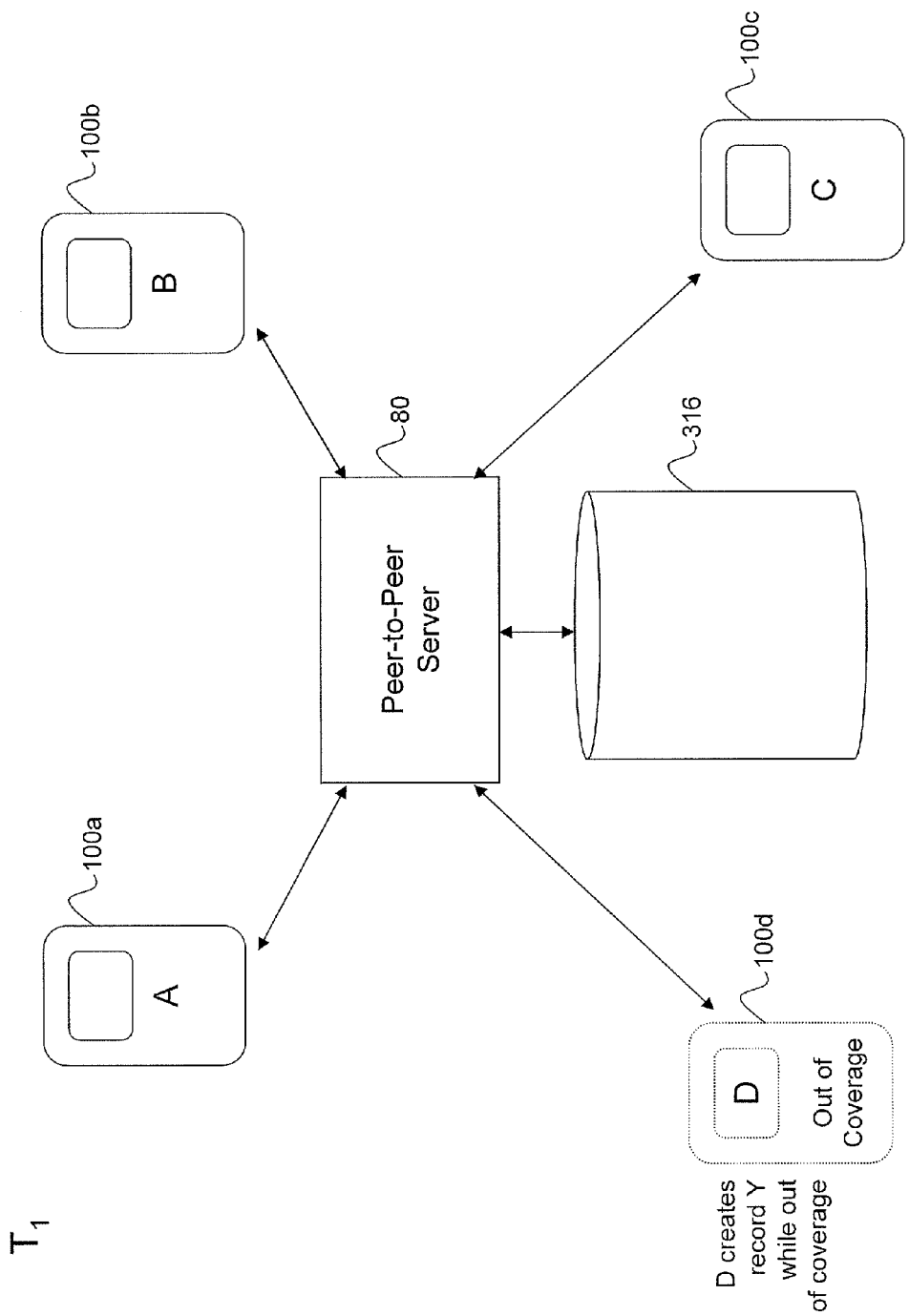

SYSTEM AND METHOD FOR SHARING DATA IN A GROUP OF MOBILE DEVICES

TECHNICAL FIELD

The following relates to systems and methods for sharing data in a group of mobile devices.

DESCRIPTION OF THE RELATED ART

Sharing data between a plurality of entities is typically accomplished by providing a set of shared data in a database on a centrally accessible server. Any changes, updates, edits, etc. can be managed by a document or version management system on the central server.

Implementing a database or otherwise sharing data on a server may have disadvantages. For example, providing a dedicated server and database service typically requires additional hardware, administration, infrastructure and corresponding overhead. There are also privacy concerns with regards to who has access to data and the susceptibility of such data to hackers or other adversaries. Furthermore, maintaining a master copy of the data on the server requires that version control be strictly monitored and typically requires some mechanism to update those having access to the data of any edits that are entered. Depending on the size of the group of users having access to the data, and the amount of data being stored, such tasks can add further administrative overhead. When allowing wireless access to a central database, low bandwidth and high latency can also put constraints on the system that can affect the consistency of the data and access thereto.

BRIEF DESCRIPTION OF THE DRAWINGS

Embodiments will now be described by way of example only with reference to the appended drawings wherein:

FIG. 4 is a schematic diagram of a mobile device and a display screen therefor.

FIG. 5 is a schematic diagram of another mobile device and a display screen therefor.

FIG. 6 is a schematic diagram of yet another mobile device and display screen therefor.

FIG. 7 is a cross-sectional view of the mobile device of FIG. 6.

FIGS. 16(a) and 16(b) are flow diagrams illustrating delivery of a group message to a group of mobile devices according to an update made at one of the mobile devices for both global updates and private updates.

FIGS. 19(a) to 19(f) are a series of flow diagrams illustrating an exemplary collision resolution scenario for updates to the same record in the shared data.

DETAILED DESCRIPTION

Figure 1A:
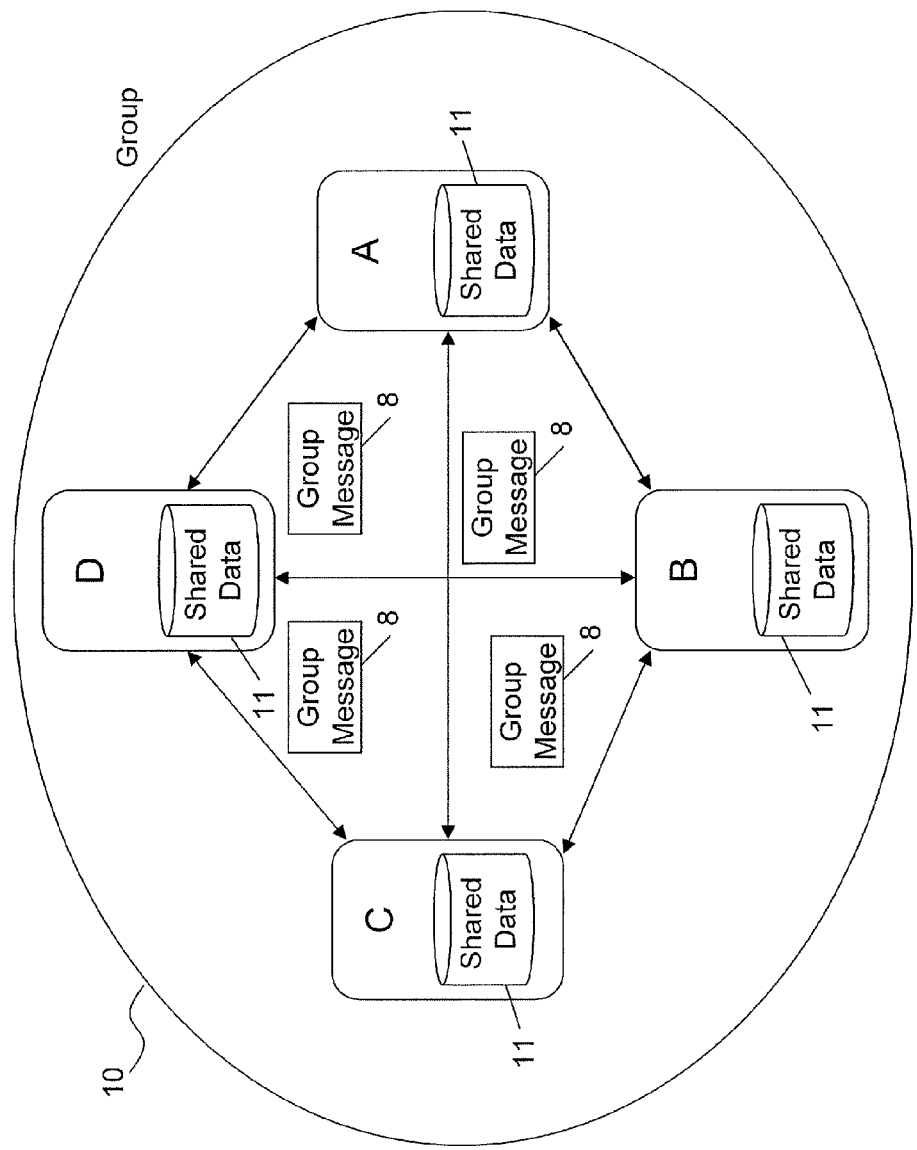
FIG. 1(a) is a schematic diagram illustrating a group of mobile devices sharing a common set of data.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

A method and system are provided for sharing data amongst a group comprising a plurality of mobile devices without requiring a database or server to centrally store the shared data. The shared data is instead stored by each group member individually while controlling the manner in which the shared data is updated. To manage such updates, the shared data is atomized such that individual databases in the shared data are separated or otherwise delineated into one or more records, each record having associated therewith, a value.

The value for a record can represent a user definable/customizable field or can be one of a finite set of alternatives, e.g. yes/no, time of day, etc. To maintain a common copy of the shared data at each device, any update is sent to all group members using an intermediate message exchange service that is capable of transmitting a sent message to more than one recipient if necessary. In this way, the updates are multicast to the group via a common message. To manage the content of the shared data, each update comprises one or more changes to a current copy of a corresponding record.

At the receiving end, each record may then be evaluated and replaced in its entirety (according to certain criteria) to simplify the resolution of collisions between updates to similar records and to inhibit propagation of changes throughout the shared data. In other words, atomic changes can be used such that only the data, information, selection or other value associated with a single record is affected for each addition, change or update. By managing the shared data in this way, updates to the shared data are also more tolerant of out-of-coverage situations. While devices are out-of-coverage, messages containing updates can be held until the device comes back into coverage or the messages may be resent on a periodic basis or both.

FIG. 1(a) illustrates an exemplary group 10 of four members, A, B, C, D having amongst them, a set of shared data 11. The members A, B, C, and D may be any data communication device capable of sending, receiving, examining, storing and otherwise processing or handling data and in the following illustrative examples comprise mobile communication devices 100 (see also FIG. 3). The group 10 may be of any size but for the following examples is a small static set of members or users having the same relation to everyone else, e.g. family, sports team, co-workers, small business, club or organization, etc. As noted above, the shared data 11 exists without requiring a master copy controlled by a central entity but rather a copy of the shared data 11 is maintained at each member by exchanging multicast messages comprising updates via a message exchange service capable of such exchanges.

Figure 1B:
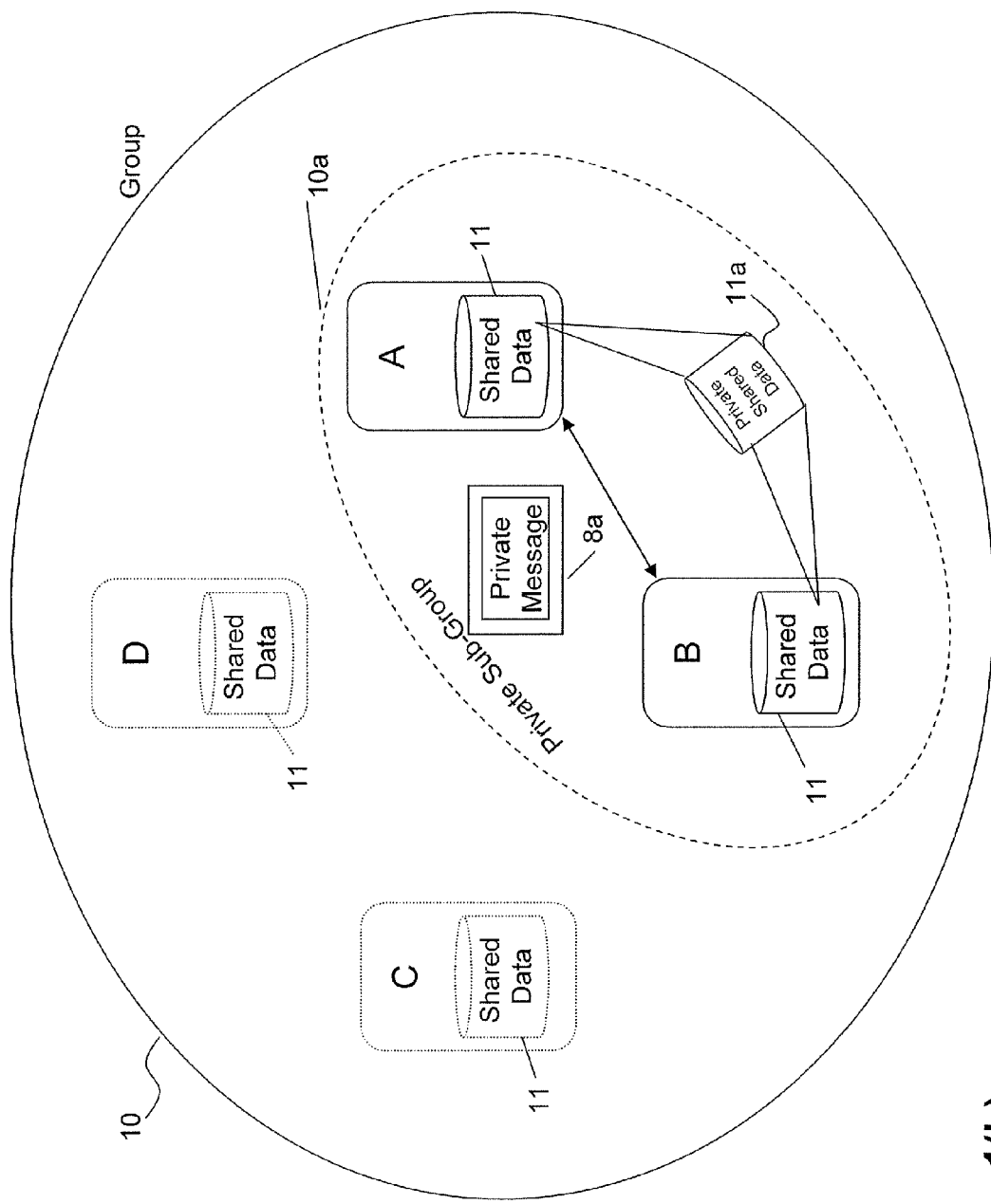
FIG. 1(b) is a schematic diagram illustrating a private subgroup within the group shown in FIG. 1(a).

As shown in FIG. 1(b), a private sub-group 10a may also be formed within and amongst a sub-set of the members of the group 10 for sharing a set of private shared data 11a. This allows certain members to share some specific data and information while excluding other members from accessing such data. For example, if the group 10 is a family, the parents may form a sub-group 10a for sharing gift ideas for their children or other information such as disciplinary tactics or subjects of a sensitive nature. This avoids the need for forming an entirely separate group 10 simply to share some select information. Although shown as separate databases in FIG. 1(b), it can be appreciated that the shared data 11 and private shared data 11a may instead be separate portions of a common database. It can also be appreciated that FIGS. 1(a) and 1(b) show one group 10 but members may also belong to multiple groups each having a different set of shared data 11 exclusive to that group 10 (not shown).

Figure 2:
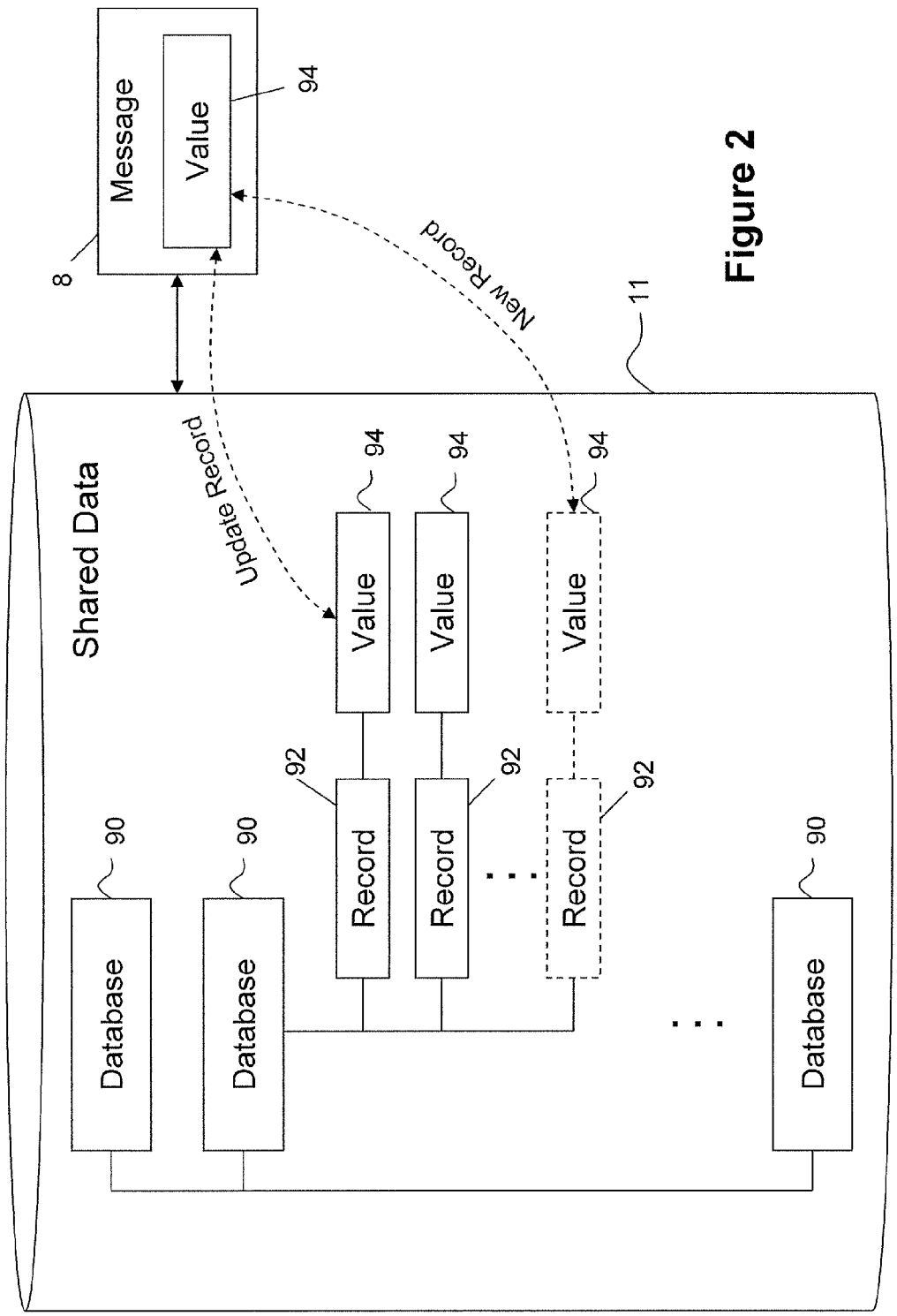
FIG. 2 is a schematic diagram illustrating a database storage hierarchy for the shared data shown in FIG. 1.

FIG. 2 illustrates the structure of the shared data 11 and private shared 11a in one embodiment (collectively referred to by numeral 11 for clarity). The shared data 11 in this embodiment comprises one or more databases 90. Each database 90 can have associated therewith, one or more records 92, which enables each database 90 to be comprised of various components. Each record 92 has associated therewith, a value 94, which represents the portion of the database 90 associated with that particular record name. For example, a calendar program or applet can be represented in the shared data 11 as a database 90 which has a record 92 for each one hour block on each day in each month. Each record 92 can contain an appointment for the respective day, which is represented by the value 94, e.g. an alphanumeric string. As such, it can be seen from FIG. 2 that the shared data 1 can be given a tiered structure to provide granularity down to the record level such that when a new record 92 is added, or an existing record 92 is modified, the record 92 can simply be added or overwritten in the corresponding database 90 without necessarily disrupting the other components of the shared data 11. It can be appreciated that more than one database 90 can be associated with a particular application or applet. For example, an application for picture sharing may have a database 90 for the pictures and another database 90 for conversations or comments associated with the pictures.

It can be appreciated that the granularity and number of tiers shown in FIG. 2 is for illustrative purposes only and that other structures may be used. For example, another, higher level tier can be used to separate objects (not shown) within each database. Turning back to the calendar example, the calendar, being a database 90 can comprise an object for each day in the calendar with a record 92 for each hour and the value 94 contains anything that may be written in for that hour. Alternatively, as noted above, the calendar application could instead have multiple databases 90, each database representing a month, week, day, etc. A tiered structure such as that shown in FIG. 2 enables the shared data 11 to be updated through a simple replacement at a particular tier, typically that tier which includes the actual value that contains the information relevant to the group 10 (e.g. by replacing a record 92 and its value 94 at the lowest tier). If a new database 90 is created by one member, such a new database 90 can be created at each other member through the distribution of a group message 8. Similarly, for an existing database 90, if a new record 92 is created at one member, such new record 92 can be added to the shared data 11 at each other member by distributing a group message 8. In either case, using the structure shown in FIG. 2, a new record 92 and its associated value 94 would be added and placed in a new or existing database 90. It may be noted that the message 8 shown in FIG.

2 is for illustrative purposes only and would typically include other information in addition to the value 94, e.g. to identify the sender and recipient, identify the database 90 and record 92, etc. as will be explained in greater detail below.

As discussed, the shared data 11 is maintained by each member of the group 10 rather than being managed and maintained by a central entity such as a server or central database. In order to communicate any changes that are made locally at any one of the members, messages 8 are sent from the member making the change to each other member via a message exchange service. Such a message exchange service thus provides a multicast message service to the group 10. There are many suitable configurations for providing the message exchange but for the sake of illustration, the following examples are provided for a group 10 of mobile devices 100 that normally communicate through a wireless network 200 as shown by way of example in FIG. 3.

Examples of applicable communication devices include pagers, cellular phones, cellular smart-phones, wireless organizers, personal digital assistants, computers, laptops, handheld wireless communication devices, wirelessly enabled notebook computers and the like. Such devices will hereinafter be commonly referred to as "mobile devices" for the sake of clarity.

In a typical embodiment, the mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

The mobile device is preferably one that is used in a system that is configured for continuously routing all forms of pushed information from a host system to the mobile device. One example of such a system will now be described.

Figure 3:
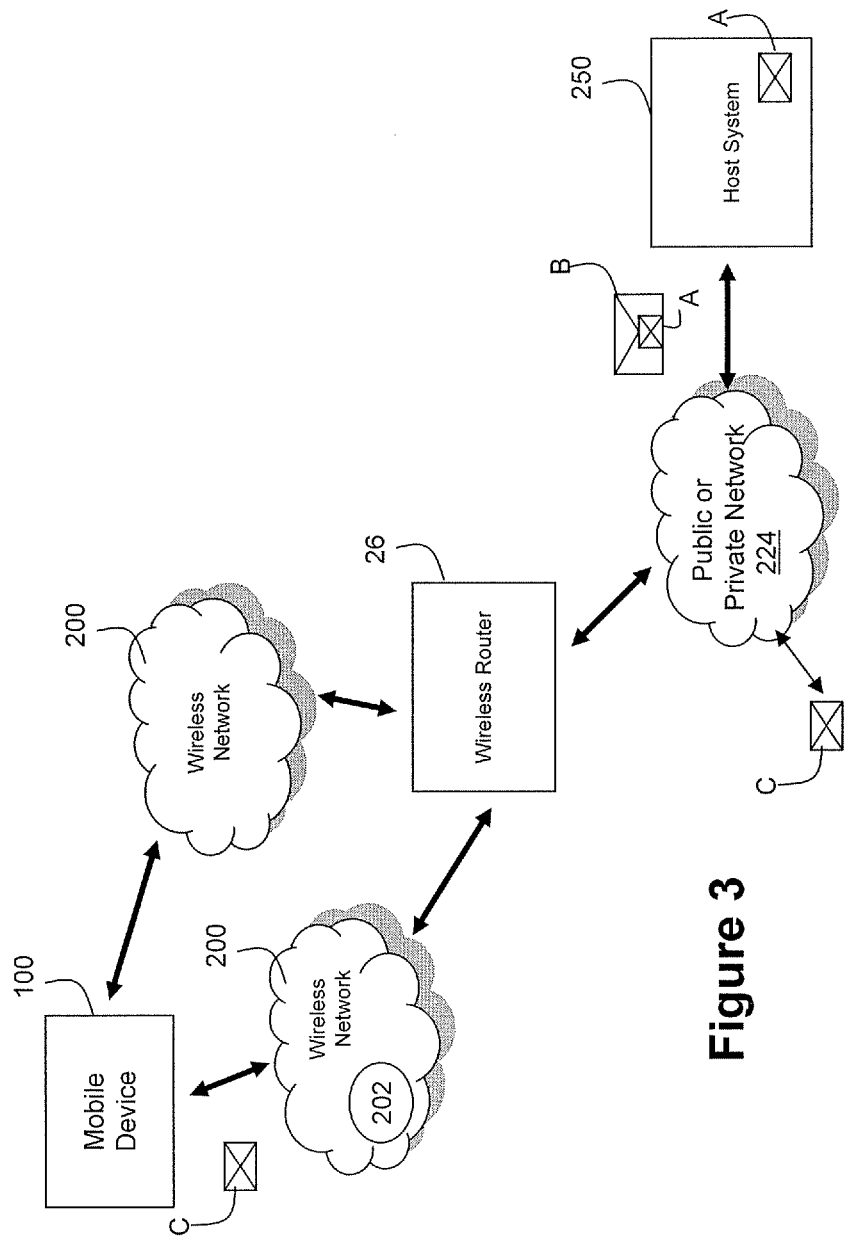
FIG. 3 is a system diagram illustrating the environment in which data items are pushed from a host system to a mobile device.

Referring now to the drawings, FIG. 3 is an example system diagram showing the redirection of user data items (such as message A or C) from a corporate enterprise computer system (host system) 250 to the user's mobile device 100 via a wireless router 26. The wireless router 26 provides the wireless connectivity functionality as it acts to both abstract most of the wireless network's 200 complexities, and it also implements features necessary to support pushing data to the mobile device 100. Although not shown, a plurality of mobile devices may access data from the host system 250. In this example, message A in FIG. 3 represents an internal message sent from, e.g. a desktop computer 262 within the host system 250 (see FIG. 11), to any number of server computers in the corporate network 260 (e.g. LAN), which may, in general, include a database server, a calendar server, an E-mail server or a voice-mail server.

Message C in FIG. 3 represents an external message from a sender that is not directly connected to the host system 250, such as the user's mobile device 100, some other user's mobile device (not shown), or any user connected to the public or private network 224 (e.g. the Internet). Message C could be e-mail, voice-mail, calendar information, database updates, web-page updates or could even represent a command message from the user's mobile device 100 to the host system 250. The host system 250 may comprise, along with the typical communication links, hardware and software associated with a corporate enterprise computer network system, one or more wireless mobility agents, a TCP/IP connection, a collection of data stores, (for example a data store for e-mail could be an off-the-shelf mail server like Microsoft Exchange® Server or Lotus Notes® Server), all within and behind a corporate firewall as will be explained further below.

The mobile device 100 may be adapted for communication within wireless network 200 via wireless links, as required by each wireless network 200 being used. As an illustrative example of the operation for a wireless router 26 shown in FIG. 3, consider a data item A, repackaged in outer envelope B (the packaged data item A now referred to as "data item (A)") and sent to the mobile device 100 from an Application Service Provider (ASP) in the host system 250. Within the ASP is a computer program, similar to a wireless mobility agent, running on any computer in the ASP's environment that is sending requested data items from a data store to a mobile device 100. The mobile-destined data item (A) is routed through the network 224, and through the wireless router's 26 firewall 27 protecting the wireless router 26 (see also FIG. 12).

Although the above describes the host system 250 as being used within a corporate enterprise network environment, this is just one embodiment of one type of host service that offers push-based messages for a handheld wireless device that is capable of notifying and preferably presenting the data to the user in real-time at the mobile device when data arrives at the host system.

By offering a wireless router 26 (sometimes referred to as a "relay"), there are a number of major advantages to both the host system 250 and the wireless network 200. The host system 250 in general runs a host service that is considered to be any computer program that is running on one or more computer systems. The host service is said to be running on a host system 250, and one host system 250 can support any number of host services. A host service may or may not be aware of the fact that information is being channelled to mobile devices 100. For example an e-mail or message program 138 (see FIG. 8) might be receiving and processing e-mail while an associated program (e.g. an e-mail wireless mobility agent) is also monitoring the mailbox for the user and forwarding or pushing the same e-mail to a wireless device 100. A host service might also be modified to prepared and exchange information with mobile devices 100 via the wireless router 26, like customer relationship management software. In a third example, there might be a common access to a range of host services. For example a mobility agent might offer a Wireless Access Protocol (WAP) connection to several databases.

As discussed above, a mobile device 100 may be a handheld two-way wireless computing device as exemplified in FIGS. 4-11, a wirelessly enabled palm-top computer, a mobile telephone with data messaging capabilities, a PDA with mobile phone capabilities, a wirelessly enabled laptop computer, a vending machine with an associated OEM radio modem, a wirelessly-enabled heart-monitoring system or, alternatively, it could be other types of mobile data communication devices capable of sending and receiving messages via a network connection. Although the system is exemplified as operating in a two-way communications mode, certain aspects of the system could be used in a "one and one-half" or acknowledgment paging environment, or even with a one-way paging system. In such limited data messaging environments, the wireless router 26 still could abstract the mobile device 100 and wireless network 200, offer push services to standard web-based server systems and allow a host service in a host system 250 to reach the mobile device 100 in many countries.

The host system 250 shown herein has many methods when establishing a communication link to the wireless router 26. For one skilled in the art of data communications the host system 250 could use connection protocols like TCP/IP, X.25, Frame Relay, ISDN, ATM or many other protocols to establish a point-to-point connection. Over this connection there are several tunnelling methods available to package and send the data, some of these include: HTTP/HTML, HTTP/XML, HTTP/Proprietary, FTP, SMTP or some other proprietary data exchange protocol. The type of host systems 250 that might employ the wireless router 26 to perform push could include: field service applications, e-mail services, stock quote services, banking services, stock trading services, field sales applications, advertising messages and many others. This wireless network 200 abstraction is made possible by the wireless router 26, which implements this routing and push functionality. The type of user-selected data items being exchanged by the host could include: E-mail messages, calendar events, meeting notifications, address entries, journal entries, personal alerts, alarms, warnings, stock quotes, news bulletins, bank account transactions, field service updates, stock trades, heart-monitoring information, vending machine stock levels, meter reading data, GPS data, etc., but could, alternatively, include any other type of message that is transmitted to the host system 250, or that the host system 250 acquires through the use of intelligent agents, such as data that is received after the host system 250 initiates a search of a database or a website or a bulletin board.

The wireless router 26 provides a range of services to make creating a push-based host service possible. These networks may comprise: (1) the Code Division Multiple Access (CDMA) network, (2) the Groupe Special Mobile or the Global System for Mobile Communications (GSM) and the General Packet Radio Service (GPRS), and (3) the existing and upcoming third-generation (3G) and fourth generation (4G) networks like EDGE, UMTS and HSDPA, LTE, Wi-Max etc. Some older examples of data-centric networks include, but are not limited to: (1) the Mobitex Radio Network ("Mobitex") and (2) the DataTAC Radio Network ("DataTAC").

To be effective in providing push services for host systems 250, the wireless router 26 may implement a set of defined functions. It can be appreciated that one could select many different hardware configurations for the wireless router 26, however, many of the same or similar set of features would likely be present in the different configurations. The wireless router 26 may offer any one or more of the following features for host services: 1) An addressing method so that mobile device 100 traffic can be addressed to a host system 250 without the need for the wireless network 200 to assign an identity to each host system 250; 2) An efficient and authenticated method for the host system 250 to initiate a communication connection to the wireless router 26 for the purposes of opening a communication tunnel to the one or more mobile devices 100 that the host system 250 wishes to communicate with; 3) A reliable method for exchanging data between the host system 250 and the mobile device 100, in a manner consistent with the abilities of the wireless network 200; 4) Providing feedback to the host system 250 when data is delivered, which allows the host system to clean up any wireless delivery queues if necessary, or inform the original sender (user or program) that the data has been delivered to the mobile device 100; 5) Implementation of a wireless network 200 initiated push of services or data to a mobile device 100, from a wireless router 26; and 6) Connect to a wide range of wireless networks 200 and provide a way of tracking the user's location so that a follow you anywhere solution can be provided.

Referring to FIGS. 4 through 7, one embodiment of a mobile device 100a is shown in FIG. 4, another embodiment of a mobile device 100b is shown in FIG. 5, and yet another embodiment of a mobile device 100c is shown in FIGS. 6 and 7. It will be appreciated that the numeral "100" will hereinafter refer to any mobile device 100, including the embodiments 100a, 100b and 100c, those embodiments enumerated above or otherwise. It will also be appreciated that a similar numbering convention may be used for other general features common between FIGS. 2 through 4 such as a display 12, a positioning device 14, a cancel or escape button 16, a camera button 17, and a menu or option button 24.

The mobile device 100a shown in FIG. 4 comprises a display 12a and the cursor or view positioning device 14 shown in this embodiment is a trackball 14a. Positioning device 14 may serve as another input member and is both rotational to provide selection inputs to the main processor 102 (see FIG. 8) and can also be pressed in a direction generally toward housing to provide another selection input to the processor 102. Trackball 14a permits multi-directional positioning of the selection cursor 18 (see FIG. 10) such that the selection cursor 18 can be moved in an upward direction, in a downward direction and, if desired and/or permitted, in any diagonal direction. The trackball 14a (and similar devices) can also be "flicked" in order to provide a distinguishable input from a normal scroll, e.g. a sideways flick. The trackball 14a is in this example situated on the front face of a housing for mobile device 100a as shown in FIG. 4 to enable a user to manoeuvre the trackball 14a while holding the mobile device 100a in one hand. The trackball 14a may serve as another input member (in addition to a directional or positioning member) to provide selection inputs to the processor 102 and can preferably be pressed in a direction towards the housing of the mobile device 100b to provide such a selection input.

The display 12 may include a selection cursor 18 that depicts generally where the next input or selection will be received. The selection cursor 18 may comprise a box, alteration of an icon or any combination of features that enable the user to identify the currently chosen icon or item. The mobile device 100a in FIG. 4 also comprises a programmable convenience button 15a to activate a selected application such as, for example, a calendar or calculator. Further, mobile device 100a includes an escape or cancel button 16a, a camera button 17a, a menu or option button 24a and a keyboard 20. The camera button 17 is able to activate photo-capturing functions when pressed preferably in the direction towards the housing. The menu or option button 24 loads a menu or list of options on display 12a when pressed. In this example, the escape or cancel button 16a, the menu option button 24a, and keyboard 20 are disposed on the front face of the mobile device housing, while the convenience button 15a and camera button 17a are disposed at the side of the housing. This button placement enables a user to operate these buttons while holding the mobile device 100 in one hand. The keyboard 20 is, in this embodiment, a standard QWERTY keyboard.

The mobile device 100b shown in FIG. 5 comprises a display 12b and the positioning device 14 in this embodiment is a trackball 14b. The mobile device 100b also comprises a menu or option button 24b, a cancel or escape button 16b, and a camera button 17b. The mobile device 100b as illustrated in FIG. 5, comprises a reduced QWERTY keyboard 22. In this embodiment, the keyboard 22, positioning device 14b, escape button 16b and menu button 24b are disposed on a front face of a mobile device housing. The reduced QWERTY keyboard 22 comprises a plurality of multi-functional keys and corresponding indicia including keys associated with alphabetic characters corresponding to a QWERTY array of letters A to Z and an overlaid numeric phone key arrangement.

Referring to FIGS. 6 and 7, the mobile device 100c is shown comprising a touch-sensitive display, also commonly referred to as a "touchscreen". In FIG. 6, the touch sensitive display 28 allows a user to interact with the mobile device 100c. In this embodiment, the mobile device 100c also comprises a menu or option button 24c and a cancel or escape button 16c. In this example, a convenience button 15c and camera button 17c are disposed on the sides of the housing.

As best shown in FIG. 7, the housing 30 of the mobile device 100c includes a back 35, a frame 36, which surrounds the touch-sensitive display 28, sidewalls 29 that extend between and generally perpendicular to the back 35 and the frame 36, and a base 37 that is spaced from and generally parallel to the back 35. The base 37 can be any suitable base and can include, for example, a printed circuit board or flex circuit board. The back 35 includes a plate (not shown) that is releasably attached for insertion and removal of, for example, a battery and a SIM/RUIM/USIM card 126 (see FIG. 8). It will be appreciated that the back 35, the sidewalls 29 and the frame 36 can be injection molded, for example. In the exemplary mobile device 100c shown in FIG. 6, the frame 36 is generally rectangular with rounded corners although other shapes are possible.

The display device 32 and the overlay 34 can be supported on a support tray 31 of suitable material such as magnesium for providing mechanical support to the display device 32 and overlay 34. The display device 32 and overlay 34 are biased away from the base 37, toward the frame 36 by biasing elements 33 such as gel pads between the support tray 31 and the base 37. Compliant spacers 38, which can also be in the form of gel pads for example, are located between an upper portion of the support tray 31 and the frame 36. The touch screen display 28 is moveable within the housing 30 as the touch screen display 28 can be moved toward the base 37, thereby compressing the biasing elements 33. The touch screen display 28 can also be pivoted within the housing 30 with one side of the touch screen display 28 moving toward the base 37, thereby compressing the biasing elements 33 on the same side of the touch screen display 28 that moves toward the base 37.

In the present example, the switch 39 is supported on one side of the base 37 which can be printed circuit board while the opposing side provides mechanical support and electrical connection for other components (not shown) of the mobile device 100c. The switch 39 can be located between the base 37 and the support tray 31. The switch 39, which can be a mechanical dome-type switch, for example, can be located in any suitable position such that displacement of the touch screen display 28 resulting from a user pressing the touch screen display 28 with sufficient force to overcome the bias and to overcome the actuation force for the switch 39, depresses and actuates the switch 39. In the present embodiment the switch 39 is in contact with the support tray 31. Thus, depression of the touch screen display 28 by user application of a force thereto, causes actuation of the switch 39, thereby providing the user with a positive tactile quality during user interaction with the user interface of the portable electronic device 20. The switch 39 is not actuated in the rest position shown in FIG. 7, absent applied force by the user. It will be appreciated that the switch 39 can be actuated by pressing anywhere on the touch screen display 28 to cause movement of the touch screen display 28 in the form of movement parallel with the base 37 or pivoting of one side of the touch screen display 28 toward the base 37. The switch 39 is connected to a processor (e.g. main processor 102) and can be used for further input to the processor when actuated. Although a single switch is shown any suitable number of switches can be used and can be located in any suitable position.

The touch screen display 28 can be any suitable touch screen display such as a capacitive touch screen display. A capacitive touch screen display 28 includes the display 32 and the touch-sensitive overlay 34, in the form of a capacitive touch-sensitive overlay 34. It will be appreciated that the capacitive touch-sensitive overlay 34 includes a number of layers in a stack and is fixed to the display 32 via a suitable optically clear adhesive. The layers can include, for example a substrate fixed to the LCD display 32 by a suitable adhesive, a ground shield layer, a barrier layer, a pair of capacitive touch sensor layers separated by a substrate or other barrier layer, and a cover layer fixed to the second capacitive touch sensor layer by a suitable adhesive. The capacitive touch sensor layers can be any suitable material such as patterned indium tin oxide (ITO).

In the present example, the X and Y location of a touch are both determined with the X location determined by a signal generated as a result of capacitive coupling with one of the touch sensor layers and the Y location determined by the signal generated as a result of capacitive coupling with the other of the touch sensor layers. Each of the touch-sensor layers provides a signal to the controller 36 as a result of capacitive coupling with a suitable object such as a finger of a user or a conductive object held in a bare hand of a user resulting in a change in the electric field of each of the touch sensor layers. The signals represent the respective X and Y touch location values. It will be appreciated that other attributes of the user's touch on the touch screen display 28 can be determined. For example, the size and the shape of the touch on the touch screen display 28 can be determined in addition to the location (X and Y values) based on the signals received at the controller 36 from the touch sensor layers.

As will be appreciated, a controller interprets touch events detected on the touch screen display 28, and controls the portable electronic device 20 accordingly. As used herein, a touch event can be, for example, a single touch, a combination of touches, such as a "double touch", a "touch and hold", a "touch and drag", or a touch made with sufficient force to depress the switch 39 described above. The interpretation of a given touch event will depend on the software and implementation details used by the portable electronic device 20. According to an embodiment, an activation touch event, also referred to as a "click" touch event or "clicking", is a touch event where sufficient force is applied to the touch screen 38 to depress or activate the switch 39, and to provide tactile feedback to the user. Such an activation touch event invokes an action as determined by the underlying application and as displayed to the user in a graphical user interface (GUI). As used herein, a user selection is made by such an activation touch event. According to an embodiment, a highlighting touch event, also referred to as a "focus" touch event, is a touch event where the touch screen display 28 is touched lightly without sufficient force to activate the switch 38, and causes the item so touched to be highlighted, or otherwise visibly selected, for further action.

It will be appreciated that for the mobile device 100, a wide range of one or more positioning or cursor/view positioning mechanisms such as a touch pad, a positioning wheel, a joystick button, a mouse, a touchscreen, a set of arrow keys, a tablet, an accelerometer (for sensing orientation and/or movements of the mobile device 100 etc.), or other whether presently known or unknown may be employed. Similarly, any variation of keyboard 20, 22 may be used. It will also be appreciated that the mobile devices 100 shown in FIGS. 4 through 7 are for illustrative purposes only and various other mobile devices 100 are equally applicable to the following examples. Other buttons may also be disposed on the mobile device housing such as colour coded "Answer" and "Ignore" buttons to be used in telephonic communications. Furthermore, the housing for the mobile device 100 should not be limited to the single-piece configurations shown in FIGS. 4 through 7, other configurations such as clamshell or "flip-phone" configurations are also applicable.

To aid the reader in understanding the structure of the mobile device 100 and how it communicates with the wireless network 200, reference will now be made to FIGS. 8 through 11.

Figure 8:
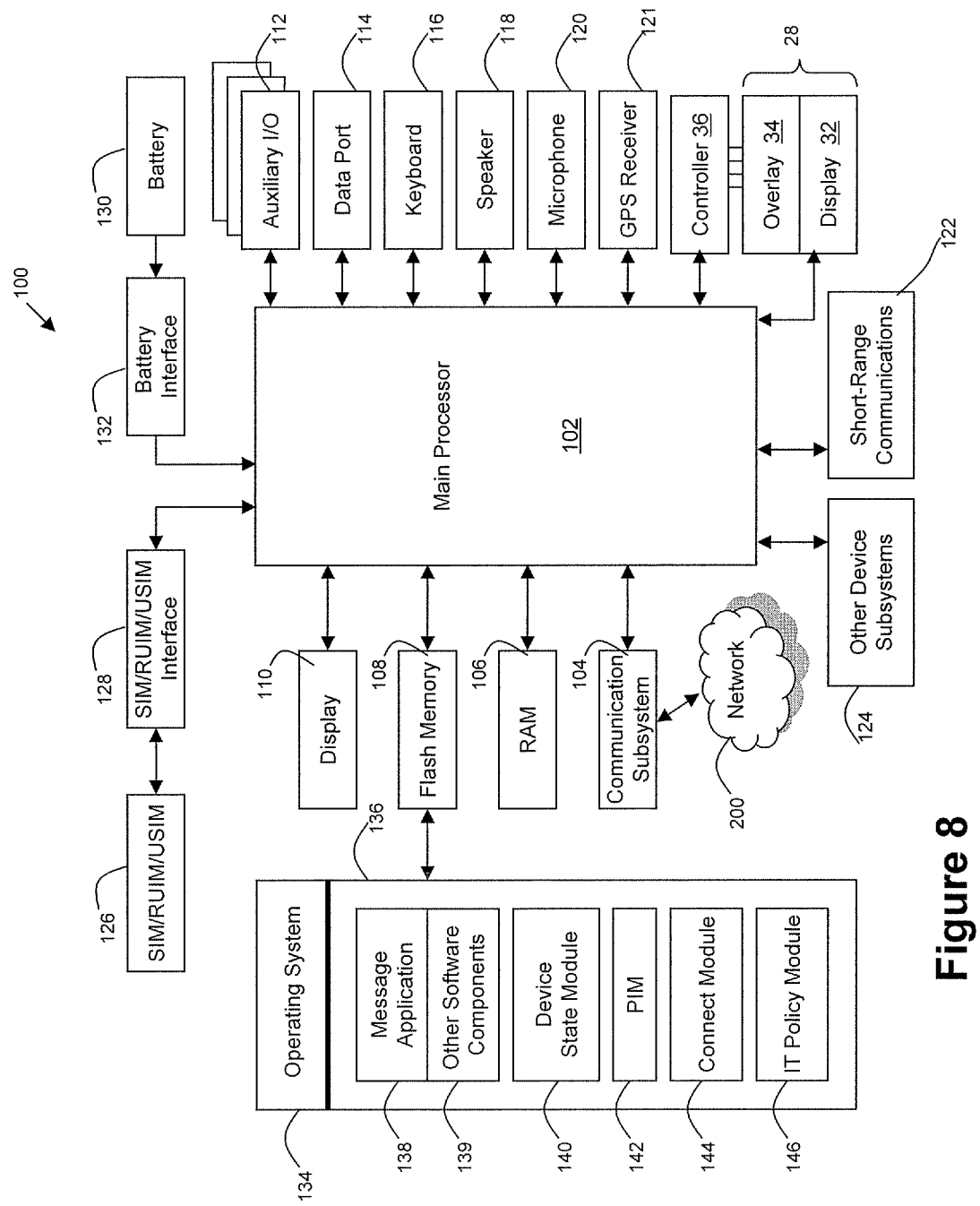
FIG. 8 is a block diagram of an exemplary embodiment of a mobile device.

Referring first to FIG. 8, shown therein is a block diagram of an exemplary embodiment of a mobile device 100. The mobile device 100 comprises a number of components such as a main processor 102 that controls the overall operation of the mobile device 100. Communication functions, including data and voice communications, are performed through a communication subsystem 104. The communication subsystem 104 receives messages from and sends messages to a wireless network 200. In this exemplary embodiment of the mobile device 100, the communication subsystem 104 is configured in accordance with the Global System for Mobile Communication (GSM) and General Packet Radio Services (GPRS) standards, which is used worldwide. Other communication configurations that are equally applicable are the 3G and 4G networks such as EDGF, UMTS and HSDPA, LTE, Wi-Max etc. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 100 is not fully operational for communication with the wireless network 200. Once the SIM/RUIM/USIM 126 is inserted into the SIM/RUIM/USIM interface 128, it is coupled to the main processor 102.

The mobile device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 100 during its manufacture. Software applications may include a message application 138, a device state module 140, a Personal Information Manager (PIM) 142, a connect module 144 and an IT policy module 146. A message application 138 can be any suitable software program that allows a user of the mobile device 100 to send and receive electronic messages, wherein messages are typically stored in the flash memory 108 of the mobile device 100. A device state module 140 provides persistence, i.e. the device state module 140 ensures that important device data is stored in persistent memory, such as the flash memory 108, so that the data is not lost when the mobile device 100 is turned off or loses power. A PIM 142 includes functionality for organizing and managing data items of interest to the user, such as, but not limited to, e-mail, text messages, instant messages, contacts, calendar events, and voice mails, and may interact with the wireless network 200. A connect module 144 implements the communication protocols that are required for the mobile device 100 to communicate with the wireless infrastructure and any host system 250, such as an enterprise system, that the mobile device 100 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 100. These software applications 139 can be pre-installed applications (i.e. other than message application 138) or third party applications, which are added after the manufacture of the mobile device 100. Examples of third party applications include games, calculators, utilities, etc.

The additional applications 139 can be loaded onto the mobile device 100 through at least one of the wireless network 200, the auxiliary I/O subsystem 112, the data port 114, the short-range communications subsystem 122, or any other suitable device subsystem 124.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

For composing data items, such as e-mail messages, for example, a user or subscriber could use a touch-sensitive overlay 34 on the display 32 that are part of the touch screen display 28, in addition to possibly the auxiliary I/O subsystem 122. The auxiliary I/O subsystem 112 may include devices such as: a mouse, track ball, infrared fingerprint detector, or a roller wheel with dynamic button pressing capability. A composed item may be transmitted over the wireless network 200 through the communication subsystem 104.

Figure 9:
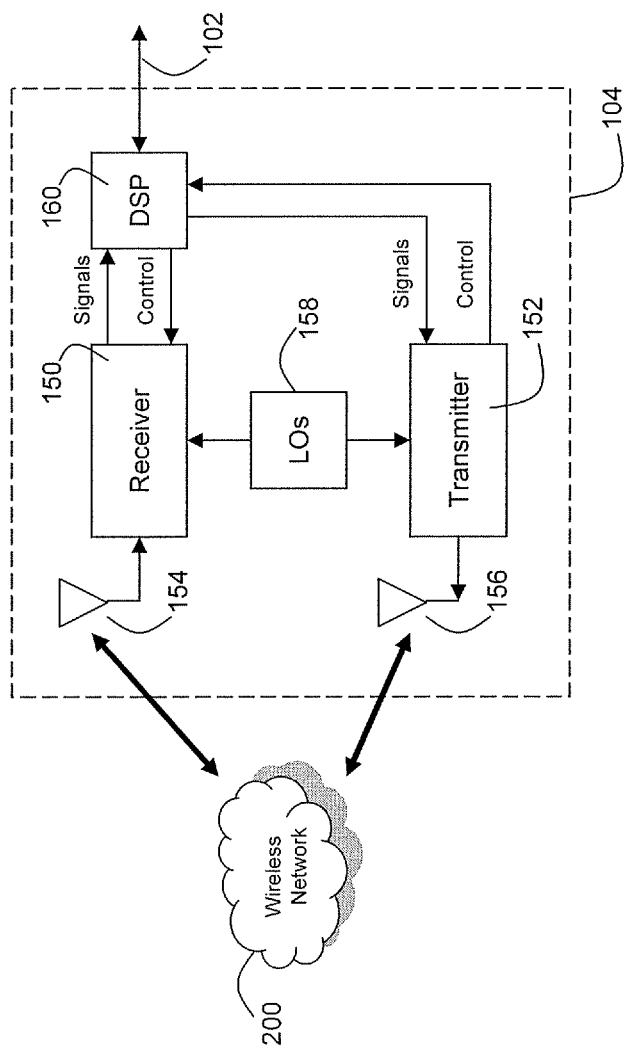
FIG. 9 is a block diagram of an exemplary embodiment of a communication subsystem component of the mobile device of FIG. 8.

Referring now to FIG. 9, an exemplary block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the mobile device 100 is intended to operate. Thus, it should be understood that the design illustrated in FIG. 9 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is transmitting to the wireless network 200 and is otherwise turned off to conserve resources. Similarly, the receiver 150 may be periodically turned off to conserve power until it is needed to receive signals or information (if at all) during designated time periods.

Figure 10:
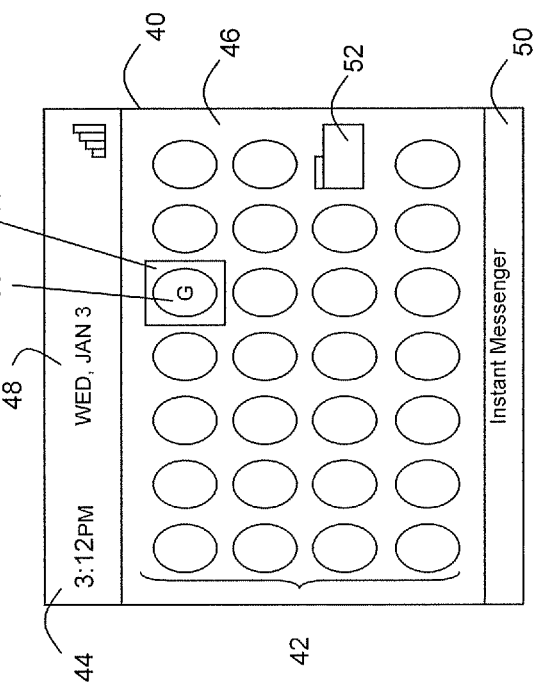
FIG. 10 is a screen shot of a home screen displayed by the mobile device.

Turning now to FIG. 10, the mobile device 100 in this example displays a home screen 40, which may be the active screen when the mobile device 100 is powered up and may constitute the main ribbon application. The home screen 40 generally comprises a status region 44 and a theme background 46, which provides a graphical background for the display 12. The theme background 46 displays a series of icons 42 in a predefined arrangement on a graphical background. In some themes, the home screen 40 may limit the number icons 42 shown on the home screen 40 so as to not detract from the theme background 46, particularly where the background 46 is chosen for aesthetic reasons. The theme background 46 shown in FIG. 10 provides a grid of icons. It will be appreciated that preferably several themes are available for the user to select and that any applicable arrangement may be used. One or more of the series of icons 42 is typically a folder 52 that itself is capable of organizing any number of applications therewithin.

The status region 44 in this embodiment comprises a date/time display 48. The theme background 46, in addition to a graphical background and the series of icons 42, also comprises a status bar 50. The status bar 50 provides information to the user based on the location of the selection cursor 18, e.g. by displaying a name for the icon 53 that is currently highlighted.

An application, such as a group application 54 (see also FIG. 1) may be initiated (opened or viewed) from display 12 by highlighting a corresponding icon 53 using the positioning device 14 and providing a suitable user input to the mobile device 100. For example, group application 54 may be initiated by moving the positioning device 14 such that the icon 53 is highlighted by the selection box 18 as shown in FIG. 10, and providing a selection input, e.g. by pressing the trackball 14b. Alternatively, in a mobile device 100c such as in FIGS. 6 and 7, an application may be initiated (opened or viewed) from a touch screen display 28 by executing a "click" touch event or "clicking" the touch screen display 28 at the X and Y position of the corresponding icon 53.

Figure 11:
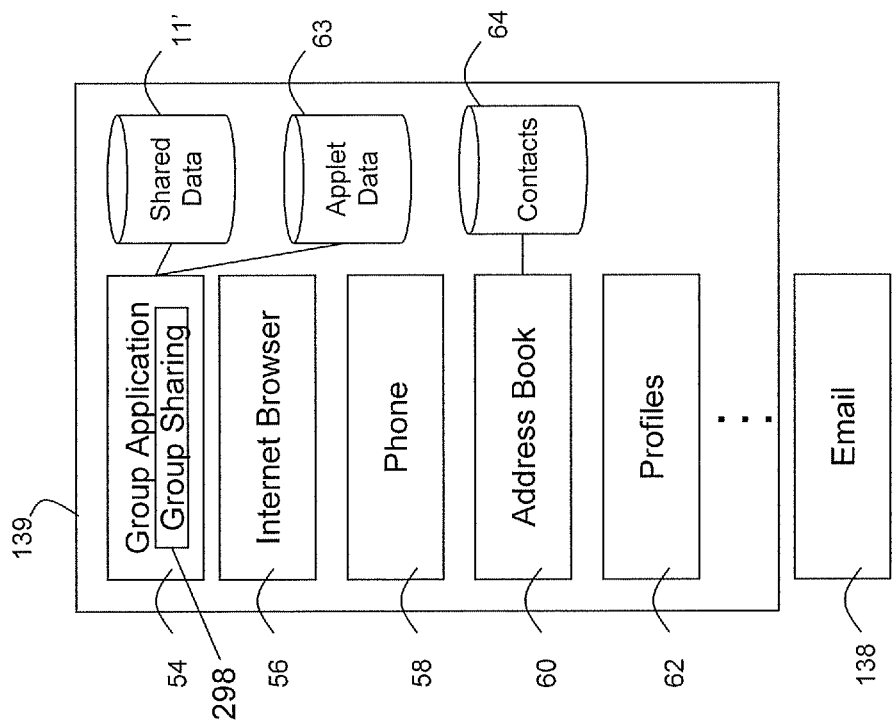
FIG. 11 is a block diagram illustrating exemplary ones of the other software applications and components shown in FIG. 8.

FIG. 11 shows an example of the other software applications and components 139 that may be stored on and used with the mobile device 100. Only examples are shown in FIG. 11 and such examples are not to be considered exhaustive. In this example, the group application 54, internet browser 56, phone application 58, address book 60 and a profiles application 62 are shown to illustrate the various features that may be provided by the mobile device 100. Also shown in FIG. 11 is the message application 138, which in the following will be referred to as an email application 138 for clarity. It will be appreciated that the various applications may operate independently or may utilize features of other applications. For example, the phone application 62 and email application 138 may use the address book 60 for contact details obtained from a list of contacts 64. Group application 54 manages a mobile device user's groups and the applets therefor using a group sharing module 298. Data for the graphical user interfaces (GUIs) of the group application 54 and the associated applets may be stored in a group application and applet database 63. It can be appreciated that a user may belong to multiple groups, as well as any number of subgroups for sharing private information with certain one or more other group members as discussed above. Group application 54 also comprises or otherwise has access to its current, local version of the shared data 11'. In the following examples, the suffix (') is used to indicate that the specific local version of the shared data 11' may not necessarily be completely up to date when compared to the conceptual set of shared data 11 to be maintained by the wider group 10, due to out of coverage and other situations. The shared data 11' may comprise data pertaining to one or multiple groups and thus multiple sets of shared data 11' may exist and may be included in one or more separate databases.

Figure 12:
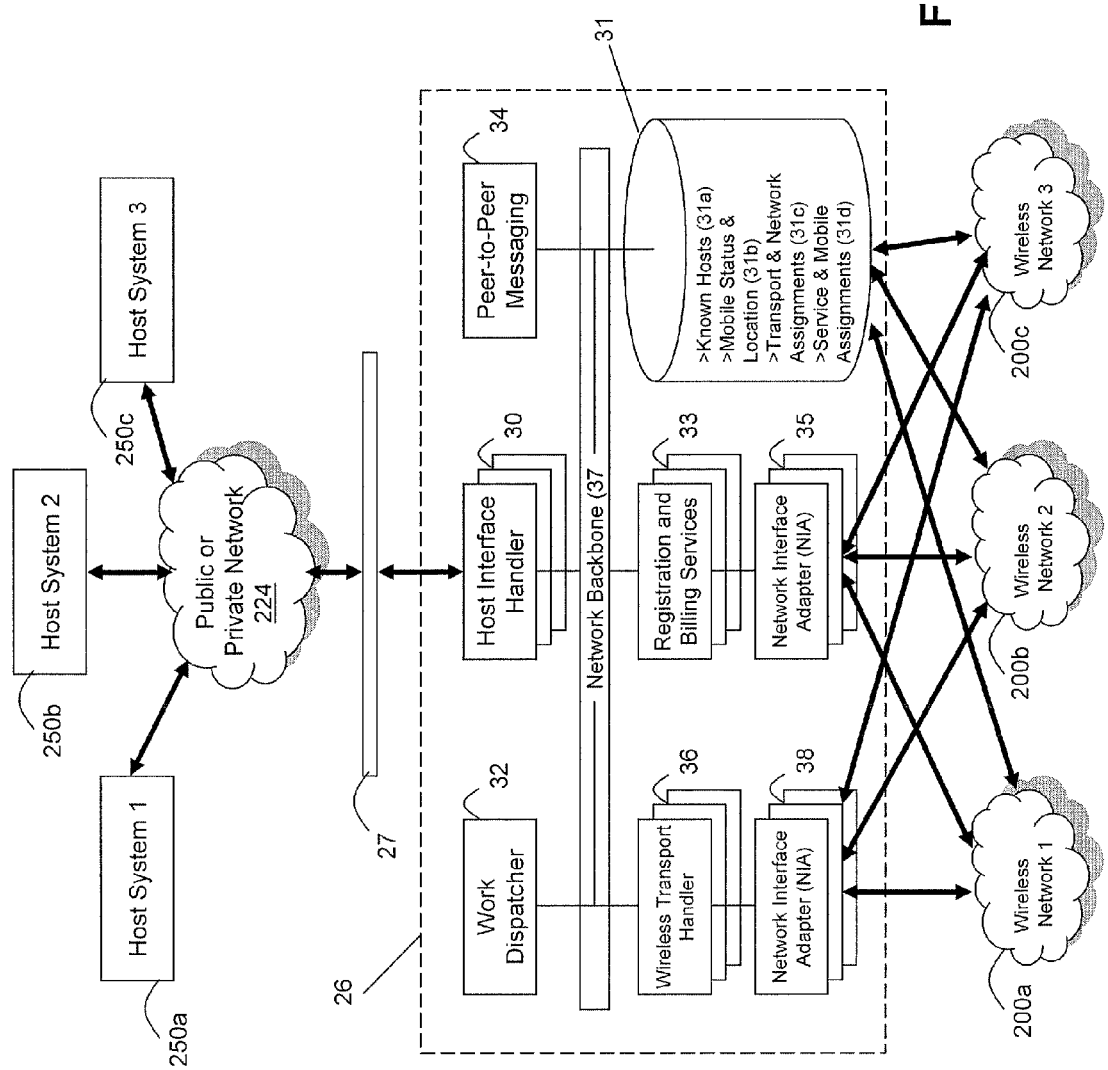
FIG. 12 is a system diagram showing further detail of the wireless router of FIG. 3.

Turning now to FIG. 12, an example block diagram of the wireless router 26 is shown. One component that is present but not directly part of the wireless router 26 is an Internet firewall 27, which may be off-the-shelf and would protect the wireless router 26 at a lower IP-layer type protocol. Once through the firewall, the host system 250 connects to one of a plurality of host interface handlers (HIHs) 30. There can be any number of HIHs depending on the number of hosts that are configured and required in the system. The HIH 30 uses various parts of the database 31 to confirm and register the incoming host connection. The known hosts 31a sub-component of the database provides a way of validating that the host is known and marking its state as 'present' once the host is connected and authorized. In one embodiment, once the host connection is established, a secure and authenticated point-to-point communication connection is ready for the exchange of data between the host system 250 or service and the wireless router 26. In one embodiment, there are a plurality of such communication connections between the wireless router 26 and a plurality of host systems 250 or services.

Another component, which works closely with the HIH 30 is called the wireless transport handler (WTH) 36. The WTH 36 takes responsibility for data item transfer to and from the mobile device 100. Depending on the load of traffic, and the number of mobile devices 100 in the system, there may be a plurality of WTH 36 components operating in the system. The network backbone 37, using something like a TIBCO queuing system, combined with the work dispatcher 32, allows each component of the system to scale as large as needed.

The next component is the network interface adapter (NIA) 38, which could have a communications link directly to the WTH 36, or the NIA 38 could be accessible via the network backbone 37. The NIA 38 provides the direct interface to the wireless network 200 being supported. Since many of the current wireless data networks 200 have unique communication connection requirements, this component can buffer the other wireless router components from many of the specific nuances of the particular wireless network it is in communication with. The NIA 38 may be used to isolate the WTH 36 from much of the details of communication links and physical interface requirements of each wireless network 200. There could be any number of wireless networks 200, all with their own connection methods. In some it could be a proprietary protocol over X.25, like the Mobitex or Datatac networks. In other it could be a proprietary protocol over TCP/IP, like newer version of the Datatac network. In other cases, it could be an IP connection, supporting either a TCP or UDP data exchange method, like the CDMA, W-CDMA, and GPRS networks.

To further enhance the wireless router 26 there may be other support components that could either exist separate, or be built into a single component. The first of these is the work dispatcher 32. One of the functions of the work dispatcher 32, is to assign a specific WTH 36 to a mobile device 100 so that all data items are routed through the same WTH 36. If a WTH 36 fails, the work dispatcher 32 finds a new WTH 36 to take its place. Additionally, if one WTH 36 becomes too busy or is handling an undesirably large traffic load, the work dispatcher 32 can assign data items that are to be routed to the mobile devices 100 to instead round robin to multiple WTHs 36. This is one example of how the fault tolerant and scalable system is built, and a fault tolerant queuing system like TIBCO may solve this problem very easily. In the other direction, the work dispatcher 36 finds the correct HIH 30 to accept data items from mobile devices 100. Since a host system 250 may connect to any HIH 30, the work dispatcher 36 finds the HIH 30 that has responsibility for or is associated with the host-router communication connection initiated by the correct host system 250, and routes the data appropriately.

Another component in the wireless router 26 that is shown is the peer-to-peer (P2P) messaging component 34. This component provides peer-to-peer message routing facility, which allows mobile devices 100 to send directly to one or more other mobile devices 100, e.g. multi-cast messages. The P2P component 34 can perform the functions similar to an Instant Messaging gateway, but in this case for mobile devices 100. In some networks, where the mobile's identity might not be static, a mobile device 100 cannot easily send a message to another mobile device 100. In other networks SMS (short message service) solves this problem and provides a limited 160 character data exchange. The wireless router 26 may have a store and forward structure that permits it to offer SMS and wireless messaging simultaneously to all wireless devices 100.

Registration and billing are two other components 33 that have been combined into one area. These two components could be separated or merged, it is the functionality that is important. Registration involves keeping track of all valid mobile devices 100 and tracking their location when they make major wireless network 200 changes. These changes are propagated to the associated database 31 and used by the work dispatcher 32 for important work assignment decisions. For example if a mobile device 100 travels to another country it might be necessary to move the responsibility of data item delivery to another WTH 36 component. As part of the registration function, the user of the mobile device 100 may be provided with added security. Services and mobile devices must be registered and authenticated before they can exchange data.

The billing component keeps a running tally of the services and amounts of data exchanged between each host system 250 and each mobile device 100. The billing component receives messages via the network backbone 37. For example by using a TIBCO architecture it would be possible to broadcast billing messages to a group of billing components 33. Depending on the load of traffic multiple billing components 33 could be processing and saving the billing information to the database 31. Each record could have lots of information pertinent to generating complex and relevant billing information. For example it might be possible to save the size of the data exchanged, the time of day, the duration, the type of service access and other key pricing elements.

Figure 13:
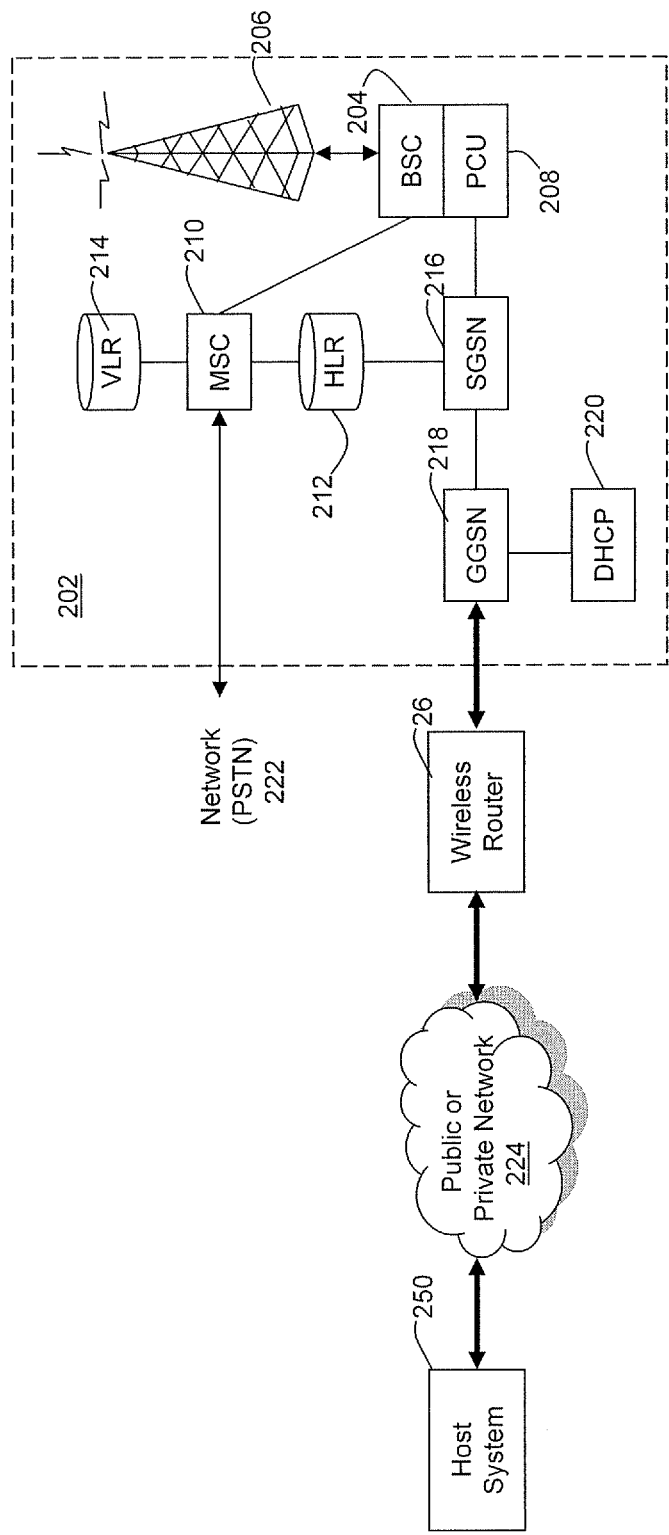
FIG. 13 is an exemplary block diagram of a node of the wireless network shown in FIG. 3.

Referring now to FIG. 13, a block diagram of an exemplary implementation of a node 202 of the wireless network 200 is shown. In practice, the wireless network 200 comprises one or more nodes 202. In conjunction with the connect module 144, the mobile device 100 can communicate with the node 202 within the wireless network 200. In the exemplary implementation of FIG. 13, the node 202 is configured in accordance with GPRS and GSM technologies however the principles may equally be applied to other technologies such as CDMA and future 3G and 4G technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the mobile device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile device 100 is not using its PDP Context, the PDP Context can be de-allocated and the IP address returned to the IP address pool managed by the DHCP server 220.

Figure 14:
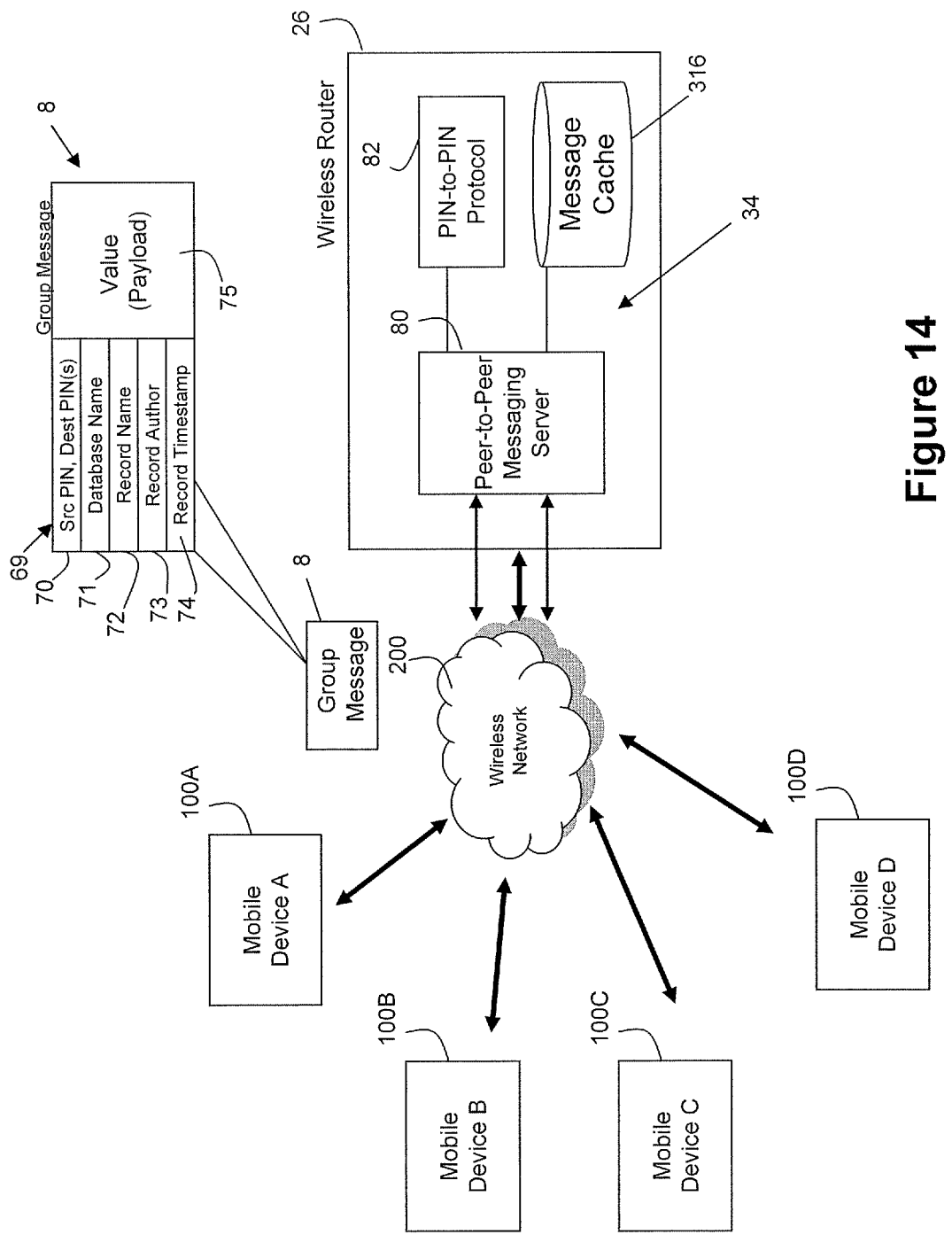
FIG. 14 is a system diagram illustrating an exemplary configuration for peer-to-peer (P2P) messaging between a group of mobile devices.

Turning now to FIG. 14, a configuration suitable for users of mobile device A, B, C, and D; hereafter referred to as mobile devices 101a, 101b, 100c, and 100d to exchange group messages 8 through a message exchange service already being used by such devices, in this example through the wireless router 26. It can be seen in FIG. 14 the wireless router 26 in this example hosts a peer-to-peer messaging server 80, which utilizes a PIN-to-PIN protocol 82 and a message cache 316, all of which can be considered components of the peer-to-peer messaging component 34 shown in FIG. 2. In the embodiment illustrated in FIG. 14, personal identification numbers (PINs) are used to address the group messages 8. Such a PIN-based messaging system is implemented using a server-based communication infrastructure, such as one that provides email, SMS, voice, Internet and other communications. Particularly suitable for hosting a peer-to-peer messaging server 80, is the wireless router 26 used in systems such as those shown in FIG. 3. In FIG. 14, the wireless router 26 also facilitates communications such as instant messaging between mobile devices 100a, 100b, 100c and 100d. It will be appreciated that the number of users participating in the example shown in FIG. 14 is for illustrative purposes only. The sharing of group data 11 is provided by the group application 54 stored on each mobile device 100a-100d, which can be initiated from the home screen 40, for example, by highlighting and selecting the "G" icon 53 as illustrated in FIG. 10. The wireless router 26 routes group messages 8 between the mobile devices 100a-100d according to the PIN-to-PIN protocol 82.

A PIN-to-PIN based group message is generally denoted by numeral 8 in FIG. 14, and illustrates an example of a complete structure for the group messages 8 shown in FIG. 1. It will be appreciated that a similar structure can be used for private messages 8*a*. In a PIN-based messaging protocol 82, each message 8 has associated therewith a PIN corresponding to the mobile device 100 which has sent the message 8 (source) and includes a destination PIN identifying each intended recipient (destination(s)). Further detail of an example structure for the group messages 8 is also shown in FIG. 14. Each group message 8 generally comprises a body 75, which contains the value 94 for the record 92 being updated (payload), and a header 69, which contains various fields used for transmitting and processing each group message 8. In this example, the header 69 includes a source (src) and destination (dest) field 70 comprising the PIN for the sender and PIN(s) for the recipient(s), a database name field 71 to specify the database 90 into which the record 92 is to be inserted, a record name field 72 to specify the name of the record 92 which is being created or updated, a record author field 73 to identify the author or "owner" of the change or addition being made, and a record timestamp field 74 to indicate the time (and if desired, the date) at which the record 92 being sent was added, updated, changed, modified, etc. It may be noted that the record author field 73 can be used to establish who made what changes and additions to the shared data 11 such that if a new member joins the group 10, the responsibility for sending records 92 to the new member can be split amongst all the of group members according to author (exemplified later, see also FIGS. 33 and 34).

In general, in a PIN based messaging protocol 82, the sender of the group message 8 knows the PIN of the intended recipient(s) and there are various mechanisms that can be employed to determine PIN messages for other members, e.g. through the host system 250, via email exchange, etc. According to the configuration shown in FIG. 14, mobile device 100*a* can communicate directly with any of the mobile devices 100*b*-100*d* either individually or collectively, through the peer-to-peer messaging server 80. When conducting a PIN-to-PIN exchange according to the embodiment shown in FIG. 14, the mobile devices 100*a*-100*d* can communicate directly with the wireless router 26 in a client based exchange where, similar to other peer-to-peer programs, an intermediate server is not required. A group message 8 sent by one mobile device 100 is received by the wireless router 26, which obtains the PIN number for the intended recipient(s) from information associated with the group message 8 (e.g. a data log) or from the group message 8 itself. Upon obtaining the recipients' PINs according to the PIN-to-PIN protocol 82, the wireless router 26 then routes the group message 8 to all intended recipients associated having such PINs. The wireless router 26 typically also provides a delivery confirmation to the original sender, which may or may not be displayed to the user, and the mobile device 100 can use an exchange of messages pertaining to in and out of coverage situations to update presence information on the mobile device 100. The destination device can also provide such delivery information. The wireless router 26 should be capable of routing group messages 8 reliably and hold onto the group messages 8 until they are successfully delivered. Alternatively, if delivery cannot be made after a certain timeout period, the wireless router 26 may provide a response indicating a failed delivery. The wireless router 26 may choose to expire a group message 8 if a certain waiting period lapses. In such cases, the mobile device 100 may then choose whether or not to resend the group message 8.

It will be appreciated that the principles discussed below are equally applicable to both PIN-to-PIN messaging and other Internet service-based instant messaging systems hosted by $3^{rd}$ parties.

Figure 15:
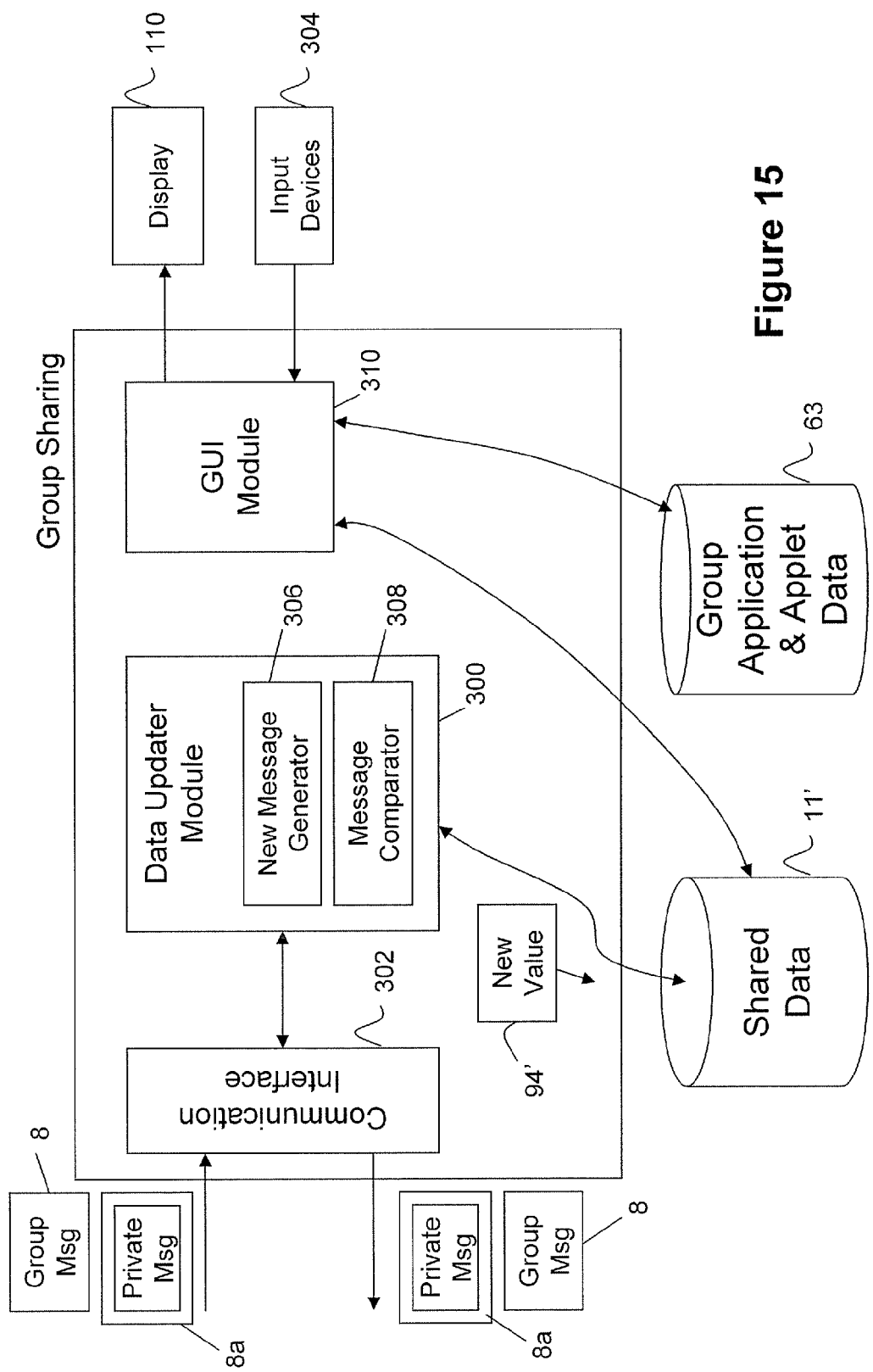
FIG. 15 is an exemplary block diagram of the group sharing application shown in FIG. 11.

One example configuration for the group sharing module 298 is shown in FIG. 15. The group sharing module 298 comprises or otherwise has access to the mobile device's locally stored copy of the shared data 11', and comprises or otherwise has access to the mobile device's group application and applet database 63. As noted above, the group application and applet database 63 comprises any information, settings, or other data that is relevant to the way in which the records 92 are used in the corresponding applet provided by the group application 54. It can be appreciated that the applet database 63 is shown as a separate database for illustrative purposes only and may instead be maintained within the shared data 11' or elsewhere. The group sharing module 298 comprises a data updater module 300 for receiving or obtaining new group messages 8 and new private messages 8*a* (if applicable), examining the new messages 8, 8*a* for collisions with other recent updates, and updating the shared data 11' by replacing the currently stored record 92 with a new record 92' when appropriate. The data updater module 300 in this example also enables the mobile device 100 on which it resides to generate its own group messages 8 and private messages 8*a* (if applicable) when updates are made locally. The data updater module 300 may send, receive or otherwise obtain or provide messages 8, 8*a* using a communication interface 302, which in this example is configured to access and utilize the communication subsystem 104 (see also FIG. 8).

The data updater module 300 comprises a new message generator 306, which is a sub-routine, sub-module, or feature for generating new messages 8, 8*a*; and comprises a message comparator 308, which is a subroutine, sub-module, or feature for processing incoming messages 8, 8*a* and resolving collisions between locally generated updates and recently received updates generated by other members of the group. The data updater module 300 in this example runs in the background to maintain the most up-to-date copy of the shared data 11' and to resolve collisions between record 92 updates as they arise. The message generator 306 may also be used to generate in and out of coverage messages and process ackowledgements from other members to determine delivery success. The group sharing module 298 comprises a graphical user interface (GUI) module 310 for displaying various ones of the applets available through the group application 54 using the group application and applet data 63 and by populating such applets using the shared data 11'. The GUI module 310 enables a user to select a desired one of the applets, which then instructs the processor 102 to initiate and display a GUI for that particular applet, in part by communicating with the display 110. Various ones of the input devices described above (e.g. trackball 14*a*, 14*b*, keyboard 12, touchscreen 28, etc.) can be used to view, edit, update and otherwise interact with the group application applets and thus the shared data 11', and may hereinafter be commonly denoted by reference numeral 304.

The group sharing module 298 may therefore be used by the group application 54 to initiate and display applet GUIs, to process and handle incoming and outgoing messages 8, 8*a*, and to handle incoming and outgoing in and out of coverage messages (to be explained below). Several example scenarios for handling the exchange of group messages 8 and private messages 8*a* are shown in FIGS. 16 to 18.

FIG. 16(*a*) illustrates a single update for the entire group 10 shown in FIG. 1(*a*). FIG. 16(*b*) illustrates a single update for the private sub-group 10*a* shown in FIG. 1(*b*). In the following examples, each member A, B, C, D is associated with a respective mobile device 100*a*, 100*b*, 100*c*, and 100*d*. In the scenario shown in FIG. 16(*a*), mobile device 100*a* processes a locally generated update, e.g. adding an appointment to a group calendar, by generating a common group message 8 using the new message generator 306. The group message 8 identifies either a group number or in this example, the PIN number for each other member in the group (members B, C, and D in this example) and sends the group message 8 to the other mobile devices 100b, 100c, and 100d via the message exchange service which in this example is provided by the peer-to-peer server 80. The peer-to-peer server 80 is able to then send copies of message 8 to each of members B, C, and D as it would normally do for other PIN-to-PIN type messages, i.e. provides a multicast to the group 10. At this point in time, the update made to the shared data 11' at mobile device 100a is repeated at each of the other members since each mobile device 100b, 100c, 100d comprises a data updater module 300 having a message comparator 308 to process the new incoming message 8 and to update their local copy of the shared data 11' by writing a new record 92' thereto.

Figure 16B:
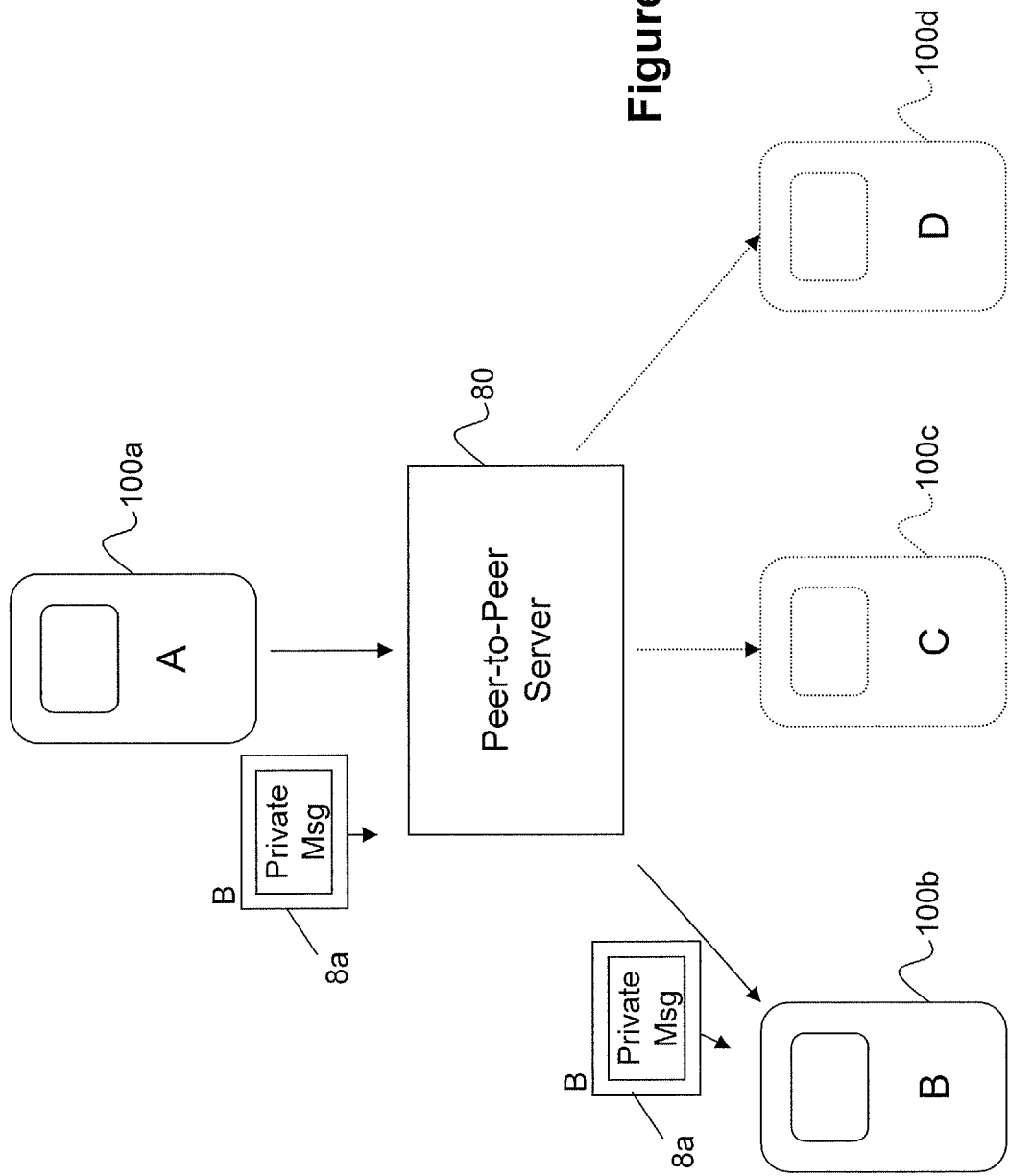

As shown in FIG. 1(b), members A and B are part of a private sub-group 10a having a set of private shared data 11a. FIG. 16(b) illustrates the distribution of an update or addition to the private shared data 11a via a private message 8a, which is addressed and sent only to the other member in the private group 10a, in this example mobile device 100b associated with member B. This enables member A to update one particular piece of information or datum accessible to the entire group 10 while updating other private information to only member B. For example, member A may wish to update the family calendar with the date for visiting relatives but exchange gift ideas for the kids with only their spouse, member B.

Figure 17A:
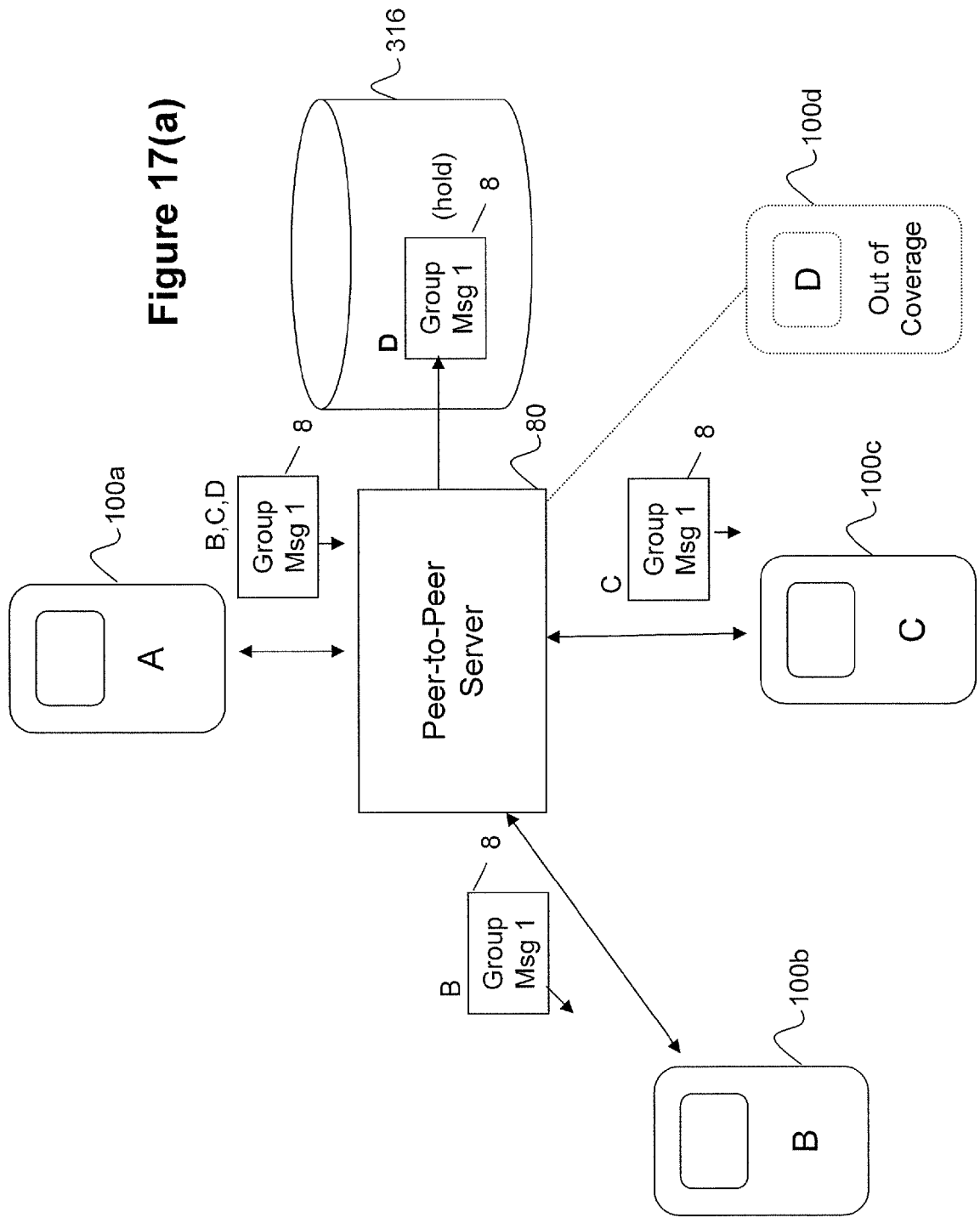
FIGS. 17(a) to 17(c) are a series of flow diagrams illustrating acknowledgement of delivery of a group message and illustrating holding a message for an "out of coverage" scenario.
Figure 17B:
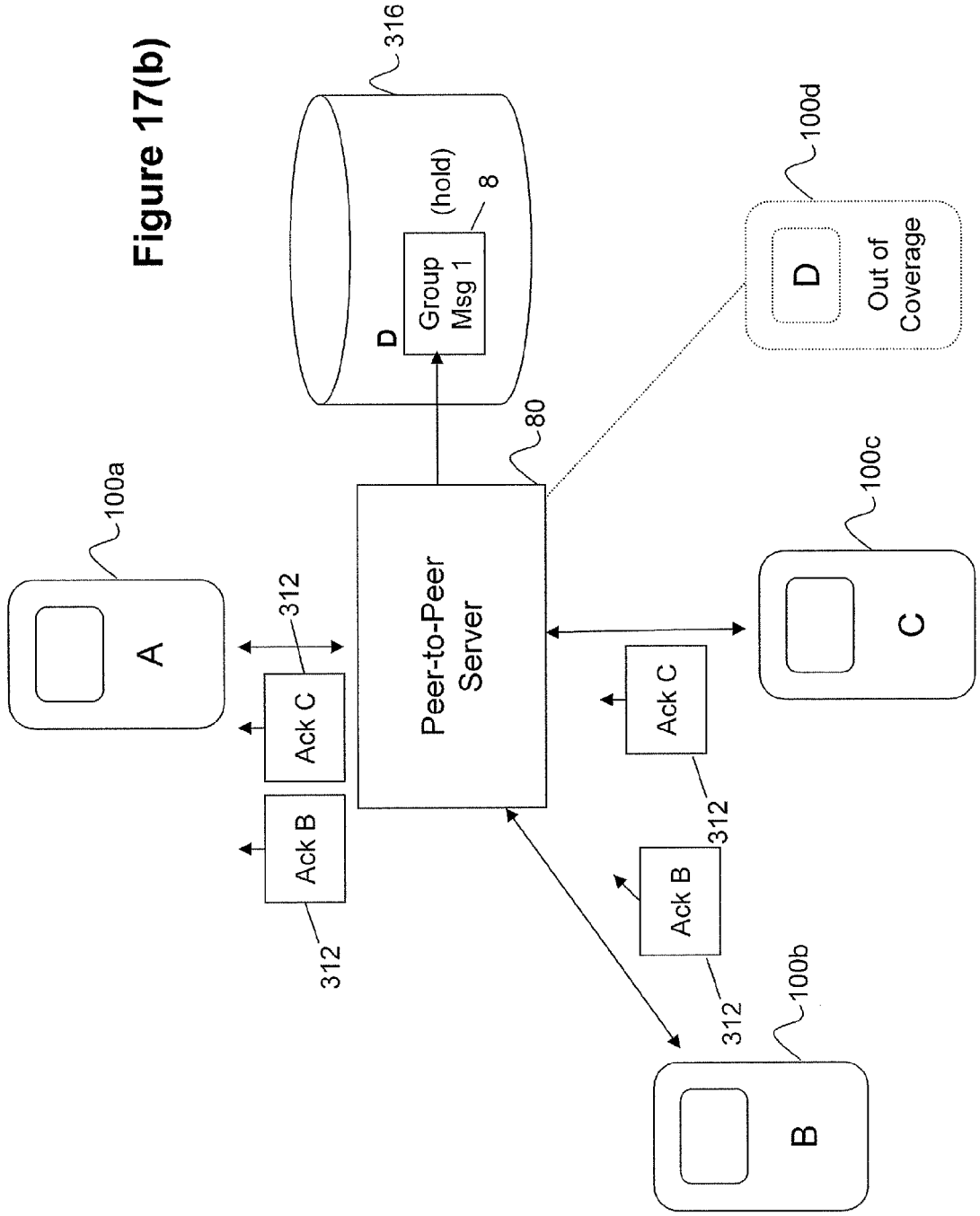
Figure 17C:
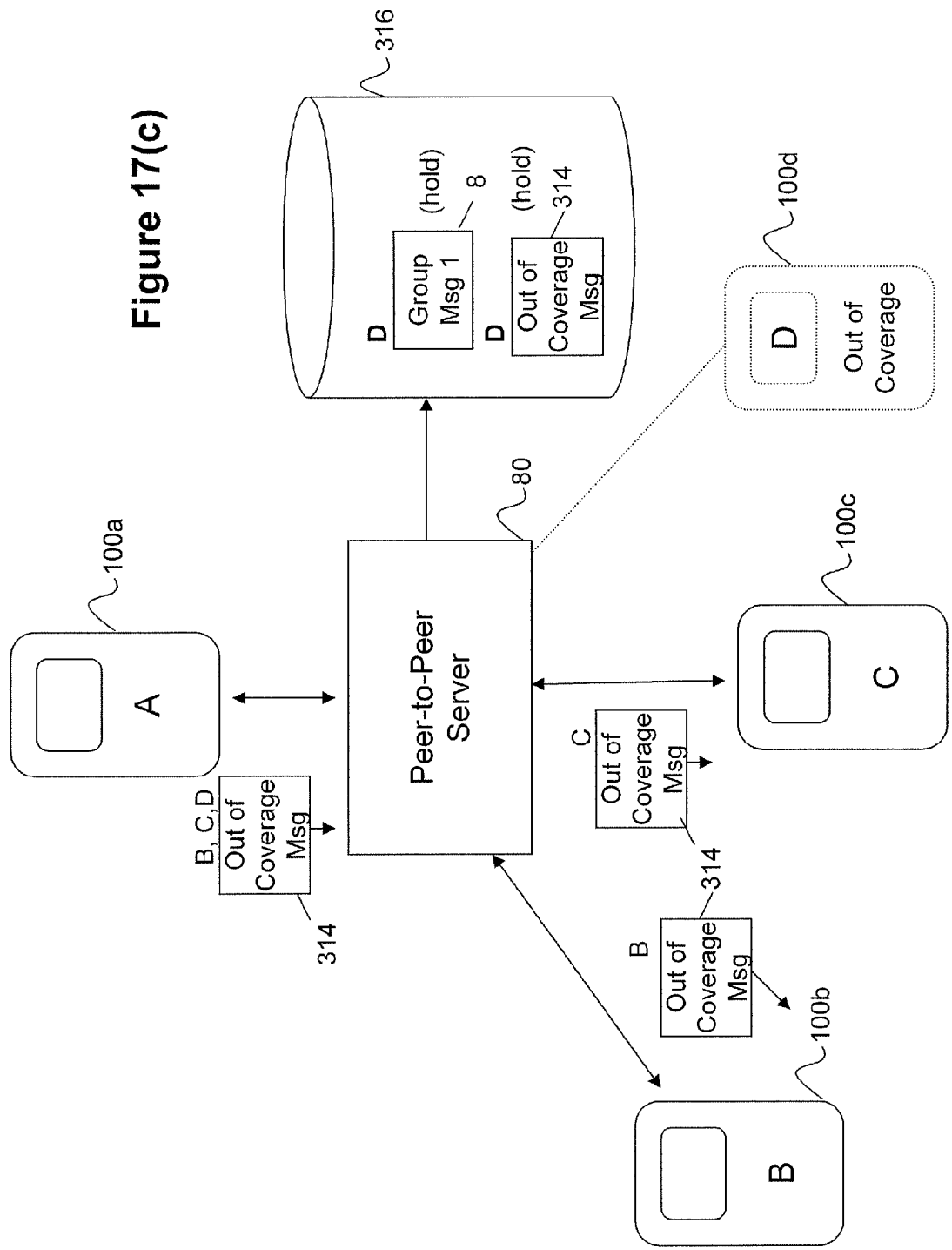

FIGS. 17(a) to 17(c) illustrate another scenario, which deals with an out-of-coverage situation for one of the members, and also illustrates the use of acknowledgement (Ack) messages 312 to broadcast out-of-coverage update messages 314 to other members of the group 10 without requiring the peer-to-peer server 80 to necessarily track or be responsible for such information. In the scenario illustrated in FIG. 17(a), group member A again generates an update to the shared data 11a' and sends Group Msg 1 to the group 10, i.e. by addressing the message 8 to members B, C, and D. The peer-to-peer server 80 determines which of the mobile devices 100 for the intended recipients are in coverage. In this example, the peer-to-peer server 80 determines that members B and C are in coverage but that group member D, i.e. mobile device 100d is out-of-coverage as indicated in FIG. 17(a) by the dashed lines. In this case, Group Msg 1 can be sent to both mobile device 100b and mobile device 100c but, since mobile device 100d is out-of-coverage, the peer-to-peer server 80 stores or "holds" a copy of Group Msg 1 for member D in message cache 316. As will be shown in FIG. 18, upon mobile device 100d coming back into coverage, the peer-to-peer server 80 is then able to forward the stored message 8 to mobile device 100d. In other words, the existence of the peer-to-peer server 80, which in this example already exists for communications between mobile devices 100 via the wireless network 200, can be taken advantage of to "store-and-forward" the group messages 8 to enable the group 10 to tolerate out-of-coverage situations such as that shown in FIG. 17.

In some embodiments, the peer-to-peer server 80 and mobile devices 100 are configured to require Ack messages 312 upon successful delivery of the group messages 8. In the example shown in FIG. 17(b), the peer-to-peer server 80 would relay Ack messages 312 generated and sent by member B and member C, wherein the absence of an Ack message from member D would provide an indication to mobile device 100a that mobile device 100d is out-of-coverage. In this case, as shown in FIG. 17(c), an out of coverage message 314 can be generated and sent back to mobile device 100b, mobile device 100c, and mobile device 100d, wherein if mobile device 100d is still out of coverage as shown in FIG. 17(c), the peer-to-peer server 80 holds the out of coverage message 314 for mobile device 100d until they come back into coverage. The out of coverage information can be used by the mobile devices 100 to track presence, e.g., to update the UI to show that member D is not in coverage and thus will not receive a message, e.g. in a messaging conversation.

Figure 18A:
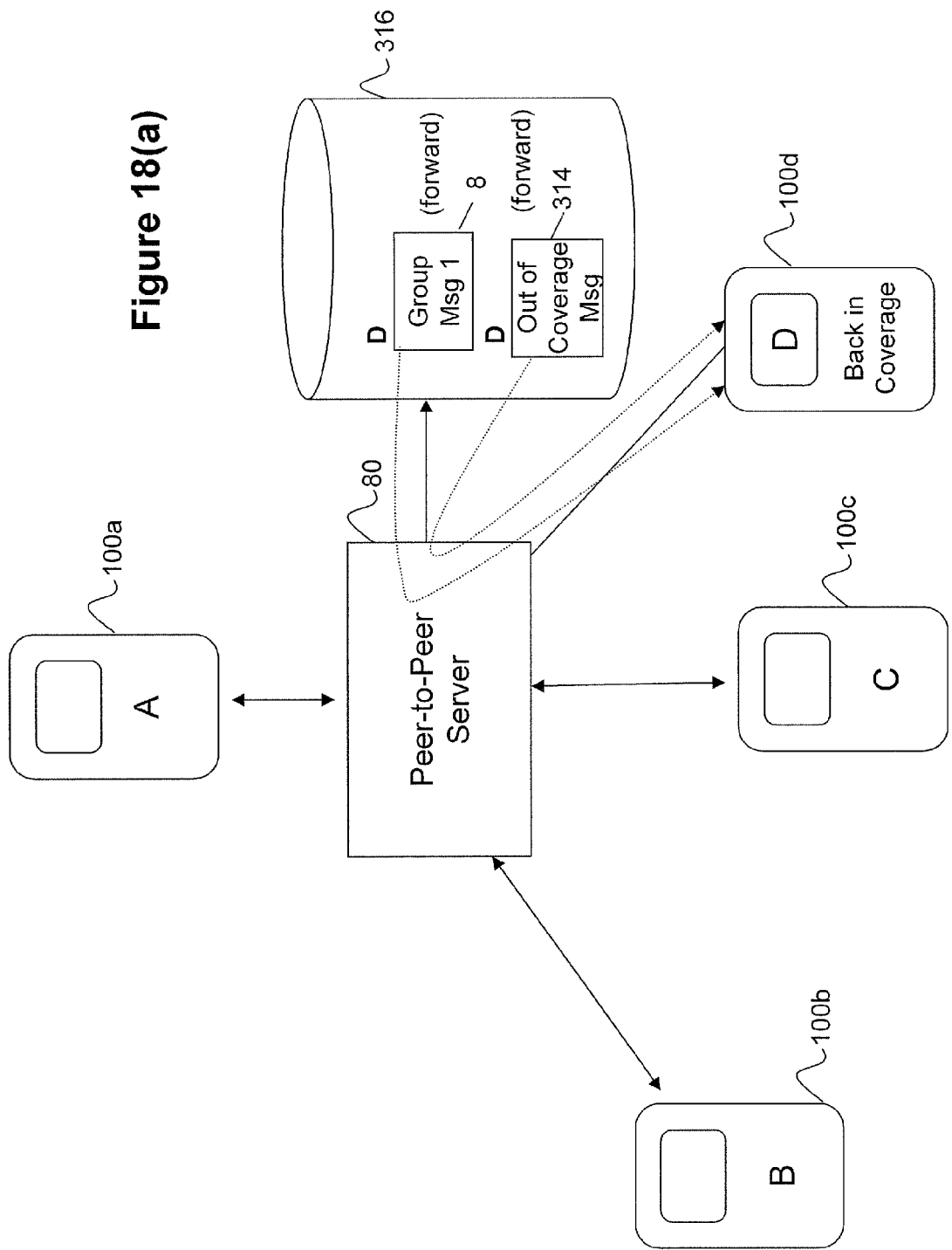
FIGS. 18(a) to 18(c) are a series of flow diagrams illustrating forwarding held messages in a "back in coverage" scenario and subsequent delivery of a new group message by the back in coverage mobile device.
Figure 18B:
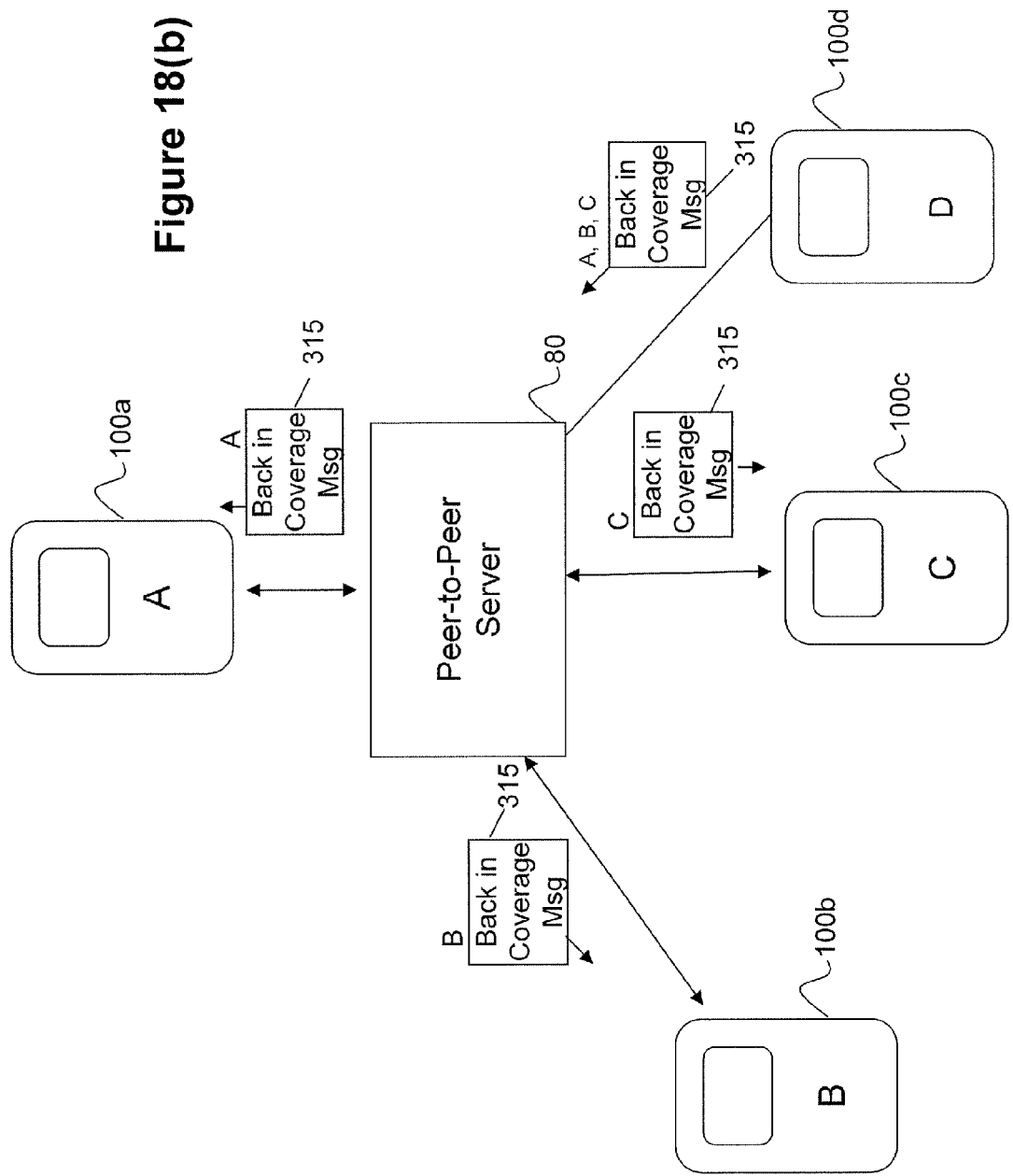
Figure 18C:
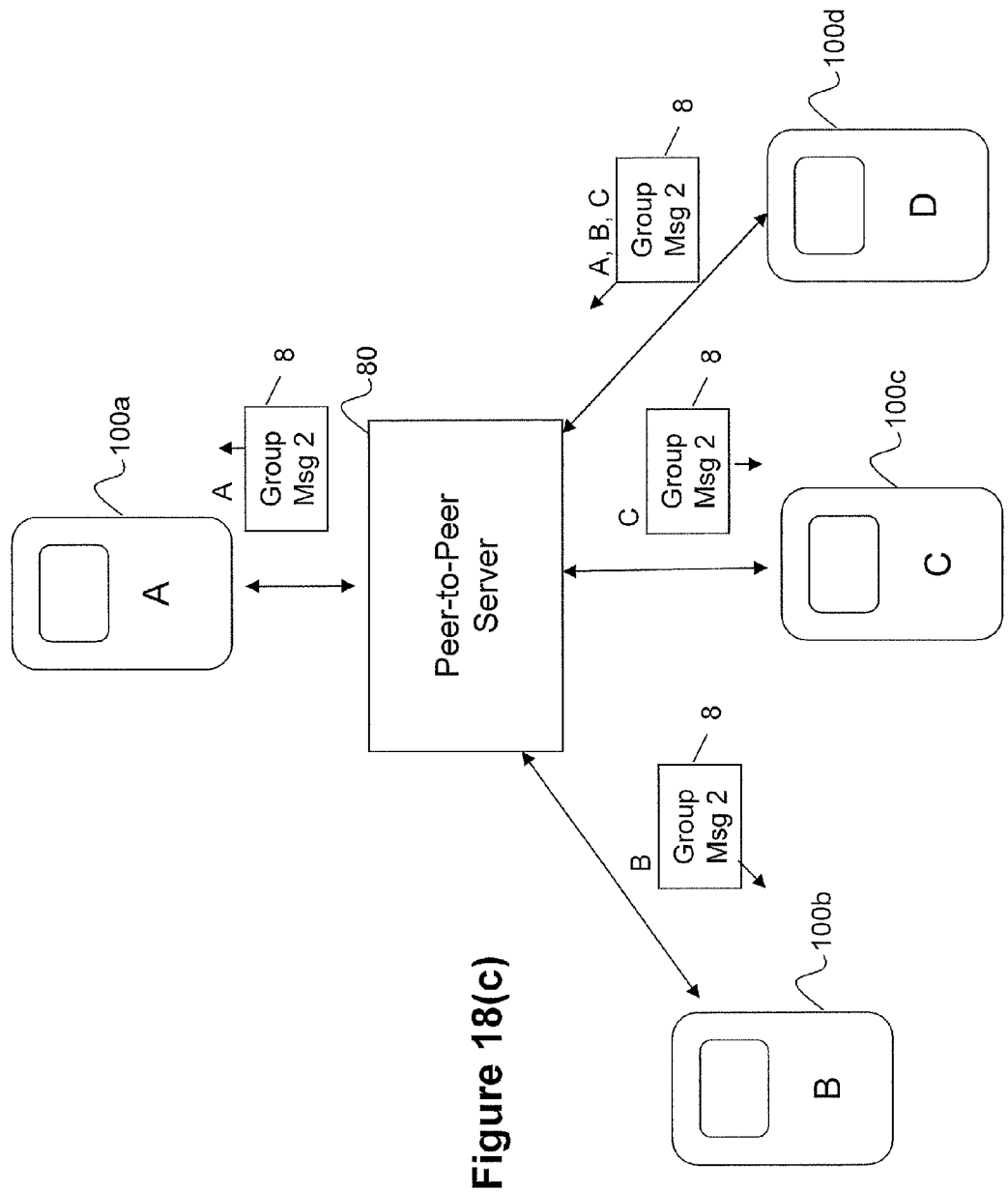

Turning now to FIG. 18(a), at this time, the peer-to-peer server 80 has determined that mobile device 100d is back in coverage and thus is able to forward Group Msg 1 and the out of coverage message 314 being held in the message cache 316 to mobile device 100d. In this example, upon detecting receipt of the Out of Coverage message 314, the mobile device 100d determines that some other user had at some point determined that they were out of coverage. Mobile device 100d may then generate and send a back in coverage message 315 addressed to the other members of the group 10, which would be relayed to the respective mobile devices 100 as shown in FIG. 18(b). In this way, mobile device 100d is able to notify the group that 10 that they are back in coverage, e.g. for updating presence identifiers, etc. Mobile device 100d would then process and update the shared data 11' and GUIs taking into account the new messages. FIG. 18(c) illustrates a further update generated by mobile device 100d and sent as Group Msg 2, which is possible now that mobile device 100d is back in coverage. When out of coverage situations arise, the chance of a collision occurring may rise since there is a higher likelihood that group messages 8 are sent but not delivered to the mobile device 100 while it is out of coverage. If a collision occurs, the mobile device 100 can utilize a collision resolution scheme, to be described below, to overwrite the corresponding record 92 with a preferred one of the updates, determined according to certain criteria.

Figure 19B:
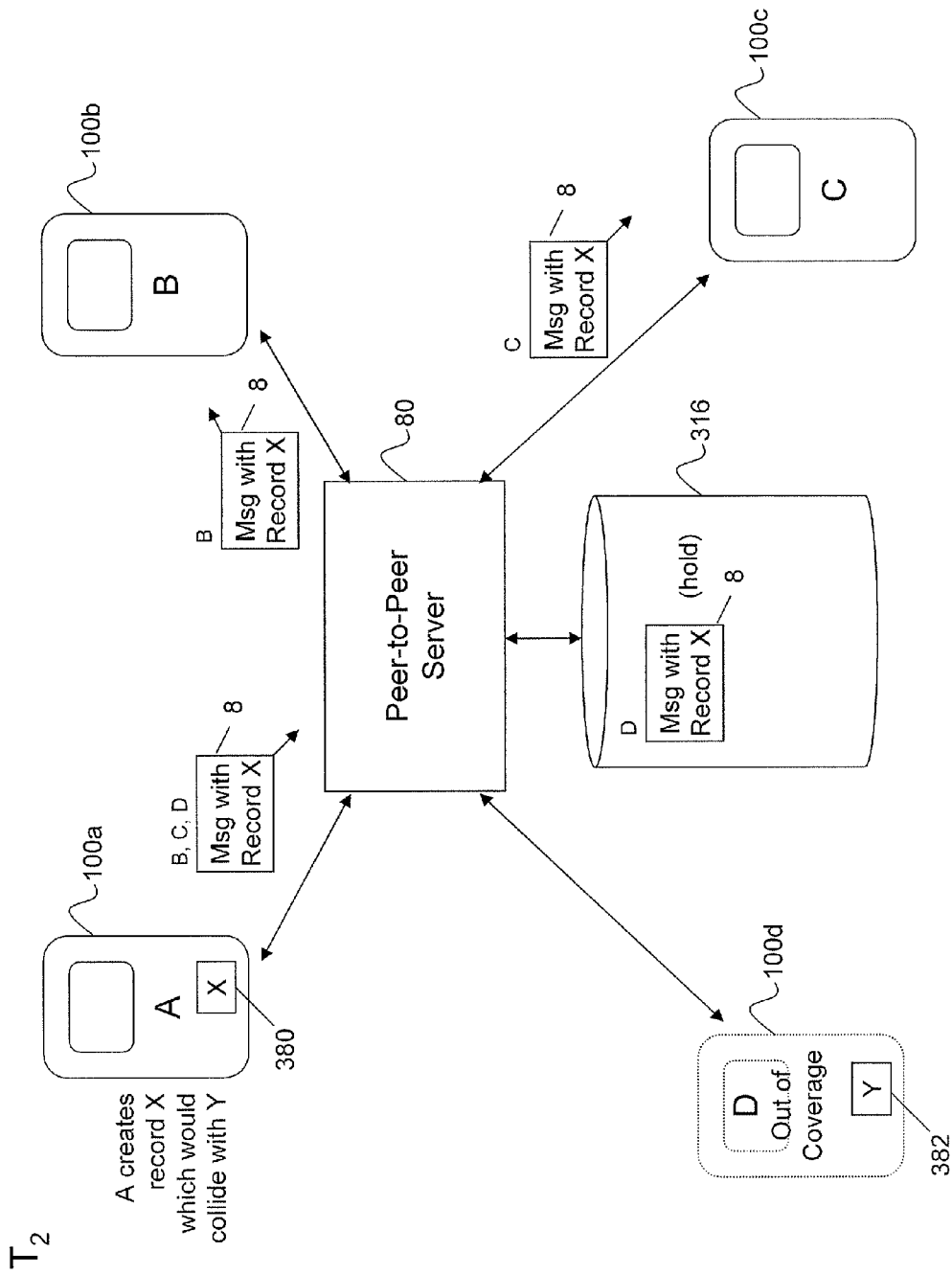

FIGS. 19(a) to 19(f) illustrate an example of a collision resolution. Turning first to FIG. 19(a), in this scenario at $T_1$, while mobile device 100d is out of coverage, member D generates or modifies a record Y 382, which may comprise generation of a new record Y or modification of a new record Y. However, this change cannot be distributed to the rest of the group 10 at this time due to mobile device 100d being out of coverage. In FIG. 19(b), at $T_2$, member A makes a modification X 380 to their local copy of the shared data 11', which may comprise generation of a new record X or modification of a new record X and which would collide with modification Y 382. For example, wherein modification X is an appointment at 9:00 am on May $4^{th}$ set by member A, and modification Y comprises a different appointment at the same time. A group message 8 comprising the modification X 380 is then sent to the peer-to-peer server 80 and the group message 8 is relayed to member B and member C but held for member D since in this case mobile device 100d is determined to be out of coverage. In FIG. 19(b), members A, B, and C have modification X 380 residing on their respective mobile devices 100, e.g. in the shared data 11', while member D has modification Y 382.

Figure 19C:
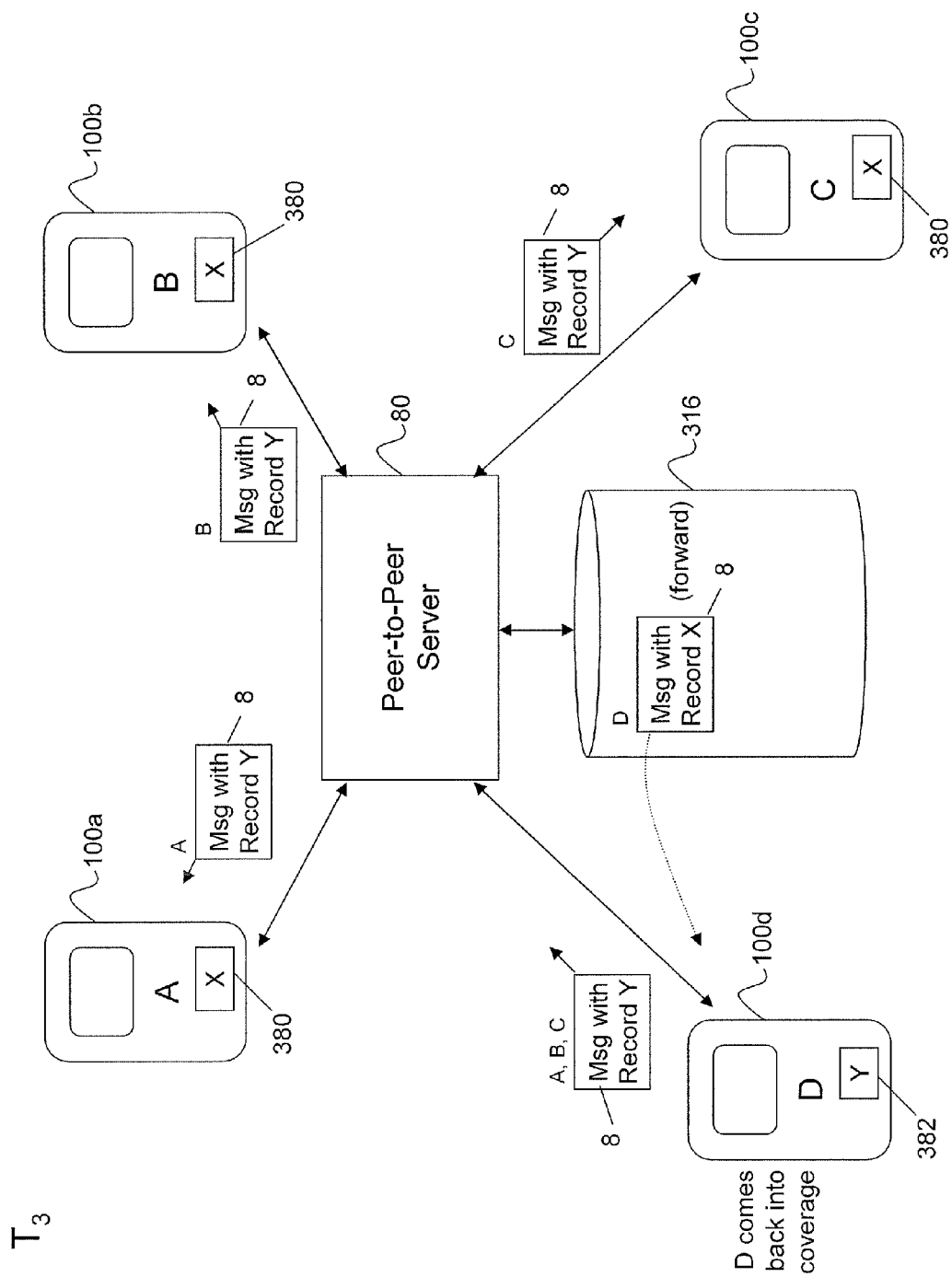
Figure 19D:
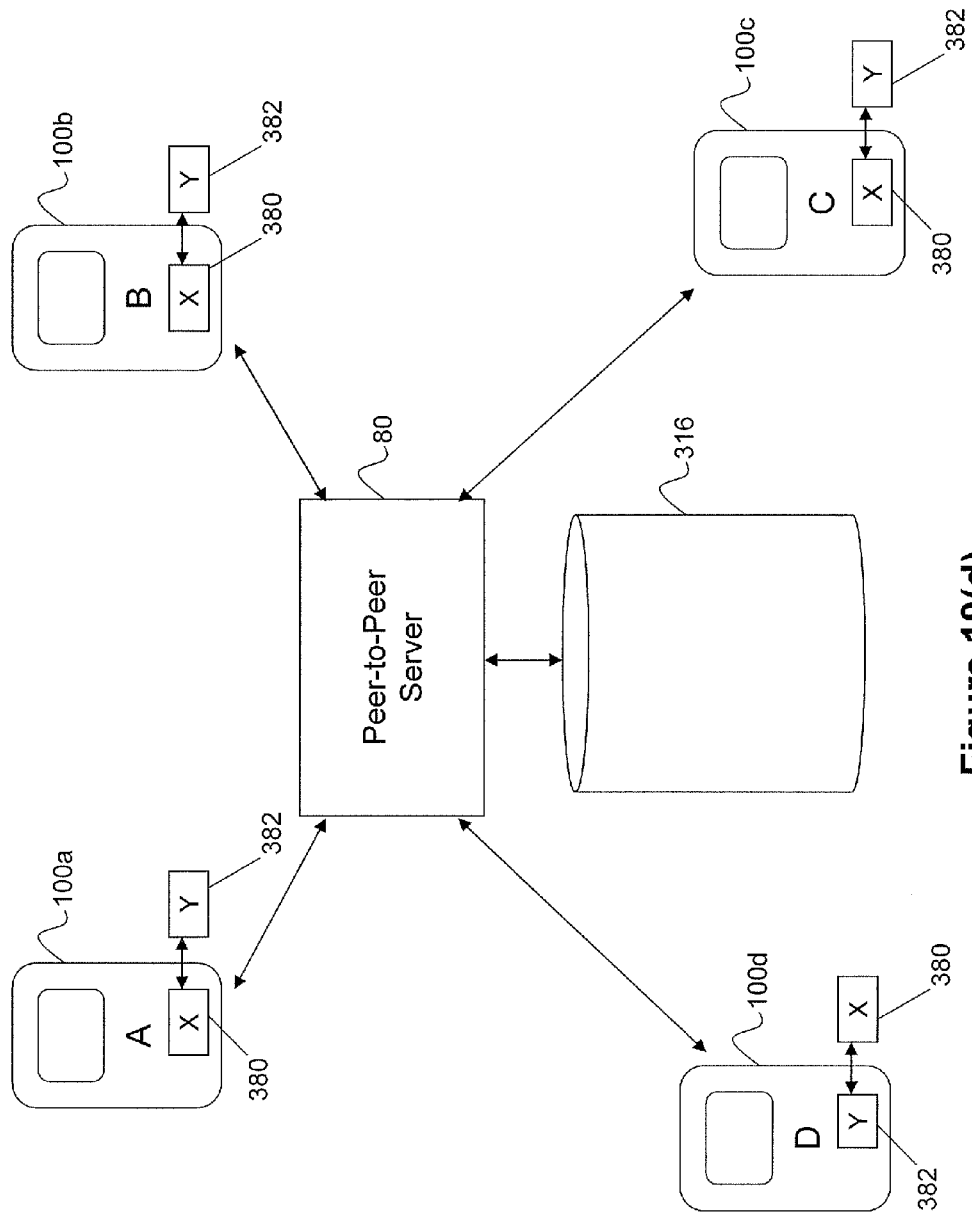
Figure 19E:
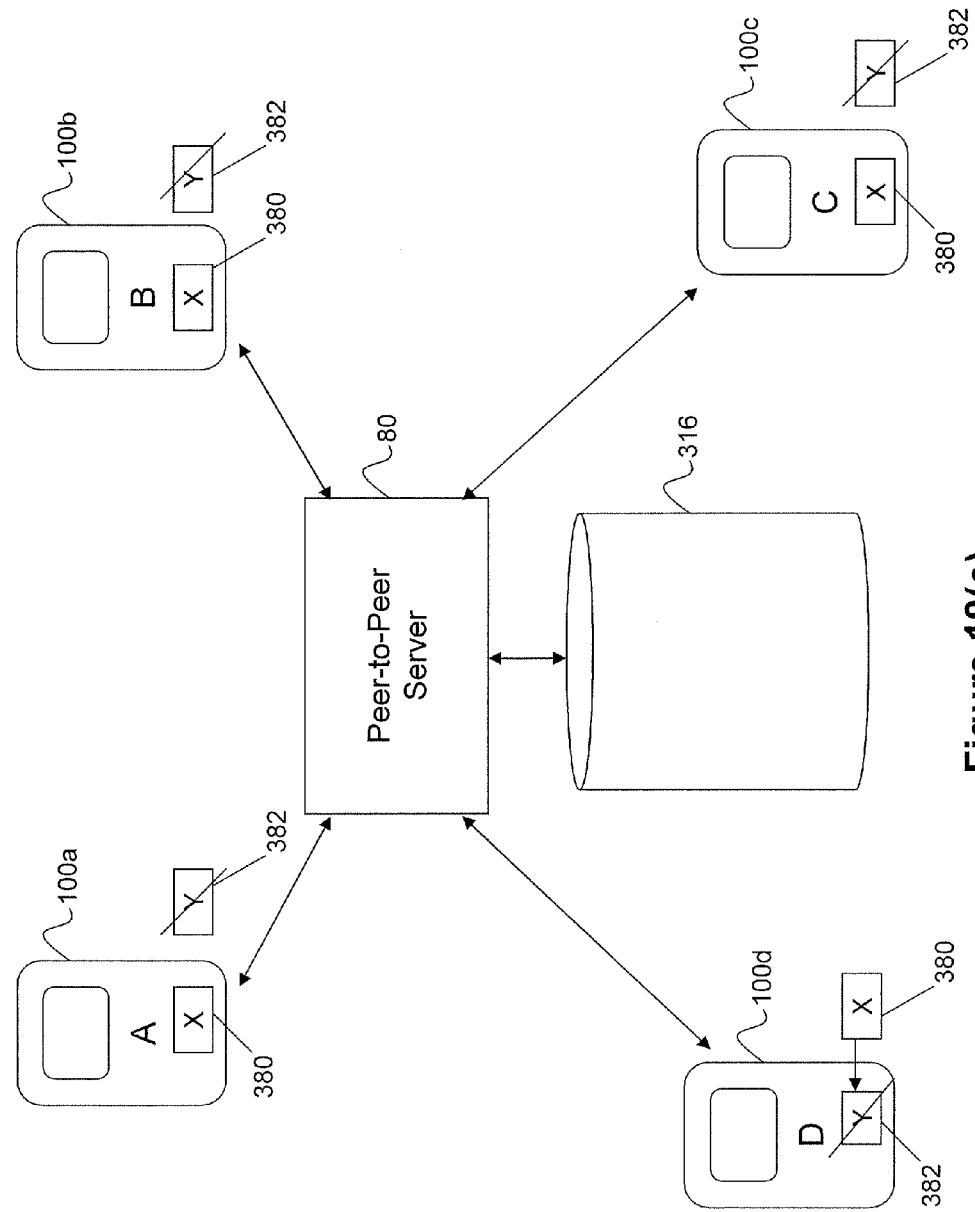
Figure 19F:
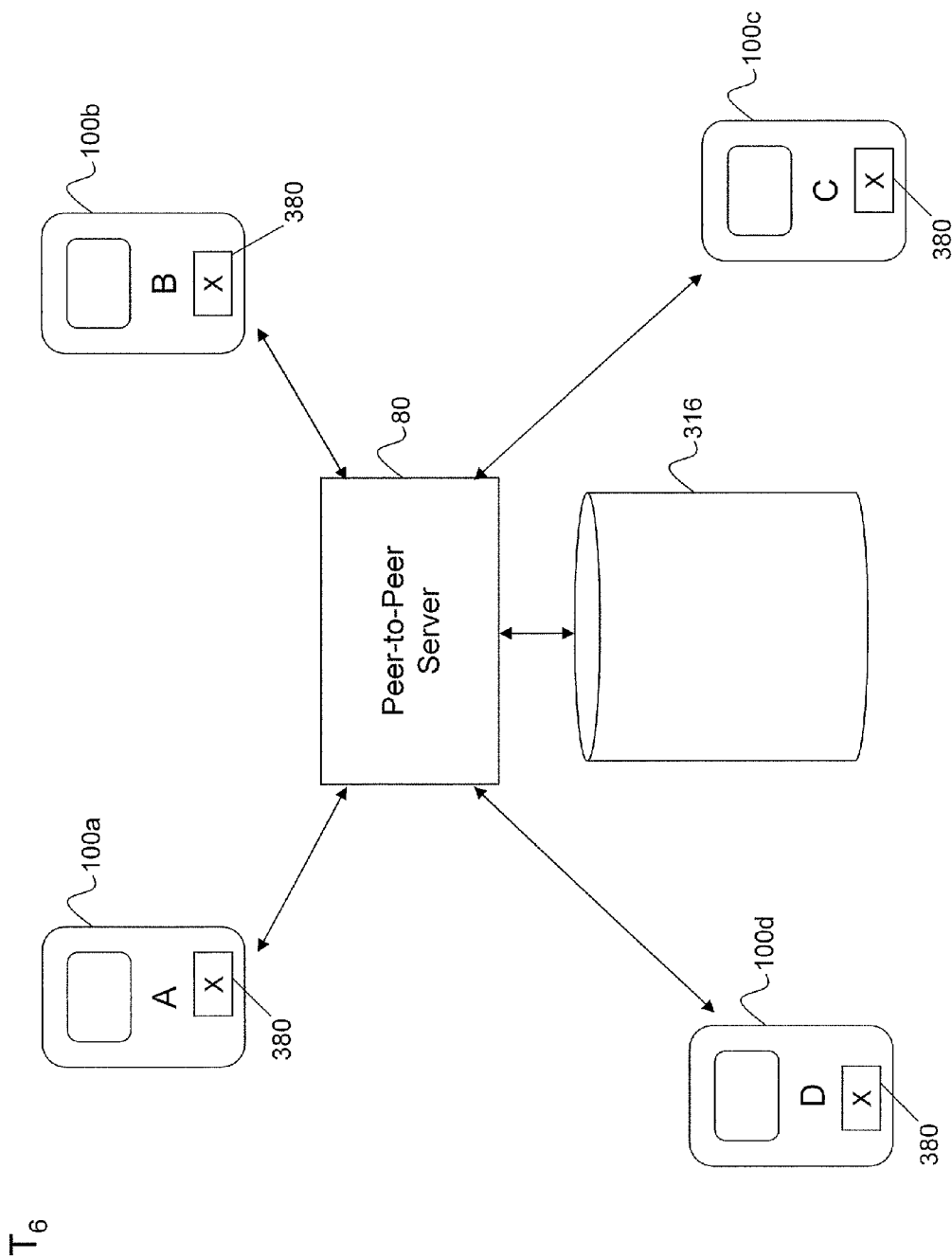

Turning now to FIG. 19(c), at $T_3$ when mobile device 100d comes back into coverage, they will both receive the group message 8 with modification X 380 being held in the message cache 316, and send a group message 8 with modification Y 382 to members A, B, and C. As shown in FIG. 19(d), at $T_4$ each device has both modification X 380 and modification Y 382, which are in a collision. It can be seen that in this case, member D is currently holding modification Y 382 and resolving this with modification X 380 whereas the reverse is true for members A, B, and C. In this example, the collision is resolved, as shown in FIG. 19(e) at $T_5$, by discarding modification Y 382 and keeping modification X 380 at $T_6$ as shown in FIG. 19(f). There are many suitable collision resolution schemes that can be used. For the purpose of this illustration, the latest record timestamp 74 is kept while the other is discarded. Since mobile device 100d actually made modification Y earlier than modification X, which was distributed first, the change made by member D is superseded by that modification made by member A. It can be appreciated that choosing the latest timestamp is only one example and, as will be shown below, others may exist.

It may be noted that the time sequence shown in FIG. 19 assumes for clarity that all mobile devices 100 in the group 10 have substantially identical or otherwise reasonably synchronized clocks. In some embodiments, this may be difficult to maintain, however, in many cases, the data updater module 300 can be tolerant of minor discrepancies in the clocks. However, some of the shared data 11' could become out of sync due to time skews and thus measures can be taken to alleviate this. For example, the new message generator 306 could be programmed to look at the record timestamp 74 for the most recently received group message 8 and, to ensure that their update will have a later timestamp 74, add an increment of time to that indicated in the most recently received group message 8, in particular if such message 8 has a later timestamp 74 than the current clock on the mobile device 100. In this way, even if one of the members has a significant time skew, once he or she sends an update, the group messages 8 going forward would be synchronized with respect to that timestamp 74 and eventually the shared data 11' would be sorted out. Alternatively, a more complicated scheme could be used such as reliance on a global clock or a periodic exchange of messages to override any user-modified time settings. Addressing time skew can also inhibit members of the group 8 from purposely setting their clock ahead to ensure that their updates are always chosen. Of course, some of these considerations can be ignored if other, non-time-related collision resolution schemes such as a hierarchy or user preferences are used.

Figure 20:
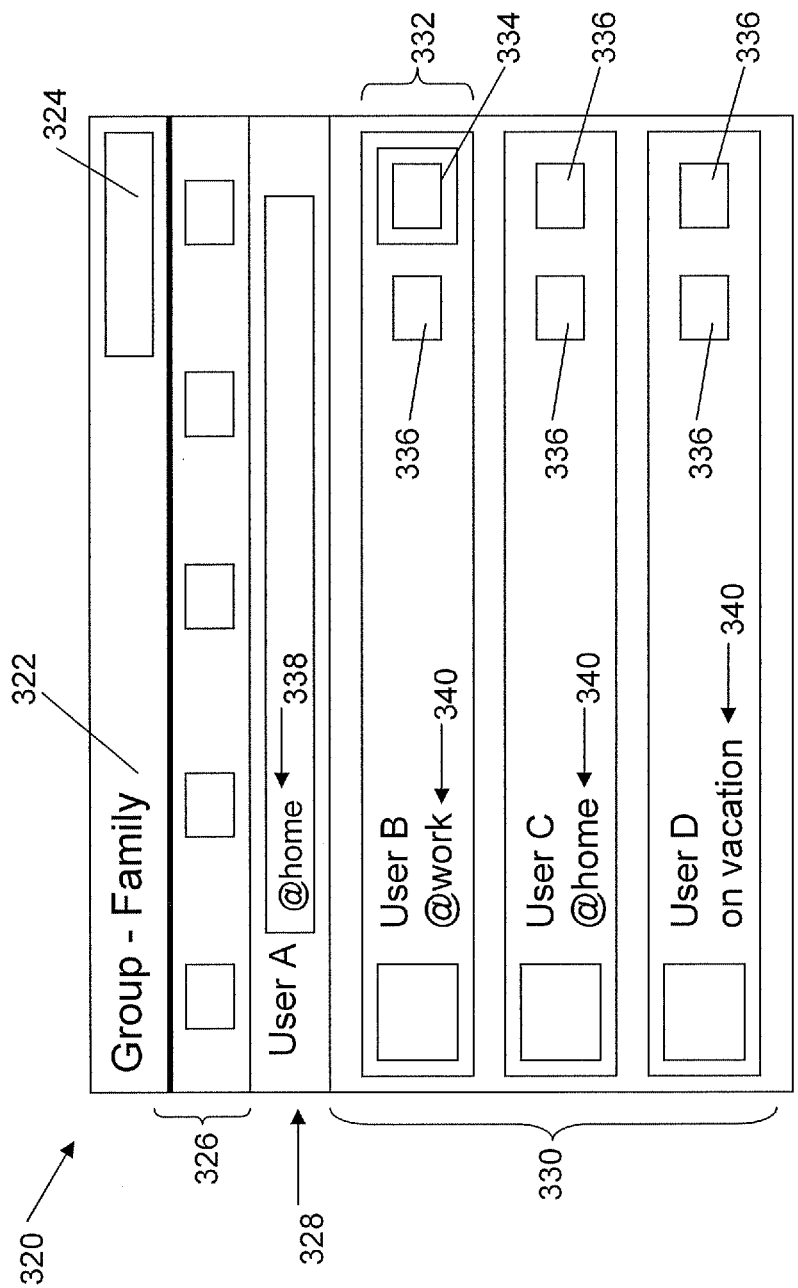
FIG. 20 is an exemplary graphical user interface (GUI) for the group sharing application shown in FIG. 11.
Figure 21:
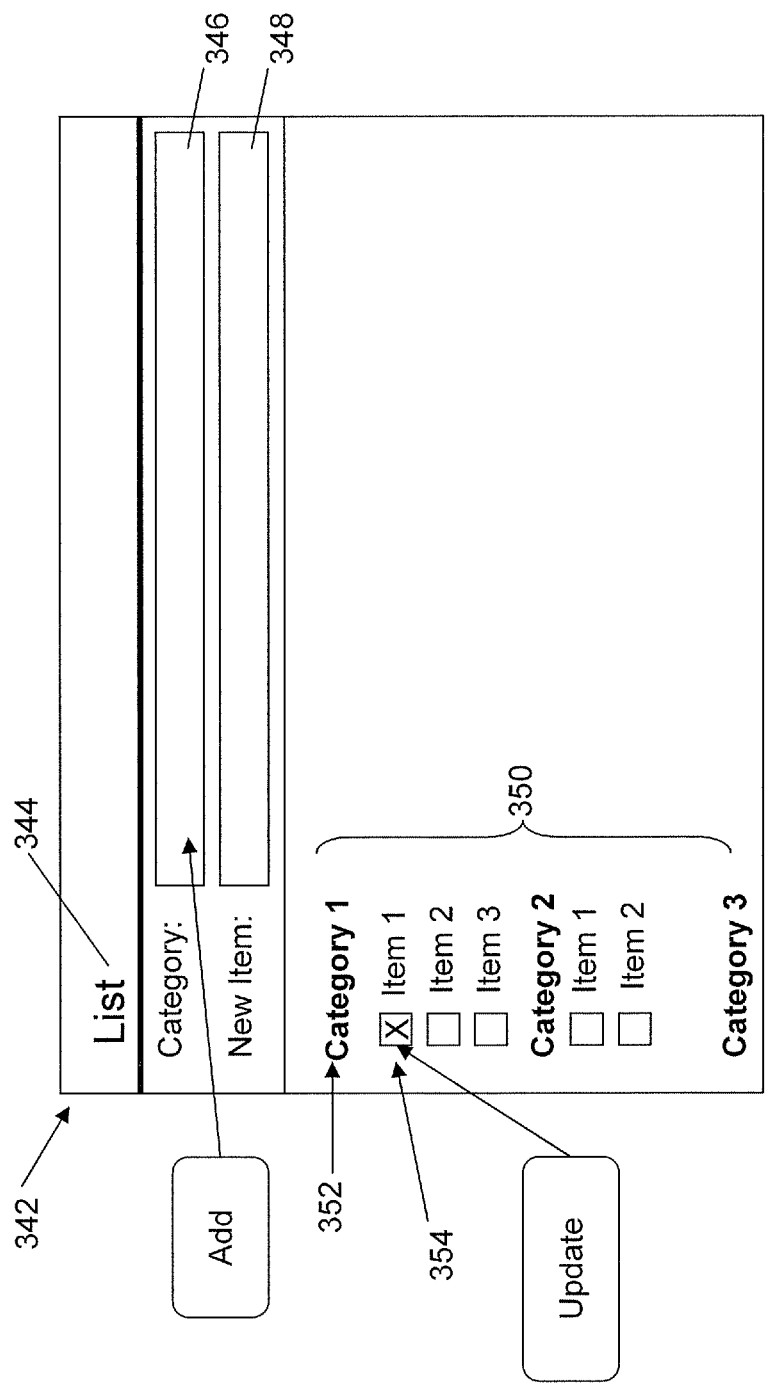
FIG. 21 is an exemplary GUI for a list maintained using the group sharing application.
Figure 22:
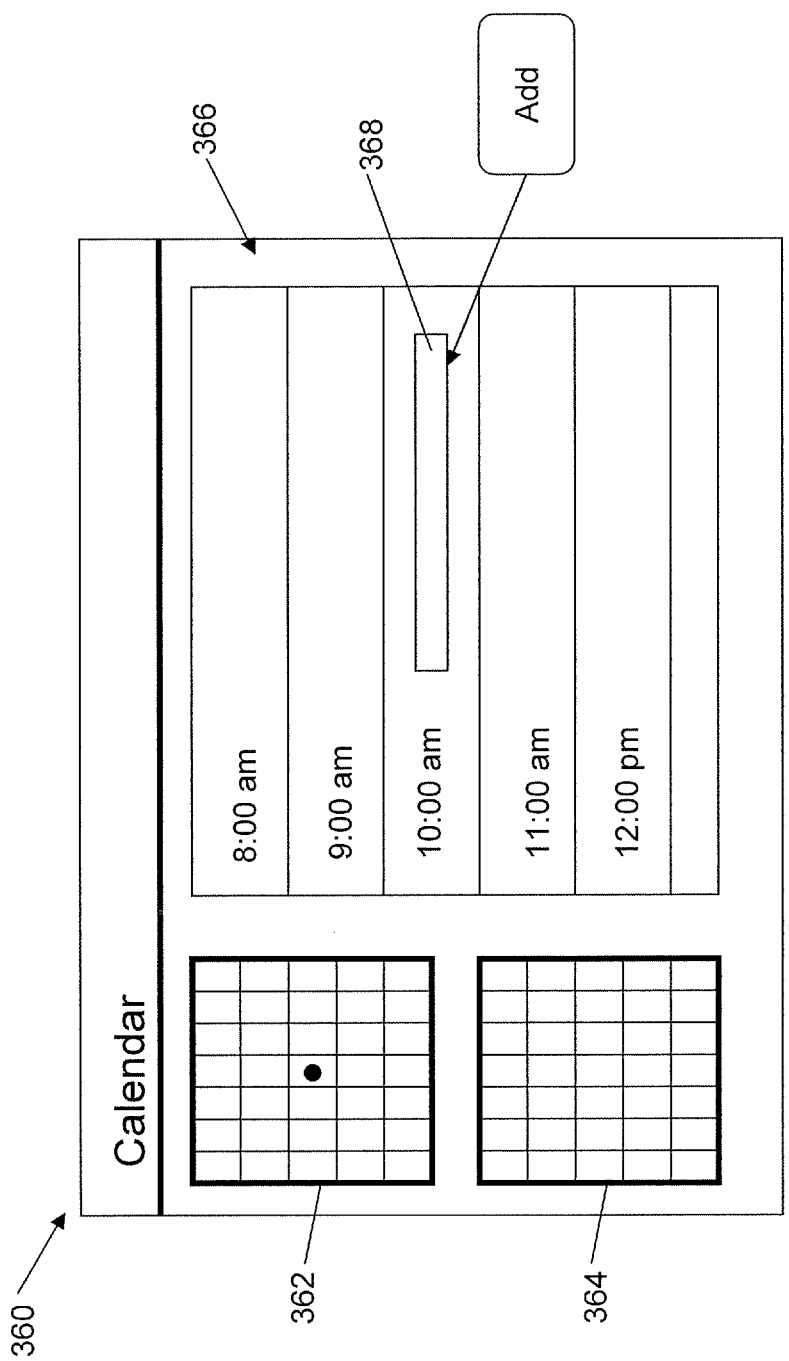
FIG. 22 is an exemplary GUI for a calendar maintained using the group sharing application.
Figure 23:
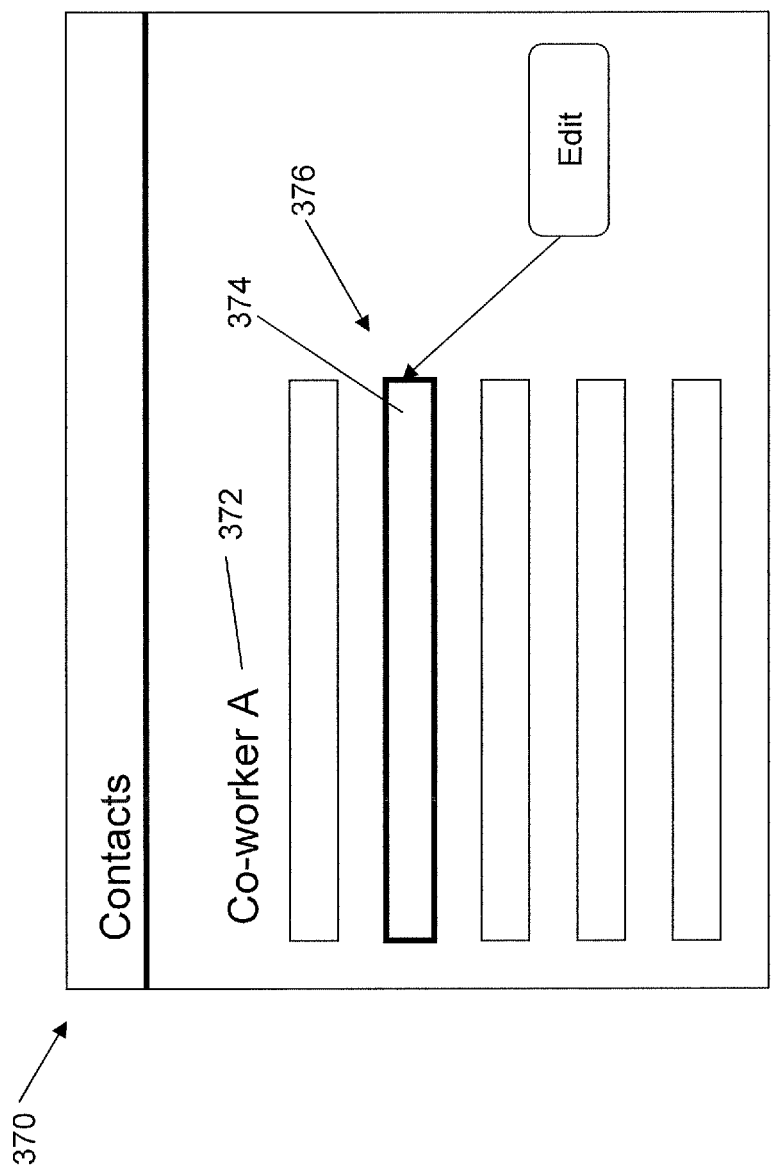
FIG. 23 is an exemplary GUI for a contacts list maintained using the group sharing application.

As discussed above, the group application 54 may include one or more applets each having associate therewith, one or more databases 90, which are updated as exemplified above. Turning now to FIG. 20, an exemplary group application GUI 320 is shown. The group application GUI 320 can be initiated and displayed on the mobile device display 12 by highlighting and selecting the "G" icon 53 using the selection cursor 18 as shown in FIG. 10. The group application GUI 320 comprises a group name 322 and notification area 324 along the top of the screen to identify the group 10 currently being shown in the group application GUI 320. As noted, each member may belong to more than one group and thus the group application GUT 320 may display information for various groups 10. A number of available global applets 326 are also shown, which enables the member to select and utilize a desired applet 326, examples of which are shown in FIGS. 21 to 23 and will be described later. The group application GUI 320 also comprises a status bar 328 to indicate the member's name and the member status 338. In this example, User A is at home. The group application GUI 320 also comprises a member listing 330 for each member in the group 10 indicated by the group name 322. In this example, Users B, C, and D are given listings 330 with a corresponding member status 340. Each listing in this example comprises member applet icons 332, which indicate the various applets 326 common to the user and the other member. The applet icons 332 may comprise public or global applet indicators 336 as well as private applet indicators 334 such as private lists or conversations. In this example, User A has a private applet in progress with User B, e.g. a list of gifts as discussed above.

By highlighting and selecting one of the global applets 326 or a private applet (e.g. through a private applet indicator 334), a GUI for the desired applet may be initiated and displayed as shown in FIGS. 21 to 23. FIG. 21 illustrates a list GUI 342, which has an applet name 344, a category entry box 346, an item entry box 348, and a current list of items 350. The current list of items 350 comprises one or more categories 352, each of which comprises zero or more items (i.e. a category can be awaiting population). In FIG. 21, two examples of updates to the list are shown, namely adding a new category or updating (i.e. selecting) a currently listed item 354. Such examples illustrate modifications to the shared data 11. In this example, if the items 354 are shopping list items, and User A checks off Item 1 as shown, a record 92 for that item can be changed from "Apples—need" to "Apples—purchased". This new record 92 would then be sent in a group message 8 to be enable the other group members to replaced the previous record 92 indicating "Apples—need" to "Apples—purchased", indicating that the item 354 is no longer needed. To update this change in the list GUI 342, the group application and applet data 63 can provide rules or instructions for providing a check mark or modified text to indicate in the list of items 350 that Item 1 has been purchased.

FIG. 22 illustrates a calendar GUI 360 which may also be associated with an applet 326. In this example, the calendar comprises a current month 362, a next month 364, and a hourly list 366 for a selected day. Each entry in the list may comprise an appointment 368, which when added as shown in FIG. 22, can be the subject of a new group message 8 to be sent to the other members of the group 10. FIG. 23 illustrates a contacts GUI 370, in this example, showing contact details 376 for a specified contact 372. In this example, editing a detail 374 for that contact 372, e.g. a new phone number, would cause a new group message 8 to be generated and distributed to the other members of the group 10.

Figure 24:
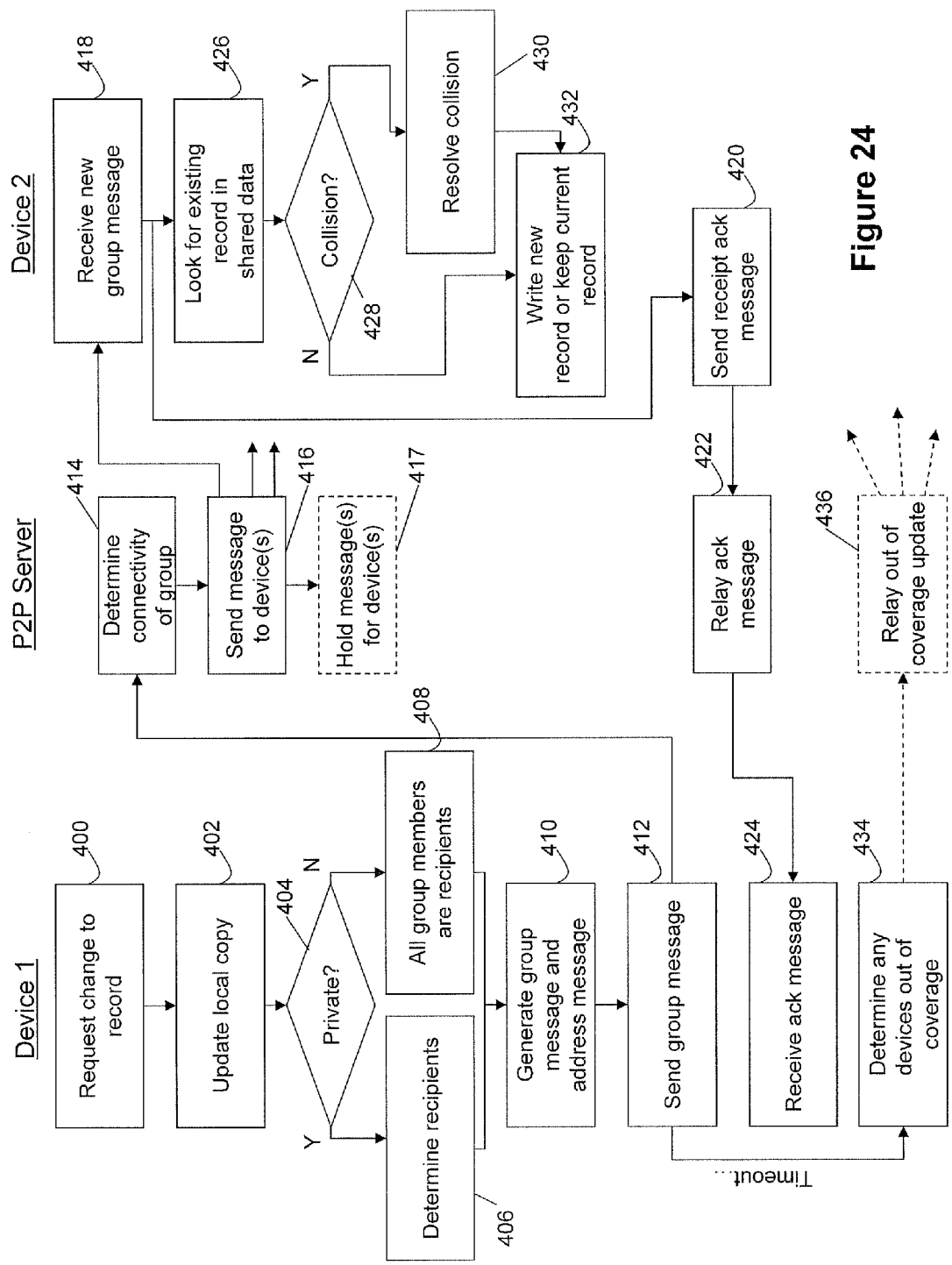
FIG. 24 is a flow chart illustrating exemplary computer executable instructions for updating the shared data based on a change made by one mobile device in the group of mobile devices.

FIG. 24 illustrates an exemplary set of computer executable instructions executed by a first device, device 1, the peer-to-peer (P2P) server 80, and a second device, device 2, to illustrate an update to a record 92 in the shared data 11 and the handling of acknowledgement messages 312 and detecting out of coverage situations. At 400, device 1 requests a change to a record 92 in the shared data 11, e.g. by adding to a list. At 402, the data updater module 300 would add a new value 94' to the shared data 11' by adding a new record 92 or replacing an existing record 92 with a new record 92 containing the new value 94'. At 404, the new message generator 306 determines whether or not the update is associated with a private database 90 or a global, group-wide or "public" database 90. If private, the new message generator 306 determines which members in the group 10 are permitted to be recipients at 406. If not private, all group members are determined to be recipients at 408. The new message generator 306 then generates a group message 8 at 410 and sends the group message 8 at 412, which is received by the peer-to-peer server 80.

At 414, the peer-to-peer server 80 determines the connectivity of the group 10. At 416, where applicable, messages 8 are sent to the connected members and, if necessary, messages 8 are held for those devices not in coverage at 417. In this example, device 2 receives the new group message 8 through the communication interface 302 at 418 and the message comparator 308 examines the shared data 11' at 426, looks for an existing record 92 corresponding to the record name 72 indicated in the message 8 and, at 428, determines if a collision exists. If there is an existing record 92 in the shared data 11', i.e. a collision exists, the collision is resolved at 430 using an appropriate collision resolution scheme. If an existing record 92 cannot be found, i.e. no collision exists, no collision resolution scheme is necessary. At 432, either a new record will be added or an existing record kept or overwritten depending on the outcome of the collision resolution.

While the data updater module 300 is processing the incoming group message 8, at 420 a receipt acknowledgement (ACK) message 312 is sent back to device 1, which is relayed by the peer-to-peer server 80 at 422 and received by device 1 at 424. At the time device 1 initially sends the group message 8 (at 412), typically a timeout begins wherein after a predetermined amount of time, device 1 determines how many if any ACK messages 312 have been returned, e.g. as at 424. At 434, after the timeout expires, device 1 may then determine if any devices in the group 10 are out of coverage and if necessary, at 436, send an out of coverage update via the peer-to-peer server 80. This enables other devices to be aware of the out of coverage status for any device which is out of coverage to enable, e.g. the group application GUI 320 to be updated to "grey out" or otherwise indicate which members are unavailable.

Figure 25:
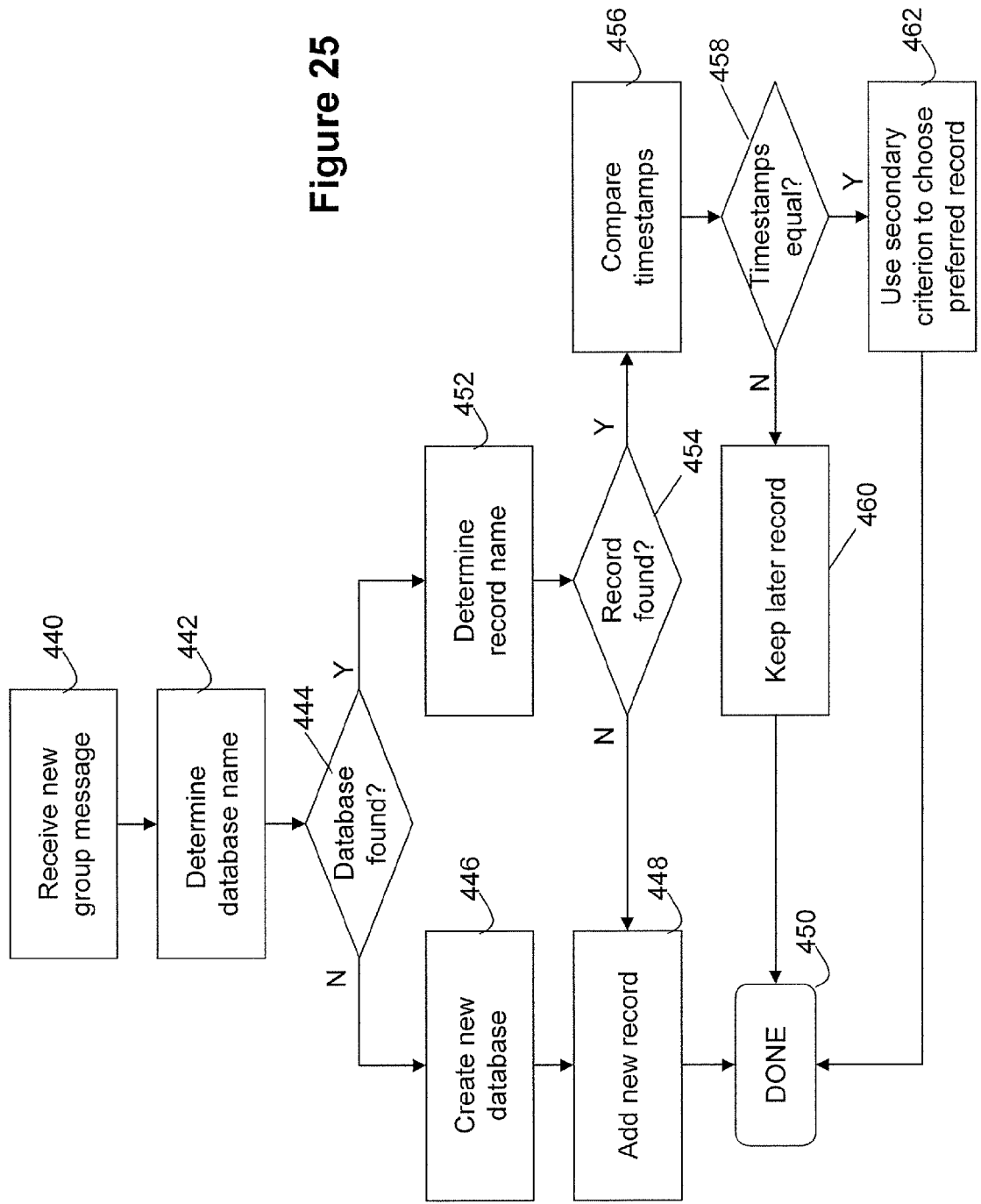
FIG. 25 is a flow chart illustrating exemplary computer executable instructions for one embodiment for determining if a collision exists between record updates and resolving any such collisions.

Turning now to FIG. 25, one example for performing steps 418 to 432 in FIG. 24 is shown in greater detail. At 440, a new group message 8 is received and from the header 69, the database name 71 is determined at 442. If no database 90 can be found at 444 in the shared data 11', a new database 90 can be created at 446 (e.g. a new conversation, new list, etc.) and the new record 92 transported in the group message 8 is added to the new database at 448 and the update is done at 450. If a database 90 can be found in the shared data 11', the message comparator 308 then determines the record name 72 as indicated in the header 69 of the message 8. If no record 92 can be found at 454, a new record is added to the existing database 90 at 448 and the process finished at 450. If a record 92 matching the record name 72 exists, the message comparator 308 compares the record timestamps 74 in both records 92 at 456. If at 458 the timestamps 74 are deemed to be equal, then a secondary criterion may be used to break the tie at 462. Examples of a secondary criterion include PIN number (e.g. choose lower PIN number), alphabetical by record author 73, a collision hierarchy, etc. If the timestamps 74 are deemed to be different at 458, the later record is kept at 460 and the process is completed at 450.

Figure 26:
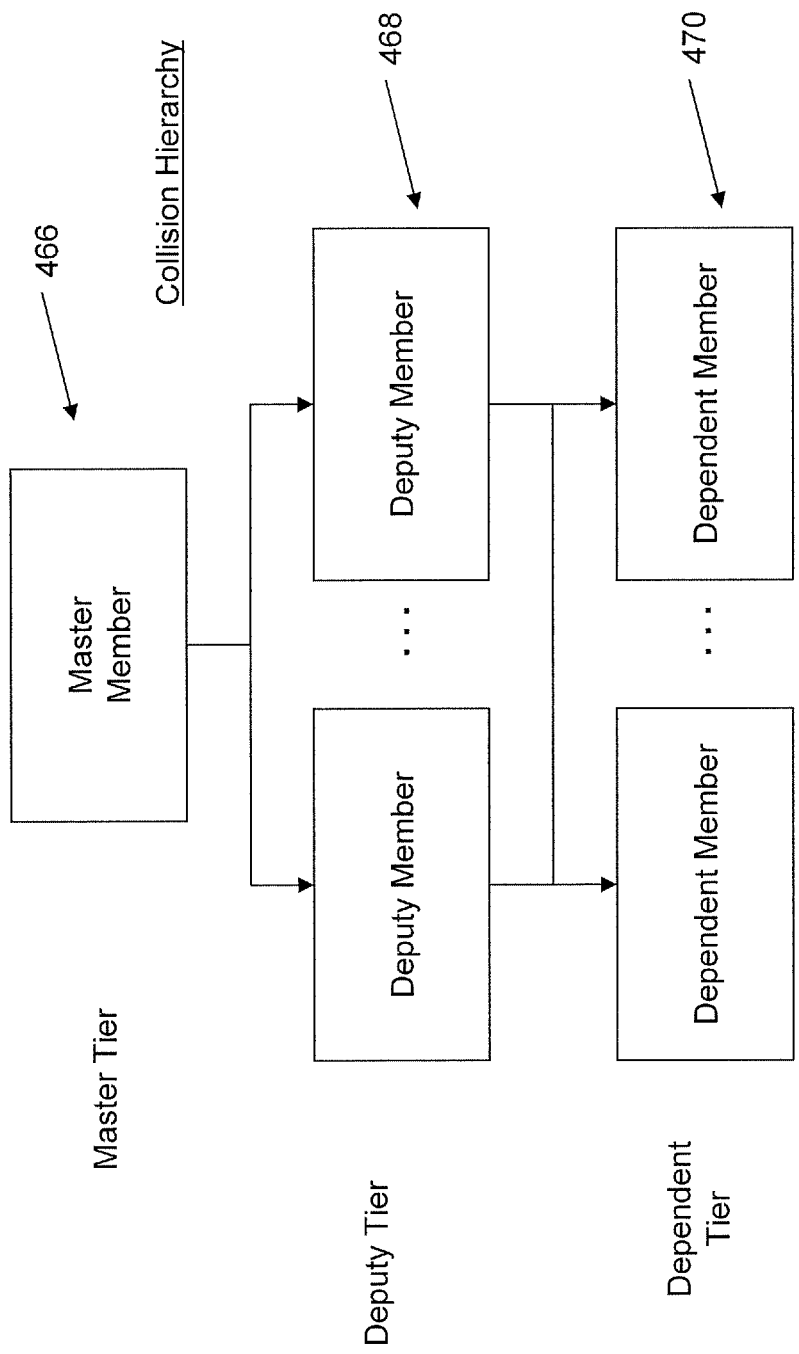
FIG. 26 is a block diagram illustrating an exemplary group member hierarchy.
Figure 27:
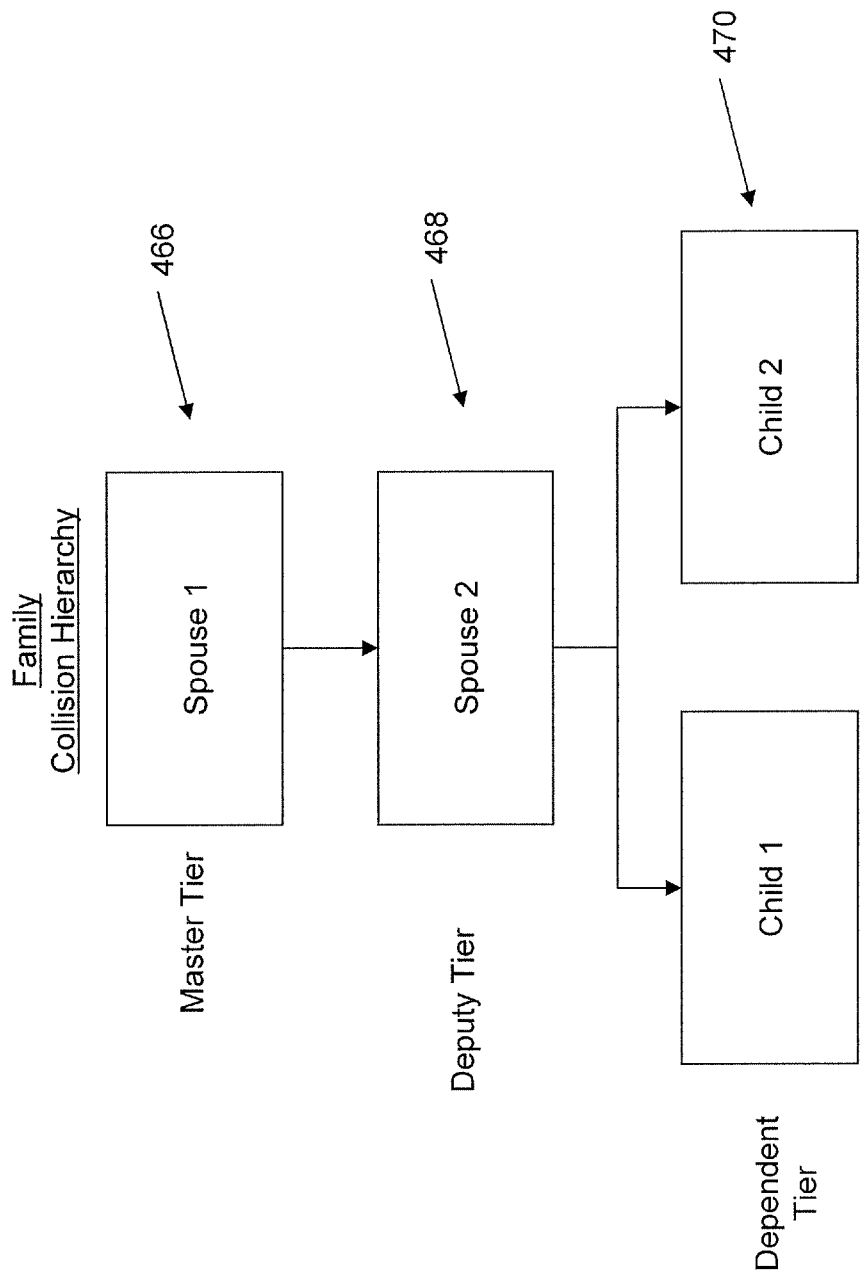
FIG. 27 is a block diagram illustrating an example family group according to the hierarchy of FIG. 26.

It can be appreciated that the comparison of timestamps 74 is only one example of a collision resolution technique and others may equally apply. For example, as shown in FIG. 26, a collision hierarchy comprising a plurality of tiers can be used. In this example, one of the members is designated a master member 466 at the highest or "master" tier. One or more members may then be designated as deputy members 468, which are in a lower deputy tier. One or more other members (typically the remaining members) are then designated dependent members 470 in a dependent tier, which is the lowest tier in this example. It can be appreciated that greater or fewer tiers can be used. For example, with only three members, a master member 466 and only two deputy members 468 or two dependent members 470 being designated. Alternatively, the same three members could be spread over all three tiers. FIG. 27 illustrates an example of a family group hierarchy for resolving family collisions in a family group 10. In this case, one of the spouses in the family, spouse 1, is designated the master member 466, the other spouse, spouse 2 is designated a deputy member 468, and the two children, child 1 and child 2, are designated dependent members 470 at the lowest tier. By designating a master member 466, any updates made by the master member 466 that find a collision are kept, regardless of the timing. This allows a group veto to be exercised if desired.

Figure 28:
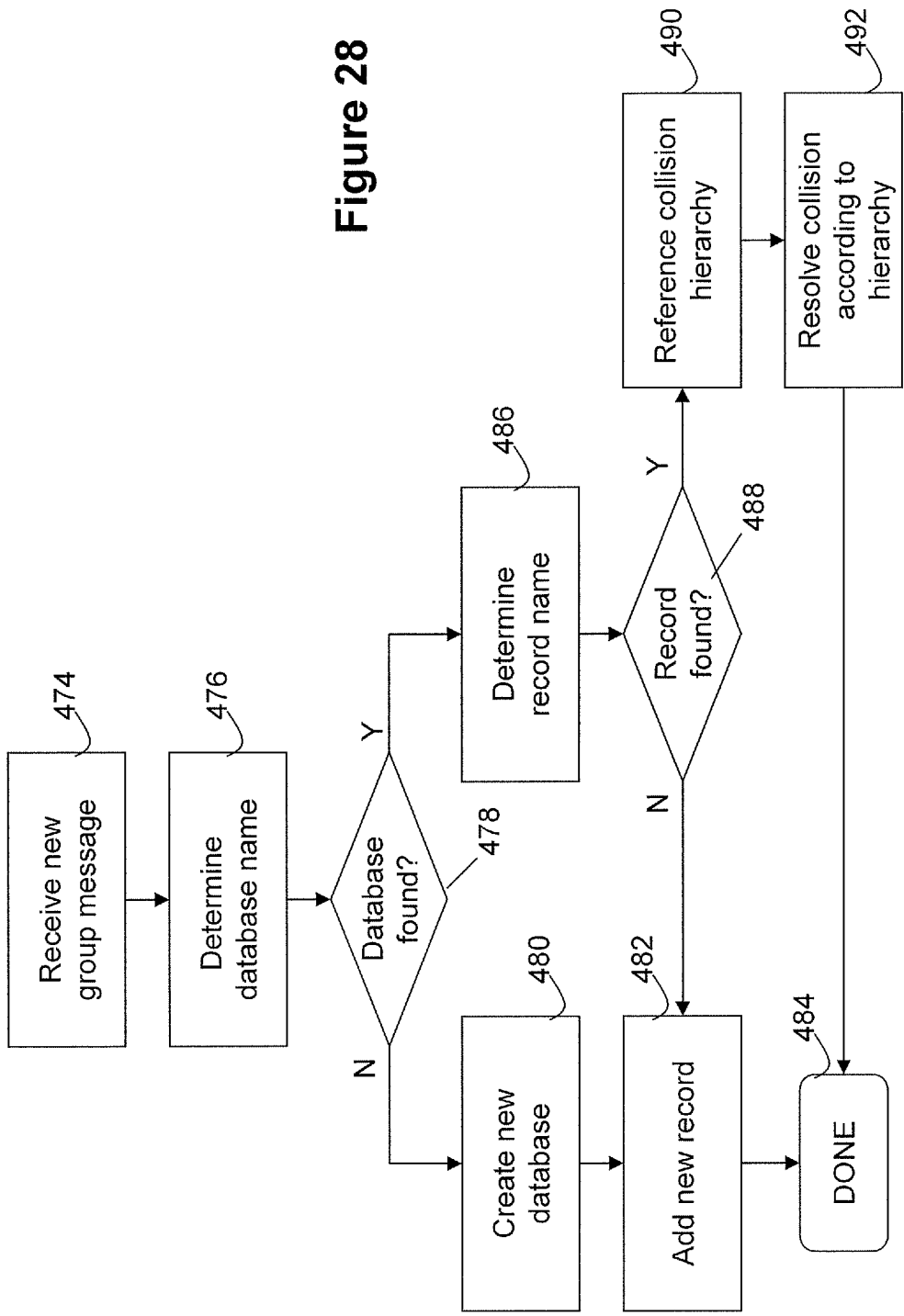
FIG. 28 is a flow chart illustrating exemplary computer executable instructions for another embodiment for determining if a collision exists between record updates and resolving any such collisions.

FIG. 28 illustrates a collision resolution technique that utilizes a collision hierarchy such as the only shown in FIG. 27. It can be appreciated that steps 474 through 488 are the same as steps 440 through 454 in FIG. 25 and thus details thereof need not be reiterated. When resolving collisions using a hierarchy, at 490, the collision hierarchy is referenced to determine if any of the members supersede the others and in what order. The collision is then resolved according to the hierarchy at 492 and the process completed at 484. It may be noted that collision hierarchy may include any hierarchy determined according to any criteria or rules, such as numerical, alphabetical, relative importance or any other way to distinguish one record 92 over others.

Figure 29:
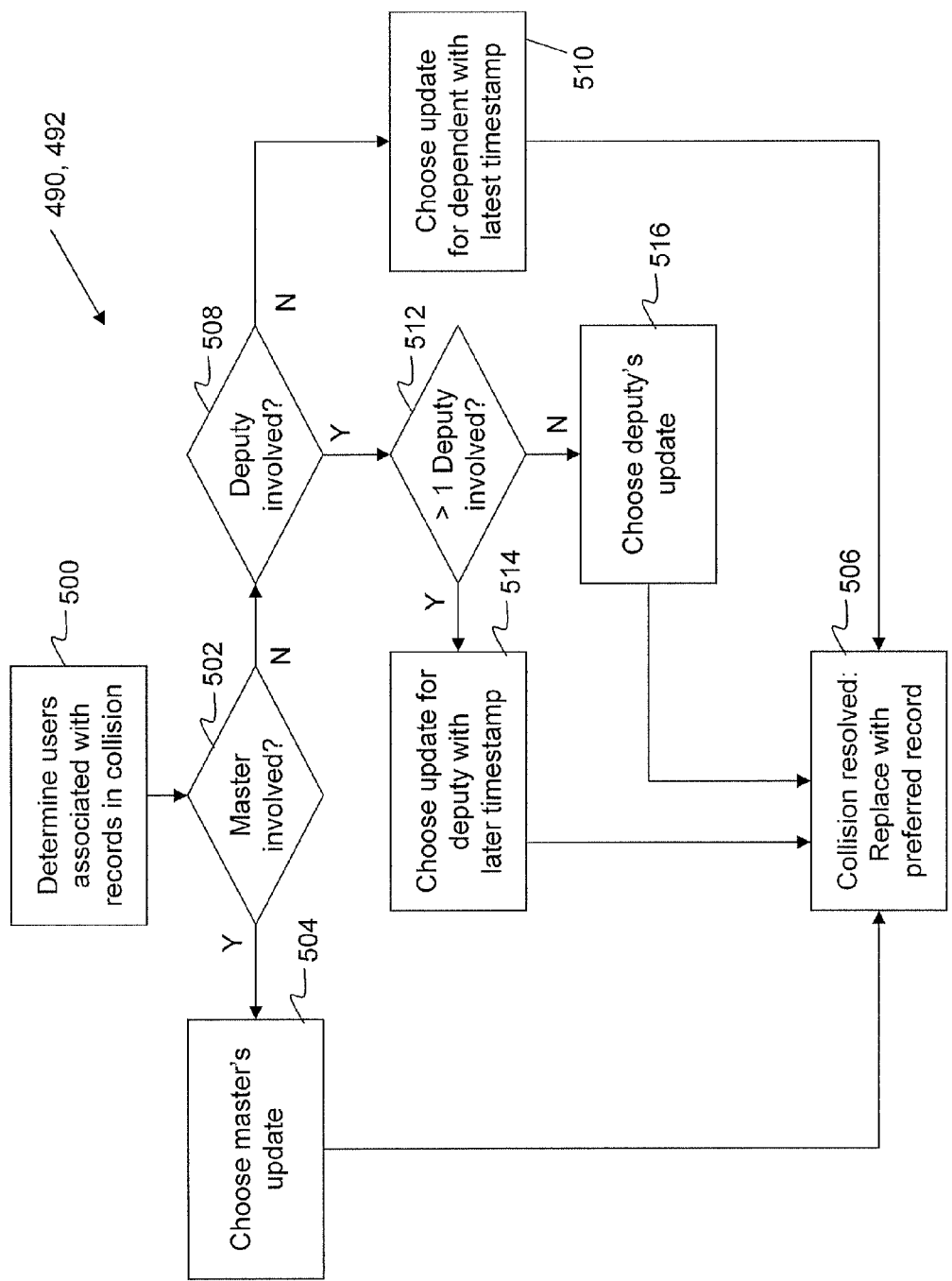
FIG. 29 is a flow chart illustrating exemplary computer executable instructions for resolving a collision between record updates according to the exemplary group member hierarchy shown in FIG. 27.

FIG. 29 illustrates an example of performing steps 490 and 492 according to the hierarchy shown in FIG. 26. At 500, the message comparator 308 determines which users or members are associated with the records 92 in the collision, e.g. by referencing PIN numbers or record author 73 fields. If the master member 466 is determined at 502, the master's update is chosen at 504 and the collision is resolved at 506. However, if the master member 466 is not determined at 502, the message comparator 308 then determines at 508 if a deputy member 468 is involved in the collision. If no deputy member 468 is involved, indicating only dependent members 470 were involved in the collision, the update with the latest timestamp may be chosen at 510. It can be appreciated than any other secondary criterion can be used at 510 and the selection based on timestamps 74 is made for illustrative purposes only. If a deputy member 468 is involved, at 512, it is determined whether or not both records 92 were authored by deputy members 468. If not, only one deputy member 468 is involved and that update is chosen at 516. However, if more than one deputy member 468 is involved in the collision, the record with the latest timestamp 74 (or other secondary criterion) is chosen as the new record 94' at 514 and the collision is resolved at 506.

Figure 30A:
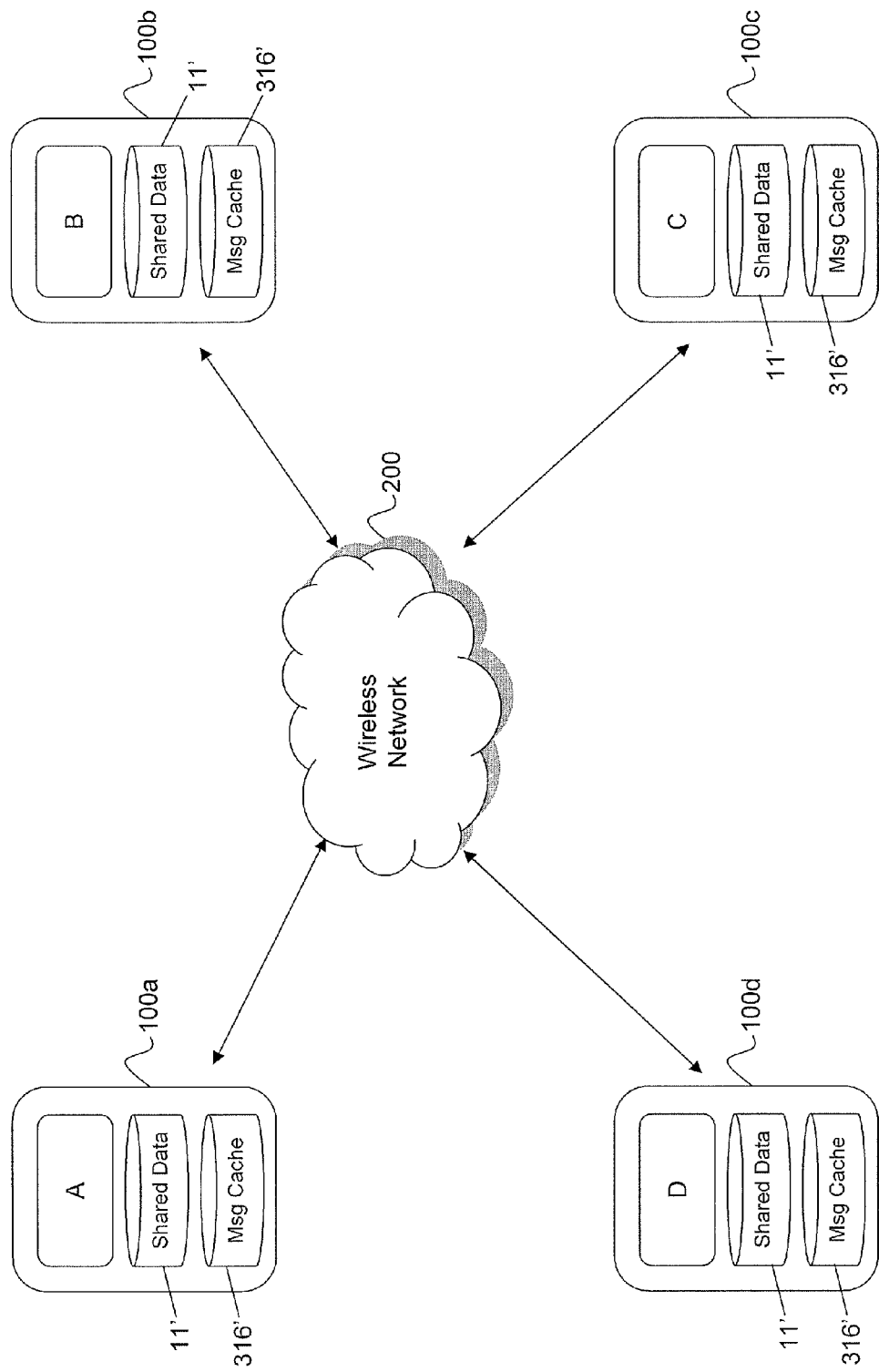
FIGS. 30(a) and 30(b) are schematic diagrams illustrating an exemplary alternative embodiment wherein undelivered group messages are cached at the mobile devices.
Figure 30B:
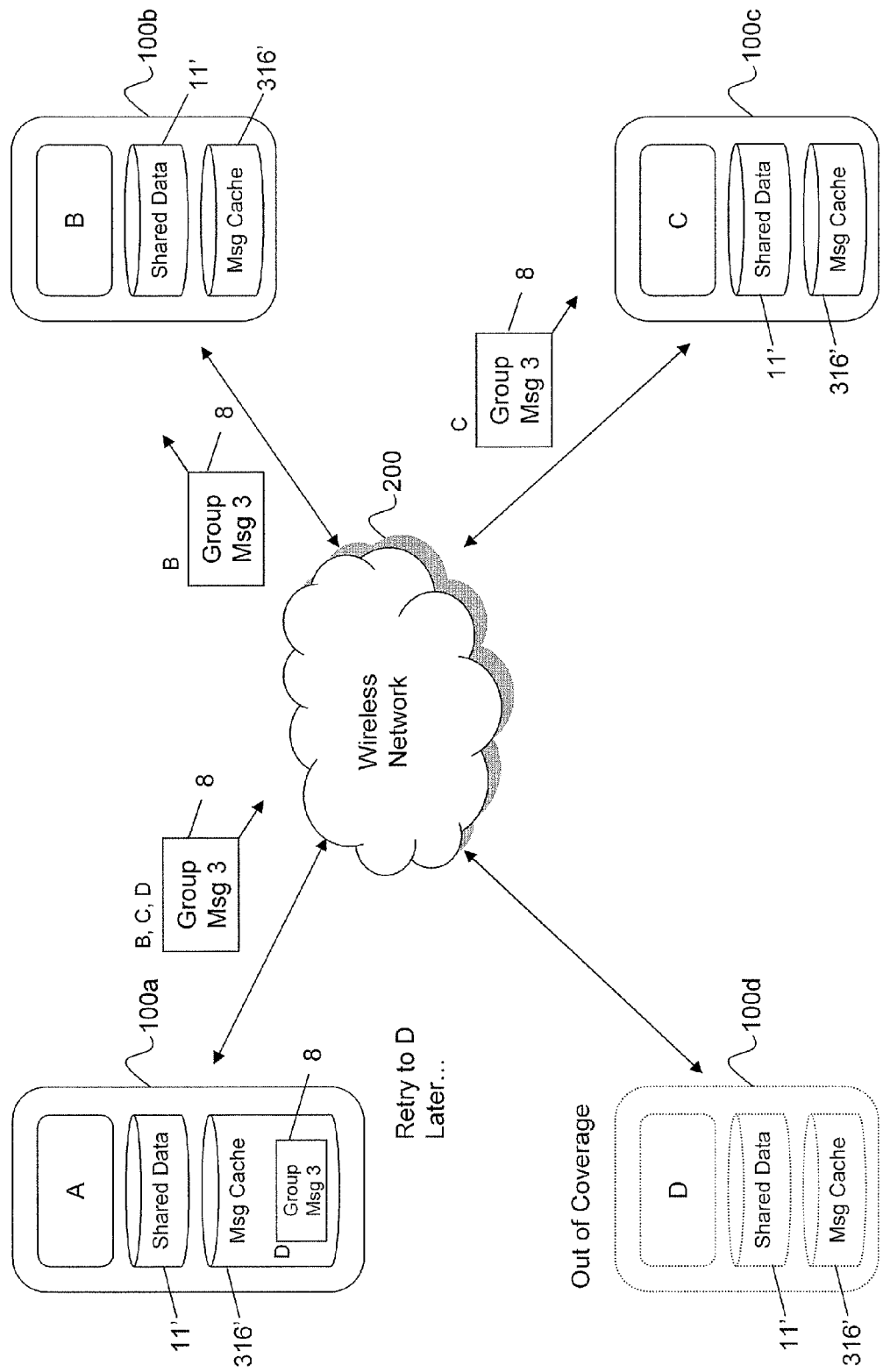

Another embodiment is shown in FIGS. 30(a) and 30(b), wherein a message cache 316' is maintained on the mobile device 100 rather than in a peer-to-peer server 80 or similar device. This embodiment may be implemented where a different type of message exchange service is used via the wireless network 200, i.e. other than a peer-to-peer or PIN-to-PIN exchange are herein exemplified. As shown in FIG. 30(b), in the same out of coverage situation for mobile device 100d that was illustrated in FIG. 17 or FIG. 19, a message 8 sent to members B, C, D would in some suitable way communicate an acknowledgement of receipt back to mobile device 100a such that mobile device 100a would know to hold the group Msg 3 and retry later. In this way, the mobile device 100 is responsible for delivery retries and caching messages 8 that have not been received. It can be appreciated that the principles described herein may equally apply to the embodiment shown in FIG. 30, only without relying on the peer-to-peer server 80 for relaying messages. It can also be appreciated that in such an embodiment, the mobile device 100 would need to be capable of sending multi-cast messages either via a locally stored program or a program running on the available message exchange service.

Figure 31:
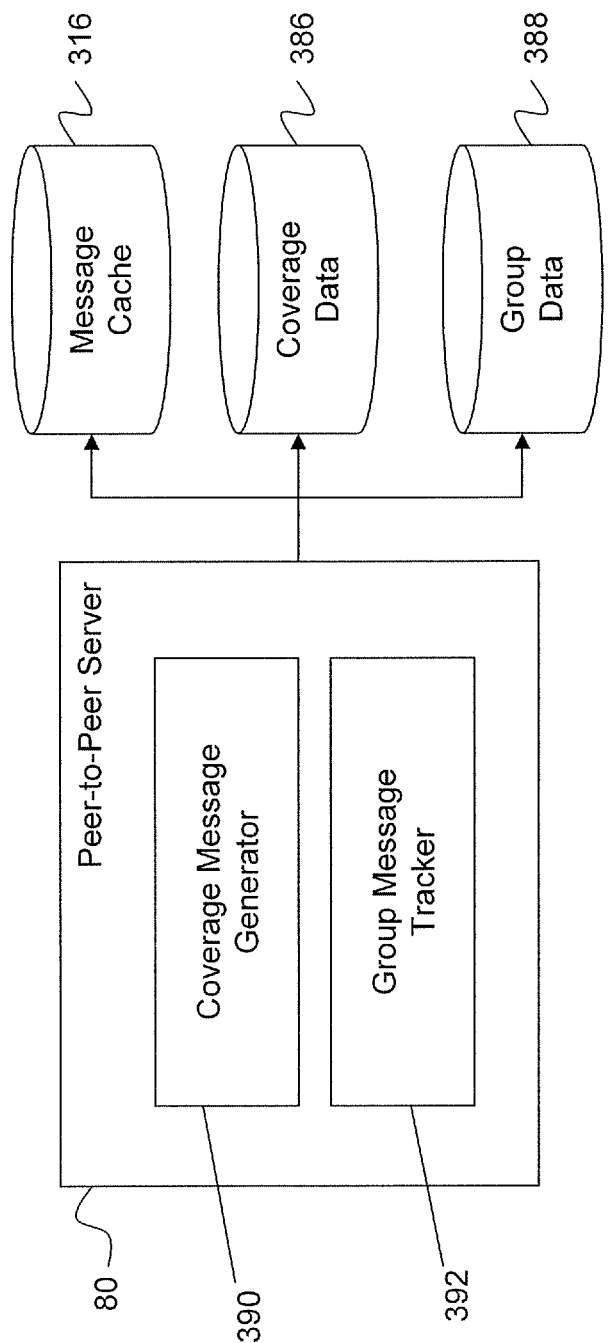
FIG. 31 is a block diagram illustrating an exemplary alternative embodiment for the peer-to-peer server configured to track device coverage and send in and out of coverage messages.

Another embodiment is shown in FIG. 31, wherein the tracking of ACK messages 312 and determining in and out of coverage situations are offloaded from the mobile devices 100 to the peer-to-peer server 80. In this example, the peer-to-peer server 80 comprises a coverage message generator 390 for generating out of coverage messages 314 and back in coverage messages 315; and a group message tracker 392 for tracking the members of a group 10 associated with each message 8 relayed by the peer-to-peer server 80. In addition to the message cache 316, the peer-to-peer server 80 comprises or otherwise has access to coverage data 386 for recording which members are in and out of coverage, and group data 388 for tracking which messages are associated with what members.

Figure 32:
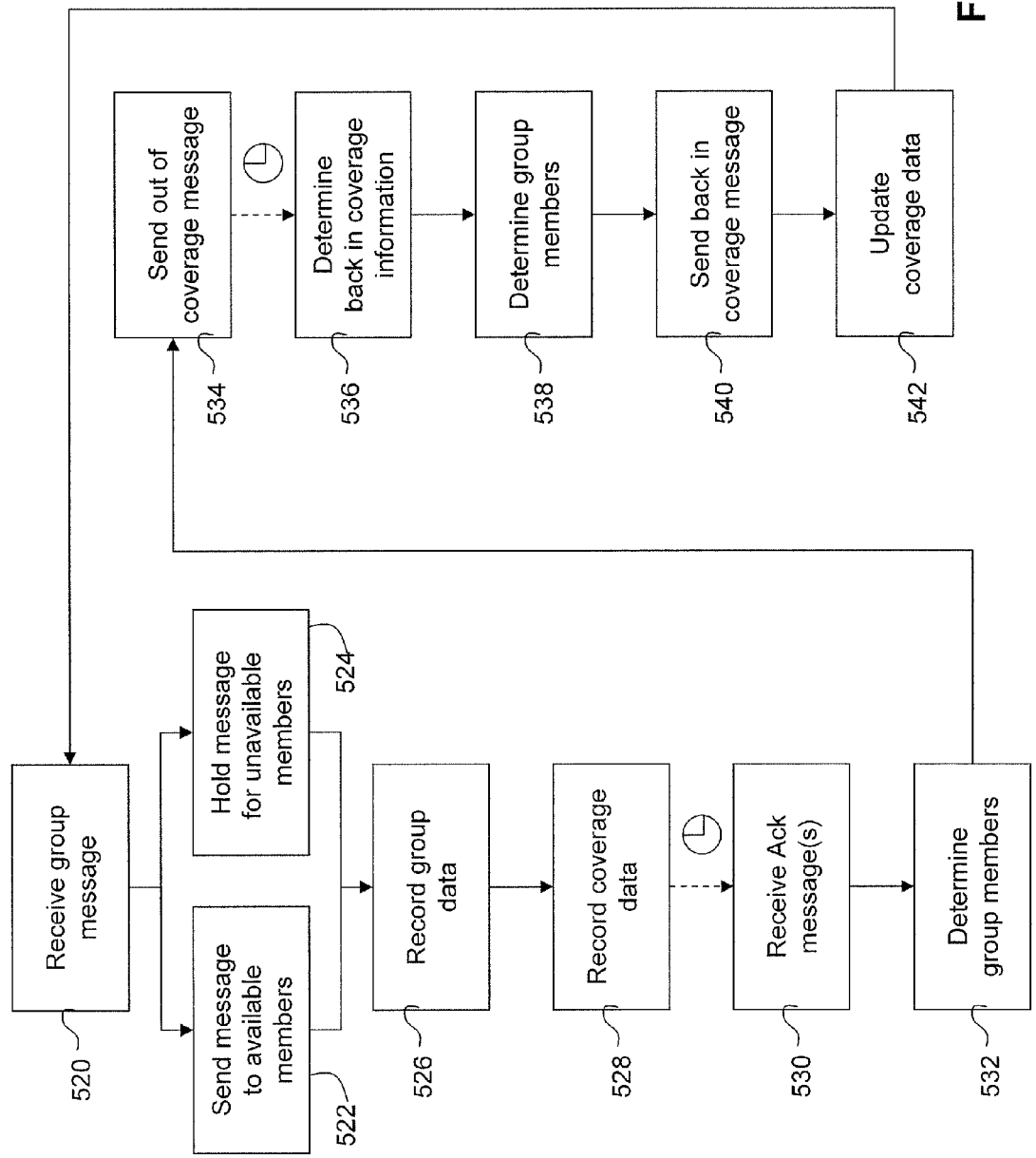
FIG. 32 is a flow chart illustrating exemplary computer executable instructions for having the peer-to-peer server of FIG. 31 track device coverage by monitoring acknowledgement messages and send in and out of coverage messages.

FIG. 32 illustrates an exemplary set of computer executable instructions that may be executed by the peer-to-peer server 80 in offloading the above-noted tasks from the mobile devices 100. At 520 a group message 8 is received, at 522 is sent to all available members, and at 524 is held for all unavailable members. At 526 the group message tracker 392 records the group data, e.g. by storing in a message log, an identifier for the message and each member that was listed in the Dest PIN field 70. At 528, the peer-to-peer server 80 records the coverage data based on who is currently in and out of coverage and at 530, typically after some time has elapsed, the coverage message generator 390 determines which if any ACK messages 312 have been received. By comparing the ACK messages 312 to the members associated with the message 8, the coverage message generator 390 may determine at 532, which group members have acknowledged receipt and those which have not. Using this information, the coverage message generator 390 may, at 534 send out of coverage messages 314 to the group members and hold those for members not in coverage. Typically after some time has elapsed, the coverage message generator 390 then determines which if any of the mobile devices 100 have come back into coverage at 536, e.g. by receiving a new message 8 or through some other available information. The group message tracker 392 can then be used to determine the group members associated with the original message 8 at 538, and a back in coverage message 315 can be sent to the members at 540 and the coverage data 386 updated at 542. This process may be repeated for each new group message received 520 or on a periodic basis, or both, to provide up to date coverage information to the mobile devices 100, e.g. to enable them to update GUIs, without requiring additional messages to be generated at the device. In this way, message transfer is optimized by moving tasks from the mobile device 100 to the peer-to-peer server 80 at the expense of increased intelligence and overhead at the peer-to-peer server 80.

Figure 33A:
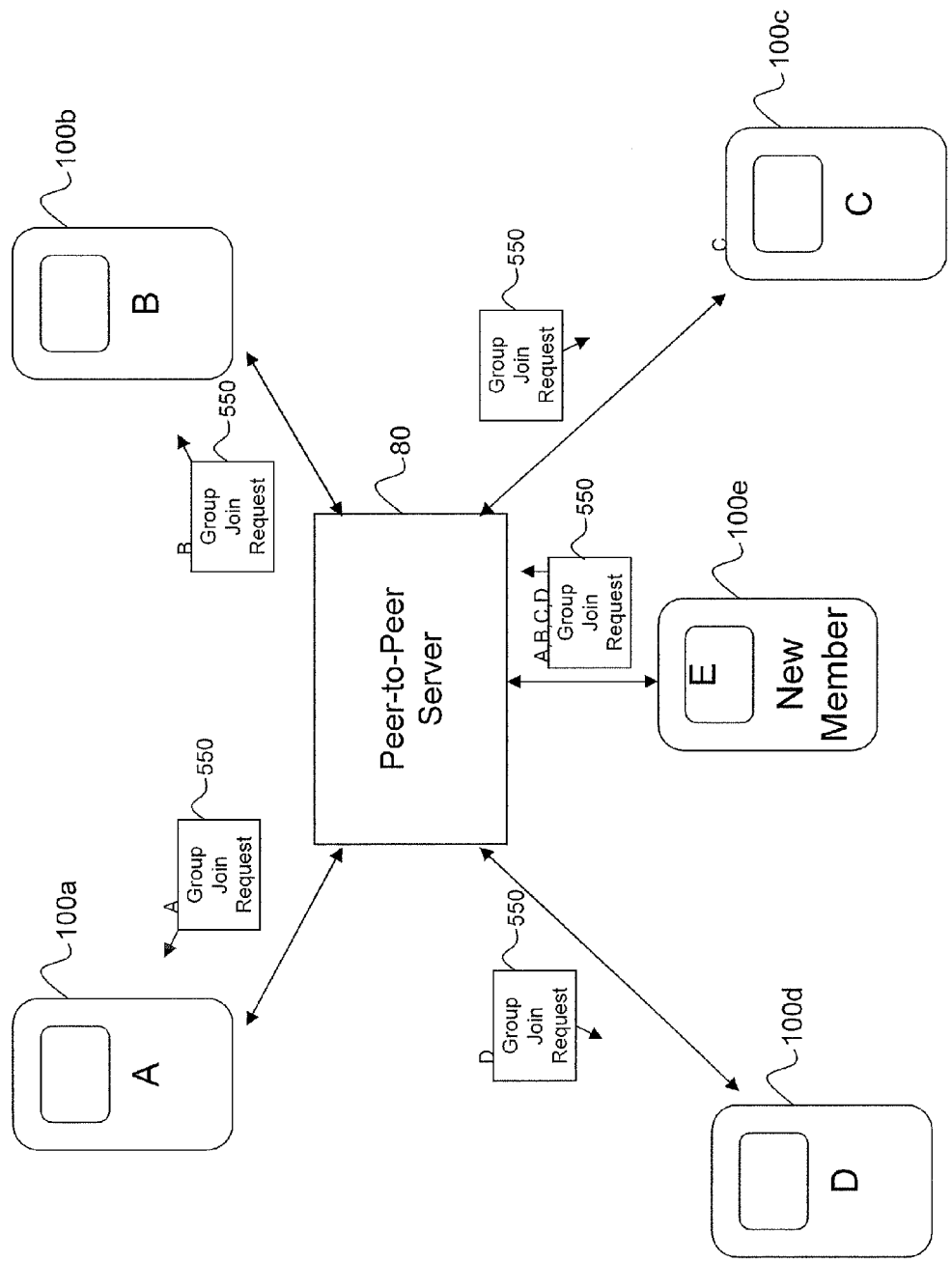
FIGS. 33(a) to 33(c) are schematic diagrams illustrating an exemplary provisioning process for adding a new member to a group.
Figure 33B:
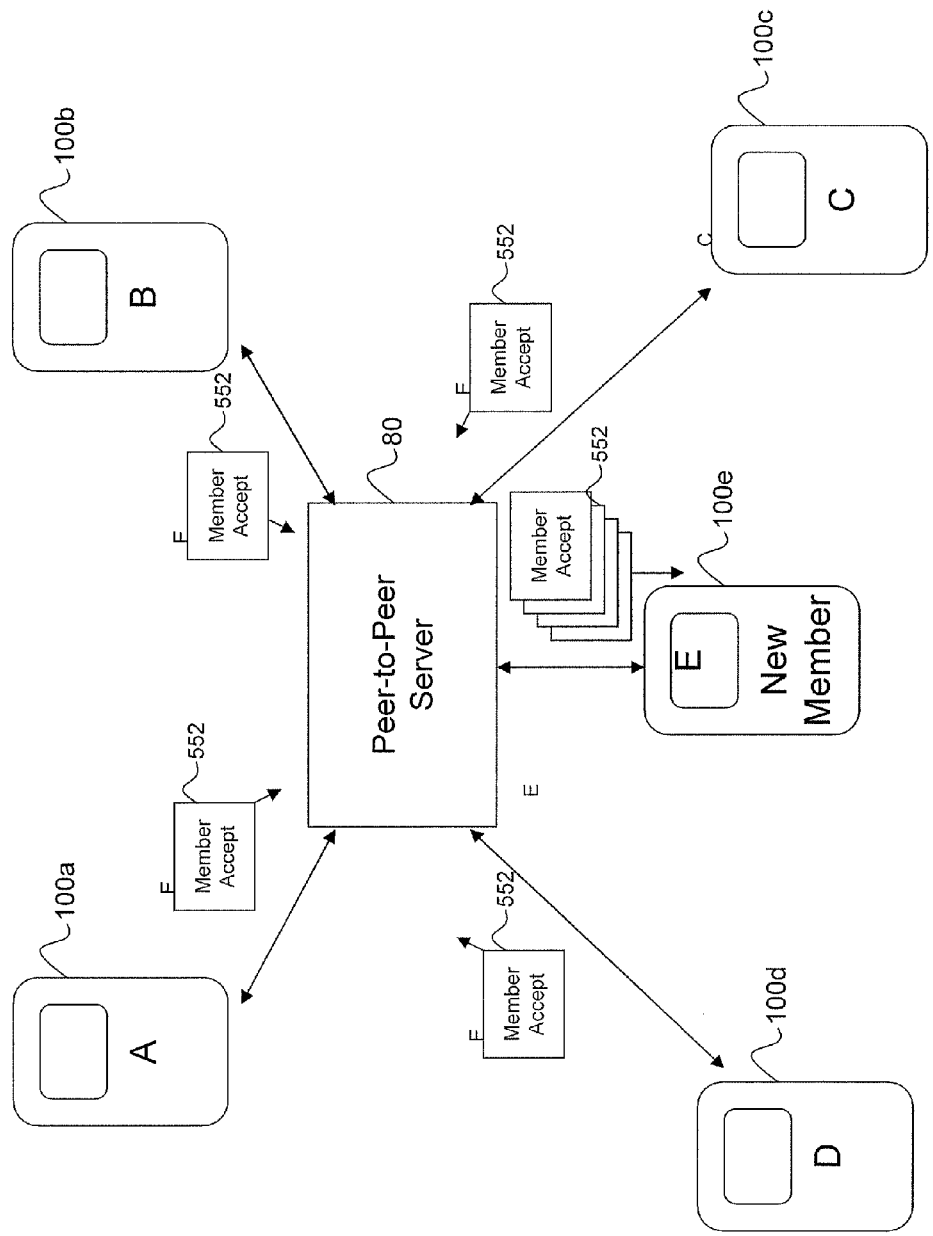
Figure 33C:
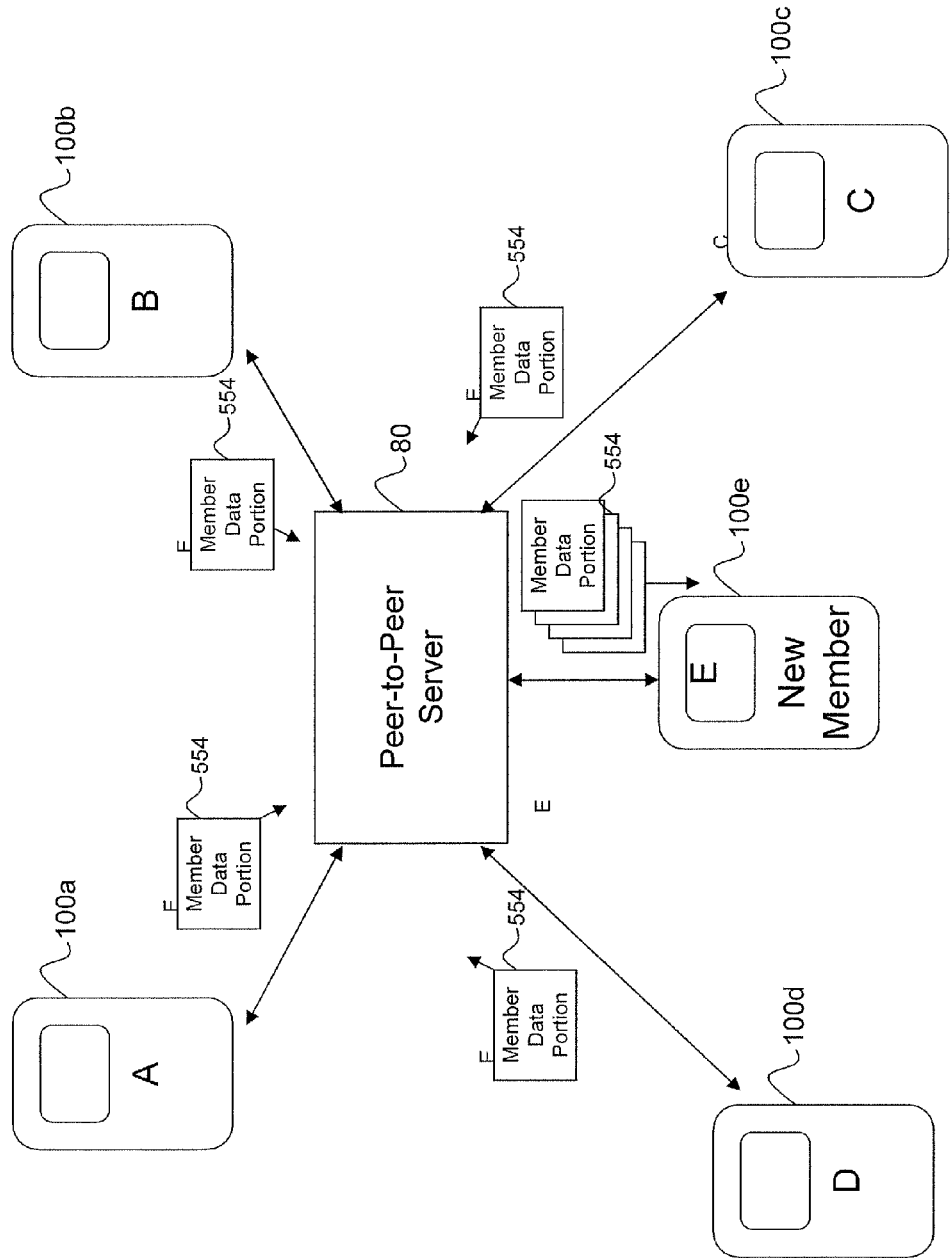
Figure 34:
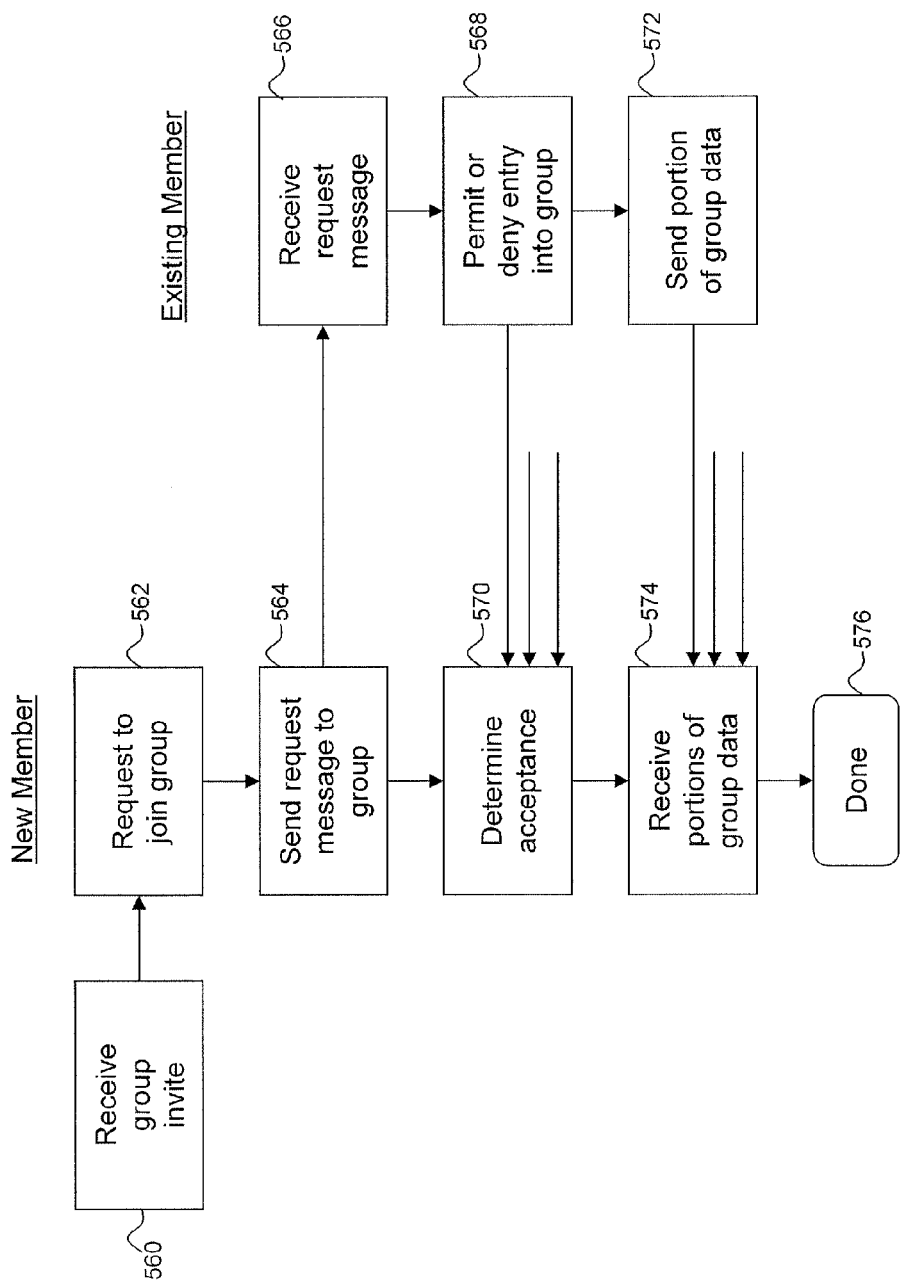
FIG. 34 is a flow chart illustrating exemplary computer executable instructions for adding a new member to a group.

As discussed above, by associating a record author field 73 with each message 8, when new members join a group 8, the new member can be provisioned with an up-to-date set of shared data 11 by having each member contribute messages 8 that include records 92 created by them. Another embodiment is shown in FIGS. 33 and 34 to illustrate such a provisioning scheme. Turning first to FIG. 33(*a*), a new member E, having mobile device 100*e* in this example requests to join the group 10 by sending a group join request 550, which is relayed to each of the members. In this example, it is assumed that the new member E ascertains the group membership by first receiving an invitation from a group member or elsewhere but it can be appreciated that other methods may be employed. As shown in FIG. 33(*b*), each group member may reply to the request 550 with a member accept message 552, which are then used by the group application 54 residing on the new member's mobile device 100*e* to confirm acceptance into the group 10. Upon accepting member E, each existing member may then send the portions 554 of the shared data 11 which they authored to enable the new member to build their own up-to-date version of the shared data 11, as shown in FIG. 33(*c*).

Turning to FIG. 34, a provisioning procedure for permitting member E to join the group is shown. At 560, the new mobile device 100*e* receives or otherwise obtains a group invite, e.g. provided by one of the existing members or an intermediary (e.g. book club organizer). At 562, the new mobile device 100*e* uses an existing or newly installed group application 54 to generate a group join request 550 and, at 564, sends the group join request 550 to each group member. It can be appreciated that where hierarchies exist in the group 10, the new member may be able to simply send a message to the master member 466 who governs the membership. Each existing member in this example receives a group join request 550 at 566 and through some auxiliary process (e.g. by prompting a user) permits or denies entry into the membership at 568. The new member in this example then waits for receipt of member accept messages 552 at 570 to determine acceptance and at 572, assuming acceptance is granted, the existing members would begin sending their portions of the shared data, which are received at 574. The new member would then be provisioned and the process completed at 576.

A method and system are therefore provided for sharing data amongst a group of a plurality of mobile devices without requiring a database or server to centrally store the shared data. The shared data is instead stored by each group member individually while controlling the manner in which the shared data is updated. To manage updates, the shared data is atomized such that individual databases in the shared data are separated or otherwise delineated into one or more records, each record having associated therewith, a value.

To maintain a common copy of the shared data at each device, any update is sent to all group members using an intermediate message exchange service that is capable of transmitting a sent message to more than one recipient if necessary. In this way, the updates are multicast to the group. To manage the content of the shared data, each update comprises one or more changes to a current copy of a corresponding record.

At the receiving end, each record may then be evaluated and replaced in its entirety (according to certain criteria) to simplify the resolution of collisions between updates to similar records and to inhibit propagation of changes throughout the shared data. In other words, atomic changes can be used such that only the data, information, selection or other value associated with a single record is affected for each addition, change or update. By managing the shared data in this way, updates to the shared data are also more tolerant of out-of-coverage situations. While devices are out-of-coverage, messages containing updates can be held until the device comes back into coverage or the messages may be resent on a periodic basis or both.

It will be appreciated that the particular options, outcomes, applications, screen shots and icons shown in the figures and described above are for illustrative purposes only and many other variations can be used according to the principles described.

Although the above has been described with reference to certain specific embodiments, various modifications thereof will be apparent to those skilled in the art as outlined in the appended claims.

The invention claimed is:

1. A method for updating data stored individually by each member of a group of a plurality of mobile devices, said method comprising:

one of said plurality of mobile devices performing a first modification to data in said one of said plurality of mobile devices by modifying a first value in said data or generating a first new value to be stored in said data while said one of said plurality of mobile devices is not operational for communication with a message exchange service, said data comprising a plurality of values stored to permit existing values to be modified and new values to be added without disrupting other values in the data; and after said one of said plurality of mobile devices becomes operational for communication with said message exchange service:

said one of said plurality of mobile devices sending a first message containing the first modified value or the first new value corresponding to said first modification to said data without incorporating others of said plurality of values, to each other member of said group;

said one of said plurality of mobile devices receiving a second message containing a second modified value or a second new value corresponding to a second modification to data in at least another one of said plurality of mobile devices without incorporating others of said plurality of values, said second message configured to be distributed by said other member in said group to all other members in said group;

said one of said plurality of mobile devices determining from information associated with said first and second messages if said second modification should be made to said data modified by said first modification in said one of said plurality of mobile devices;

wherein said determining from information associated with said first and second messages comprises examining a set of rules prioritizing updates according to a hierarchy of members in said group; and said one of said plurality of mobile devices updating said data according to said determining, wherein if said second modification is to be made, said second modified value or said second new value provided in said second message is added to said data without disrupting said other values in said data.

2. The method according to claim 1, further comprising said one of said plurality of mobile devices sending an acknowledgement back to said message exchange service indicative of receipt of said second common message.

3. The method according to claim 1, further comprising receiving a third message from another member in a private group, said private group being a subset of said group of plurality of mobile devices and restricting a subset of said data to said private group.

4. The method according to claim 1 further comprising said one of said plurality of mobile devices receiving an out of coverage message indicative of non-receipt of said first message by another one of said plurality of mobile devices.

5. The method according to claim 1 further comprising said one of said plurality of mobile devices receiving from another one of said plurality of mobile devices, a back in coverage message indicative of said another one of said plurality of mobile devices becoming operational for communication with said message exchange service; and updating a graphical user interface to indicate same.

6. The method according to claim 1 further comprises sending a back in coverage message to others of said plurality of mobile devices after said one of said plurality of mobile devices becomes operational for communication with said message exchange service.

7. The method according to claim 1, wherein said determining from information associated with said first and second messages comprises examining respective timestamps included in modifications being compared, and updating said data according to a latest timestamp.

8. The method according to claim 1, wherein said one of said plurality of mobile devices belongs to more than one group, said method further comprising determining to which group said first message should be sent.

9. The method according to claim 1, further comprising said one of said plurality of mobile devices receiving a request to join said group from a new member to said group; and after accepting entry of said new member into said group, said one of said plurality of mobile devices sending one or more portions of said data authored by said one of said plurality of mobile devices to said new member.

10. A non-transitory computer readable medium comprising computer executable instructions for updating data stored individually by each member of a group of a plurality of mobile devices, said computer executable instructions comprising instructions for:

one of said plurality of mobile devices performing a first modification to data in said one of said plurality of mobile devices by modifying a first value in said data or generating a first new value to be stored in said data while said one of said plurality of mobile devices is not operational for communication with a message exchange service, said data comprising a plurality of values stored to permit existing values to be modified and new values to be added without disrupting other values in the data; and after said one of said plurality of mobile devices becomes operational for communication with said message exchange service:

said one of said plurality of mobile devices sending a first message containing the first modified value or the first new value corresponding to said first modification to said data without incorporating others of said plurality of values, to each other member of said group;

said one of said plurality of mobile devices receiving a second message containing a second modified value or a second new value corresponding to a second modification to data in at least another one of said plurality of mobile devices without incorporating others of said plurality of values, said second message configured to be distributed by said other member in said group to all other members in said group;

said one of said plurality of mobile devices determining from information associated with said first and second messages if said second modification should be made to said data modified by said first modification in said one of said plurality of mobile devices;

wherein said determining from information associated with said first and second messages comprises examining a set of rules prioritizing updates according to a hierarchy of members in said group; and said one of said plurality of mobile devices updating said data according to said determining, wherein if said second modification is to be made, said second modified value or said second new value provided in said second message is added to said data without disrupting said other values in said data.

11. The non-transitory computer readable medium according to claim 10, further comprising instructions for sending an acknowledgement back to said message exchange service indicative of receipt of said second common message.

12. The non-transitory computer readable medium according to claim 10, further comprising instructions for receiving a third message from another member in a private group, said private group being a subset of said group of plurality of mobile devices and restricting a subset of said data to said private group.

13. The non-transitory computer readable medium according to claim 10 further comprising instructions for receiving an out of coverage message indicative of non-receipt of said first message by another one of said plurality of mobile devices.

14. The non-transitory computer readable medium according to claim 10 further comprising instructions for receiving from another one of said plurality of mobile devices, a back in coverage message indicative of said another one of said plurality of mobile devices becoming operational for communication with said message exchange service; and instructions for updating a graphical user interface to indicate same.

15. The non-transitory computer readable medium according to claim 10, said computer readable medium further comprising instructions for sending a back in coverage message to others of said plurality of mobile devices after said one of said plurality of mobile devices becomes operational for communication with said message exchange service.

16. The non-transitory computer readable medium according to claim 10, wherein said determining from information associated with said first and second messages comprises examining respective timestamps included in modifications being compared, and updating said data according to a latest timestamp.

17. The non-transitory computer readable medium according to claim 10, wherein said one of said plurality of mobile devices belongs to more than one group, said computer readable medium further comprising instructions for determining to which group said first message should be sent.

18. The non-transitory computer readable medium according to claim 10, further comprising instructions for receiving a request to join said group from a new member to said group; and after accepting entry of said new member into said group, sending one or more portions of said data authored by said one of said plurality of mobile devices to said new member.

19. A mobile device comprising a processor, one or more input mechanisms, a display a communication subsystem, and a computer readable medium comprising computer executable instructions for updating shared data stored individually by each member of a group of a plurality of mobile devices, said computer executable instructions comprising instructions for:
  one of said plurality of mobile devices performing a first modification to data in said one of said plurality of mobile devices by modifying a first value in said data or generating a first new value to be stored in said data while said one of said plurality of mobile devices is not operational for communication with a message exchange service, said data comprising a plurality of values stored to permit existing values to be modified and new values to be added without disrupting other values in the data; and
    said one of said plurality of mobile devices sending a first message containing the first modified value or the first new value corresponding to said first modification to said data without incorporating others of said plurality of values, to each other member of said group;
    said one of said plurality of mobile devices receiving a second message containing a second modified value or a second new value corresponding to a second modification to data in at least another one of said plurality of mobile devices without incorporating others of said plurality of values, said second message configured to be distributed by said other member in said group to all other members in said group;
    said one of said plurality of mobile devices determining from information associated with said first and second messages if said second modification should be made to said data modified by said first modification in said one of said plurality of mobile devices;
    wherein said determining from information associated with said first and second messages comprises examining a set of rules prioritizing updates according to a hierarchy of members in said group; and
    said one of said plurality of mobile devices updating said data according to said determining, wherein if said second modification is to be made, said second modified value or said second new value provided in said second message is added to said data without disrupting said other values in said data.

20. The mobile device according to claim 19, further comprising instructions for sending an acknowledgement back to said message exchange service indicative of receipt of said second common message.

21. The mobile device according to claim 19 further comprising instructions for receiving a third message from another member in a private group, said private group being a subset of said group of plurality of mobile devices and restricting a subset of said data to said private group.

22. The mobile device according to claim 19 further comprising instructions for receiving an out of coverage message indicative of non-receipt of said first message by another one of said plurality of mobile devices.

23. The mobile device according to claim 19 further comprising instructions for receiving from another one of said plurality of mobile devices, a back in coverage message indicative of said another one of said plurality of mobile devices becoming operational for communication with said message exchange service; and instructions for updating a graphical user interface to indicate same.

24. The mobile device according to claim 19, said computer readable medium further comprising instructions for sending a back in coverage message to others of said plurality of mobile devices after said one of said plurality of mobile devices becomes operational for communication with said message exchange service.

25. The mobile device according to claim 19, wherein said determining from information associated with said first and second messages comprises examining respective timestamps included in modifications being compared, and updating said data according to a latest timestamp.

26. The mobile device according to claim 19, wherein said one of said plurality of mobile devices belongs to more than one group, said computer readable medium further comprising instructions for determining to which group said first message should be sent.

27. The mobile device according to claim 19, further comprising instructions for receiving a request to join said group from a new member to said group; and after accepting entry of said new member into said group, sending one or more portions of said data authored by said one of said plurality of mobile devices to said new member.

* * * * *